United States Patent [19]

Claar et al.

[11] Patent Number: 5,439,744
[45] Date of Patent: Aug. 8, 1995

[54] COMPOSITE BODIES AND METHODS FOR MAKING SAME

[75] Inventors: Terry D. Claar, Newark; Vilupanur A. Ravi, Bear; Philip J. Roach, Newark, all of Del.

[73] Assignee: Lanxide Technology Company, LP, Newark, Del.

[21] Appl. No.: 979,853

[22] PCT Filed: Jun. 25, 1991

[86] PCT No.: PCT/US91/04762
§ 371 Date: Feb. 25, 1993
§ 102(e) Date: Feb. 25, 1993

[51] Int. Cl.$^6$ .................. C04B 35/65; C04B 35/58
[52] U.S. Cl. .................. 428/408; 75/236; 75/238; 75/244; 419/12; 419/13; 419/17; 419/57; 264/125; 264/332; 427/248.1; 427/255.4; 428/688; 428/704; 428/457; 501/87; 501/96; 501/97; 501/98; 501/102
[58] Field of Search .......... 427/248.1, 255.4; 501/87, 58, 97, 102, 134, 98, 96; 419/13, 57, 12, 17; 75/299, 236, 238, 244; 264/125, 332; 428/698, 704, 408, 457

[56] References Cited

U.S. PATENT DOCUMENTS

| | | | |
|---|---|---|---|
| 2,972,556 | 2/1961 | Vrahiotes et al. | 117/106 |
| 3,230,110 | 1/1962 | Smith | 117/228 |
| 4,024,294 | 5/1977 | Rairden, III | 427/250 |
| 4,492,670 | 1/1985 | Mizrah et al. | 419/12 |
| 4,585,618 | 4/1986 | Fresnel et al. | 419/12 |
| 4,692,418 | 9/1987 | Boecker et al. | 501/88 |
| 4,777,014 | 10/1988 | Newkirk et al. | 419/12 |
| 4,793,968 | 12/1988 | Mosser et al. | 419/17 |
| 4,851,375 | 7/1989 | Newkirk et al. | 501/88 |
| 4,885,130 | 12/1989 | Claar et al. | 419/12 |
| 4,904,446 | 2/1990 | White et al. | 419/13 |
| 4,921,725 | 5/1990 | Bouix | 427/45.1 |
| 5,019,539 | 5/1991 | Claar et al. | 501/87 |
| 5,242,710 | 9/1993 | Claar et al. | 427/248.1 |

FOREIGN PATENT DOCUMENTS 0261053 3/1988 European Pat. Off.
0322336 6/1989 European Pat. Off.

OTHER PUBLICATIONS

International Search Report for International Patent Application Ser. No. PCT/US91/04762.

Primary Examiner—A. A. Turner
Attorney, Agent, or Firm—Mark G. Mortenson; Jeffrey R. Ramberg

[57] ABSTRACT

This invention relates generally to a novel directed metal oxidation process which is utilized to produce self-supporting bodies. In some of the more specific aspects of the invention, a parent metal (e.g., a parent metal vapor) is induced to react with at least one solid oxidant-containing material to result in the directed growth of a reaction product which is formed from a reaction between the parent metal and the solid oxidant-containing material. The inventive process can be utilized to form bodies having substantially homogeneous compositions, graded compositions, and macrocomposite bodies.

23 Claims, 31 Drawing Sheets

COMPOSITE BODIES AND METHODS FOR MAKING SAME

TECHNICAL FIELD

This invention relates generally to a novel directed metal oxidation process which is utilized to produce self-supporting bodies. In some of the more specific aspects of the invention, a parent metal (e.g., a parent metal vapor) is induced to react with at least one solid oxidant-containing material to result in the directed growth of a reaction product which is formed from a reaction between the parent metal and the solid oxidant-containing material. The inventive process can be utilized to form bodies having substantially homogeneous compositions, graded compositions, and macrocomposite bodies.

BACKGROUND ART

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of metal boride and metal carbide bodies by the methods of hot pressing, reaction sintering, and reaction hot pressing is well known. While there has been some limited success in producing metal boride and metal carbide bodies according to the above-discussed methods, there is still a need for a more effective and economical method to prepare such bodies.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare dense boride-containing materials.

Moreover, there also has been significant interest in modifying the properties of known or existing materials in a manner which renders the materials suitable for use in environments which normally would adversely affect such materials. For example, one such modifying approach generally relates to coating onto a surface of a substrate material a second material, which has properties which differ from the underlying substrate material.

Various methods exist for coating substrate materials. A first category of coating processes is generally referred to as overlay coatings. Overlay coatings involve, typically, a physical deposition of a coating material onto a substrate. The coating material typically enhances the performance of the substrate by, for example, increasing the erosion resistance, corrosion resistance, high temperature strength, etc., of the substrate material. These overlay coatings typically result in the substrate material having longer life and/or permit the use of the substrate material in a number of environments which normally might adversely affect and/or destroy the utility of the substrate material absent the placement of the overlay coating thereon.

Commonly utilized overlay coating methods include Chemical Vapor Deposition, Hot Spraying, Physical Vapor Deposition, etc. Briefly, Chemical Vapor Deposition utilizes a chemical process which occurs between gaseous compounds when such compounds are heated. Chemical Vapor Deposition will occur so long as the chemical reaction produces a solid material which is the product of the reaction between or in the gaseous compounds. The Chemical Vapor Deposition process is typically carried out in a reaction chamber into which both a reactive gas and a carrier gas are introduced. A substrate material is placed into contact with the reactant and carrier gases so that reaction between the gases and deposition of the reaction solid will occur on the surface of the substrate. Chemical Vapor Deposition processes typically involve the use of corrosive alkali gases (e.g., chlorides, fluorides, etc.) in the reaction chamber which must be carefully handled. Accordingly, even though Chemical Vapor Deposition processes may produce desirable coatings on some materials, the equipment that is utilized typically is complicated in design and is expensive to operate.

A number of Hot Spraying techniques also exists for the placement of an overlay coating on a substrate material. The three most widely utilized Hot Spraying techniques include Flame Spraying, Plasma Spraying, and Detonation Coating.

Flame Spraying utilizes a fine powder which is contained in a gaseous stream and which is passed through a combustion flame which renders the fine powder molten. The molten powder is then caused to impinge on a surface of a substrate material which is to be coated, which is typically cold relative to the flame spray. Bonding of the coating of flame-sprayed material to the substrate is primarily of a mechanical nature. The flame-sprayed coating is usually not fully dense and thus is often subsequently treated by a fusing operation to densify the coating.

Plasma Spraying is somewhat similar to Flame Spraying, except that the fine powder, instead of being passed through an intense combustion flame, is passed through an electrical plasma which is produced by a low voltage, high current electrical discharge. As a result, disassociation and ionization of gases occur which results in a high temperature plasma. The high temperature plasma is directed toward a substrate material resulting in the deposition of a layer of coating material on the substrate.

Detonation Coating is a process which has some similarities to Flame Spraying, except that a desired amount of powder is directed at high velocity (e.g., about 800 meters per second) toward the surface of a substrate material which is to be coated. While the particles are being accelerated in a hot gas stream, the particles melt. Moreover, the high kinetic energy of the particles when impinging on the surface of a substrate material results in additional heat being generated, thereby assisting the coating process.

The third category of so-called overlay coatings is Physical Vapor Deposition coatings. Physical Vapor Deposition coatings include, for example, Ion Sputtering, Ion Plating, and Thermal Evaporation.

In Ion Sputtering, a vacuum chamber houses a cathode electrode such that the cathode electrode emits atoms and atomic clusters toward a substrate material to result in a sputtered film or coating being deposited on the substrate.

Ion Plating of a substrate material involves the use of a heated metal source which emits metal atoms toward a substrate material which is to be coated. Specifically, an electron beam is typically utilized to excite the metal atoms from the metal source. The excited metal atoms are then directed toward the substrate material to be coated.

Thermal Evaporation also relies on the excitation of atoms from a metal source. Specifically, in a vacuum chamber, a metal source is heated so that metal atoms evaporate from the metal source and are directed toward a substrate material to be coated. The metal atoms then collect as a coating on the substrate.

A second general category of coating formation techniques is known as conversion coating techniques. In conversion coating techniques, a substrate material, typically, is involved in a chemical reaction which modifies the composition and/or microstructure of the surface of the substrate. These conversion coating techniques also can result in desirable surface modification of substrate materials. Typical examples of conversion coating techniques include Pack Cementation and Slurry Cementation.

Pack Cementation and Slurry Cementation utilize diffusion of one or more materials to form a surface coating. Specifically, in each of these processes, a substrate material is contacted with a metal source material such that a metal from the metal source material may diffuse into the substrate material and/or a component of the substrate material may diffuse toward the metal source material. Specifically, for example, in Pack Cementation, a substrate material is buried within a powder mixture which comprises, typically, both a metal which is to react with the substrate material and an inert material. A carrier gas is then induced to flow into the powder mixture so that the carrier gas can carry metal atoms from the metal powder to the surface of the substrate and deposit the metal atoms thereon. Both Pack Cementation and Slurry Cementation typically occur in a retort or vacuum furnace and the carrier gas is free to transport metal atoms from the metal powder to the surface of the substrate material. Typical carrier gases include the halogen gases. Many different approaches to Pack Cementation have been made, however, most of these approaches utilize the above-discussed steps.

Slurry Cementation is quite similar to Pack Cementation, however, in Slurry Cementation, a composition typically is coated onto a surface of a substrate material prior to conducting the diffusion process in a vacuum or retort furnace. In each of Pack Cementation and Slurry Cementation, the temperature of reaction is typically elevated to permit the metal atoms to react with the substrate by solid state diffusion which results in the formation of a coating material.

The above-discussed coating techniques have been briefly addressed herein to give the reader a general understanding of the art. However, it should be understood that many specific variations to the above-discussed techniques exist. Specifically, each of the coating processes discussed above has been discussed in detail in a number of readily available sources, including textbooks, conference proceedings, and patents. For further information relating to the detail of these processes, the reader is encouraged to consult the literature referred to above. However, even from the brief discussions above, it is clear that each of the techniques suffers from various limitations. For example, in the overlay coating techniques, the physical deposition of a coating onto a substrate material does not insure an acceptable interface between the substrate and the coating. Specifically, because most of the overlay coating techniques simply rely on the use of a physical bonding between the coating and the substrate, the coating may not adhere to the substrate in a desirable manner. Accordingly, the purpose of the coating may be compromised completely. Additionally, almost all of the overlay coating processes depend on the use of somewhat complex deposition equipment. For example, Chemical Vapor Deposition requires the use of complicated control means for controlling the rate of flow of reactive and carrier gases in a reaction chamber, the ability to handle corrosive alkali gases (e.g., fluorides and chlorides). Accordingly, the equipment utilized for Chemical Vapor Deposition is typically quite expensive.

Moreover, with regard to the so-called conversion coating techniques which are formed by, for example, Pack Cementation and Slurry Cementation techniques, the coatings which result on substrate materials may not be uniform due to the inclusion of solid materials or porosity which result from exposure of the substrate to either or both the powder metal source and/or inert materials utilized in the Pack Cementation or Slurry Cementation processes. Still further, many of the Pack Cementation and Slurry Cementation techniques may require the use of somewhat complex equipment.

The present invention is a significant improvement over all known prior art techniques in that relatively simple equipment can be utilized to achieve a virtually infinite combination of desirable bodies. Specifically, the present invention permits the formation of a coating on substrate materials or the creation of new materials from, for example, solid oxidant precursor materials. The coatings which form are very dense and are substantially uniform in thickness. Additionally, the coatings can be applied in thicknesses heretofore believed difficult, if not impossible, to achieve. Moreover, due to the simplicity of the process and, for example, the rate of conversion of a solid oxidant material to a reaction product, entire solid oxidant bodies can be converted from one composition to another. These and other aspects of the invention will become apparent to those skilled in the art when reading the following sections.

Discussion of Commonly Owned U.S. Patents and Patent Applications

This application is a Continuation-in-Part of U.S. patent application Ser. No. 07/543,316, filed Jun. 25, 1990, in the names of Terry Dennis Claar et al., and entitled "Methods For Making Self-Supporting Composite bodies and Articles Produced Thereby," the subject matter of which is expressly incorporated herein by reference.

A directed metal oxidation reaction is disclosed in U.S. Pat. No. 4,713,360, which issued on Dec. 15, 1987, and is entitled "Novel Ceramic Materials and Methods for Making Same" and which was issued in the names of Marc S. Newkirk et al. This patent discloses that a molten parent metal can react with a vapor-phase oxidant and result in the directed growth of an oxidation reaction product.

A similar directed metal oxidation reaction process is disclosed in U.S. Pat. No. 4,851,375, which issued on Jul. 25, 1989, and is entitled "Methods of Making Composite Ceramic Articles Having Embedded Filler", and which issued in the names of Marc S. Newkirk et al. This patent discloses that a molten parent metal can react with an oxidant to grow oxidation-reaction product into a substantially inert filler material, thereby forming a ceramic matrix composite body.

The reactive infiltration into a bed or mass comprising boron carbide is discussed in co-pending U.S. patent application Ser. No. 07/446,433, filed in the names of Terry Dennis Claar et al., on Dec. 5, 1989, and entitled "A Process For Preparing Self-Supporting Bodies and Products Produced Thereby", which is a continuation of U.S. Pat. No. 4,885,130, which issued on Dec. 5, 1989, in the names of Terry Dennis Claar et al., and is entitled "Process For Preparing Self-Supporting Bodies and Products Produced Thereby", which in turn is a Continuation-In-Part application of U.S. patent application Ser. No. 07/137,044, filed on Dec. 23, 1987, in the names of Terry Dennis Claar et al., and entitled "Process For Preparing Self-Supporting Bodies and Products Made Thereby, and which was allowed on Jan. 2, 1990, which in turn is a Continuation-In-Part application of U.S. patent application Ser. No. 07/073,533, filed in the names of Danny R. White, Michael K. Aghajanian and T. Dennis Claar, on Jul. 15, 1987, and entitled "Process for Preparing Self-Supporting Bodies and Products Made Thereby".

Briefly summarizing the disclosure contained in each of the above-identified patent applications and issued Patent relating to reactive infiltration, self-supporting ceramic bodies are produced by utilizing a parent metal infiltration and reaction process (i.e., reactive infiltration) in the presence of a mass comprising boron carbide. Particularly, a bed or mass comprising boron carbide is infiltrated by molten parent metal, and the bed may be comprised entirely of boron carbide, thus resulting in a self-supporting body comprising one or more parent metal boron-containing compounds, which compounds include a parent metal boride or a parent metal boron carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of each of the above-identified reactive infiltration patent applications and issued Patent, a mass comprising boron carbide is placed adjacent to or in contact with a body of molten metal or metal alloy, which is melted in a substantially inert environment within a-particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boron compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boron carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boron compound, a parent metal carbide, a metal (which, as discussed in each of the above-identified patent applications and issued Patent, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boron compound(s) and parent metal carbide is at least about 50%, and most preferably at least about 90%.

The typical environment or atmosphere which was utilized in each of the above-identified patent applications and issued Patent was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised Zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Moreover, co-pending U.S. patent application Ser. No. 07/137,044 (discussed above and hereinafter referred to as "application Ser. No. '044"), discloses that in some cases it may be desirable to add a carbon donor material (i.e., a carbon-containing compound) to the bed or mass comprising boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more $ZrC$ could be produced due to the addition of a carbon donor material in the mass of boron carbide).

Still further, Issued U.S. Pat. No. 4,885,130 (discussed above and hereinafter referred to as "Pat. No. '130"), discloses that in some cases it may be desirable to add a boron donor material (e.g., a boron-containing compound) to a bed or mass of boron carbide which is to be infiltrated by molten parent metal. The added boron-containing compound can then behave in a manner similar to the carbon-containing compound discussed above in relation to application Ser. No. '044, except that the ratio of $ZrB_2/ZrC$ could be increased, as opposed to reduced.

Still further, U.S. Pat. No. 4,904,446, which issued on Feb. 27, 1990, in the names of Danny Ray White and Terry Dennis Claar and entitled "Process For Preparing Self-Supporting Bodies and Products Made Thereby", discloses that a parent metal can react with a mass comprising boron nitride to result in a body comprising a boron-containing compound, a nitrogen-containing compound and, if desired, a metal. The mass comprising boron nitride may also contain one or more inert fillers. Relative amounts of reactants and process conditions may be altered or controlled to yield a body containing a varying volume percents of ceramic, metal and/or porosity.

Moreover, co-pending U.S. patent application Ser. No. 07/296,961, which was filed on Jan. 13, 1989, in the names of Terry Dennis Claar et al., and entitled "A Process for Preparing Self-Supporting Bodies Having Controlled Porosity and Graded Properties and Products Produced Thereby", and which was allowed on Feb. 27, 1990, discloses that a powdered parent metal can be mixed with a bed or mass comprising boron carbide and, optionally, one or more inert fillers, to form a self-supporting body. The application also discloses that the properties of a composite body can be modified by, for example, tailoring the porosity by appropriate selection of the size and/or composition of the parent metal powder or particulate, etc., which is mixed with the boron carbide.

The disclosures of each of the above-discussed Commonly Owned U.S. patents' and U.S. patent applications are herein expressly incorporated by reference.

SUMMARY OF THE INVENTION

In accordance with the present invention, there are provided a plurality of methods for producing self-supporting bodies. Specifically, in one preferred embodiment of the invention at least one vapor-phase parent metal is caused to react with at least one solid oxidant-containing material to form at least one reaction product.

In all embodiments of the invention, the following processing steps are utilized. A material, at least a portion of which comprises a solid oxidant, is placed into a reaction chamber. The reaction chamber should be made of, or at least coated with, a material which does not adversely react with any of the materials utilized in the process of the present invention. Moreover, the reaction chamber should be capable of isolating all materials contained therein from any external contaminants which might adversely impact the process of the present invention. A vapor-phase parent metal source is contained within the reaction chamber in a manner which permits an interaction between the parent metal vapor and the solid oxidant-containing material. The parent metal vapor can be introduced by providing a solid source of parent metal within the reaction chamber, or contiguous to the reaction chamber, and heating the solid source of parent metal until a temperature is achieved which results in an adequate vapor pressure of the parent metal being present in the reaction chamber. The parent metal vapor should be capable of contacting that portion of the solid oxidant-containing material which is to react with the parent metal vapor. Accordingly, only a portion of a solid oxidant-containing material may be exposed to the parent metal vapor to create a reaction product or alternatively, substantially all of a solid oxidant-containing material can be exposed to a parent metal vapor to create reaction product.

The solid oxidant-containing material which is to react with the parent metal vapor should be, or contain, a material which is itself capable of reacting with the parent metal vapor to form reaction product, or should be capable of being coated with a material which contains a solid oxidant which is capable of forming a desirable reaction product when contacted with a parent metal vapor.

In a first preferred embodiment of the invention, a solid oxidant-containing material is comprised substantially completely of solid oxidant which is capable of reacting with parent metal vapor under the process conditions of the invention. Accordingly, for example, a carbonaceous material is placed within a reaction chamber and is placed into contact with parent metal vapor (e.g., titanium, hafnium, zirconium, silicon and/or niobium) to result in the formation of a parent metal carbide reaction product. The amount of reaction product that can form includes: (1) a relatively thin layer of reaction product formed upon a carbonaceous substrate material, (2) a relatively thick layer of reaction product formed upon a carbonaceous substrate material, or (3) substantially complete conversion of the substrate material to reaction product.

In a second preferred embodiment of the invention, a composite material can be formed. Specifically, a solid oxidant substrate is first coated with a substantially inert filler material prior to being exposed to a parent metal vapor. A reaction product of parent metal vapor and solid oxidant is then formed and the substantially inert filler material is thereafter embedded in the formed reaction product, thereby forming a composite material. The filler material may comprise any particular shape or combination of shapes of filler material, and may have any suitable chemical constituency. However, the filler material should be chosen so as to be capable of surviving the process of the present invention. Moreover, by appropriate selection of filler material(s) to be embedded by reaction product, a wide range of desirable properties can be achieved.

In a third preferred embodiment of the invention, a solid oxidant-containing substrate material is first coated or contacted with at least one material which will react with at least one other material external to the solid oxidant (e.g., in the coating), and/or react with at least one material in the solid oxidant-containing material and/or, react with the parent metal vapor. For example, a powdered parent metal having a substantially similar or substantially different composition from the parent metal vapor, may be first placed as a coating onto at least a portion of a surface of a solid oxidant-containing material prior to the parent metal vapor contacting the solid oxidant-containing material. Reactions may then occur between the powdered parent metal on the surface of the solid oxidant-containing material and the solid oxidant itself and/or reactions may occur between the powdered parent metal on the solid oxidant-containing material and the parent metal vapor. Additionally, at least one solid oxidant (e.g., boron carbide) which is different in composition from the solid oxidant-containing substrate material (e.g., carbon) may be placed onto the surface of the solid oxidant-containing material prior to contacting the parent metal vapor with the solid oxidant-containing material. The different solid oxidant placed on the surface of a solid oxidant-containing material substrate should be capable of reacting with the parent metal vapor to result in a reaction product which may be different from the reaction product which results when the parent metal vapor reacts with the substrate solid oxidant-containing material. This different reaction product could serve as a filler material. Still further, a powdered parent metal (e.g., titanium, hafnium, and/or zirconium) having a substantially similar or substantially different chemical composition from the parent metal vapor (e.g., titanium, hafnium, and/or zirconium) may be mixed with a solid oxidant powder which is different in composition from the solid oxidant-containing material substrate to permit the formation of a reaction product which is different than the reaction product which forms when the parent metal vapor contacts the substrate solid oxidant-containing material. This different reaction product could also serve as a filler material. Further, if more than one reaction product is formed, it is possible that the reaction products may also react with each other.

In a fourth preferred embodiment of the invention, each of the first and third embodiments discussed above can be expanded on by positioning a filler material on at least a portion of the surface of the solid oxidant-containing material. Accordingly, the filler material could be uniformly or non-homogeneously mixed with, for example, a powdered parent metal of substantially similar or substantially different composition than the vapor-phase parent metal. Moreover, the filler material could be mixed in a substantially uniform or non-homogeneous manner with a solid oxidant powder which is placed onto the surface of a solid oxidant-containing substrate material. Still further, a filler material may be mixed either substantially uniformly or non-homogeneously with the combination of a parent metal powder (having a substantially similar or substantially different composition than a parent metal vapor) and a solid oxidant.

In a fifth preferred embodiment of the invention, a solid oxidant-containing material is placed as a coating on a substrate material which normally would not react with a parent metal vapor so as to permit the formation of a reaction product coating having a composition different than the solid oxidant-containing material coating and the substrate material.

Further, in each of the above-discussed embodiments, it is possible to supply substantially simultaneously more than one parent metal vapor to permit the formation of an even greater number of reaction products and possible interactions between forming or formed reaction products.

It should be understood that a large number of combinations of parent metal vapors, solid oxidant-containing materials, solid oxidant powders, parent metal powders, fillers, etc., are possible for utilization in accordance with the teachings of the present invention. Thus, while every potential combination of materials has not been expressly discussed above herein, such combinations should readily occur to those skilled in the art.

DEFINITIONS

As used herein in the specification and the appended claims, the terms below are defined as follows:

"Different" as used herein in conjunction with chemical compositions, means that a primary chemical constituent of one material differs from a primary chemical constituent of another referenced material.

"Filler" as used herein, means either single constituents or mixtures of constituents which are substantially non-reactive with, and/or of limited solubility in, parent metal powders and/or parent metal vapors and may be single or multi-phase. Fillers may be provided in a wide variety of forms such as powders, flakes, platelets, microspheres, whiskers, bubbles, etc., and may be dense or porous. "Fillers" may also include ceramic fillers, such as alumina or silicon carbide, as fibers, particulates, whiskers, bubbles, spheres, fibermats, or the like, and ceramic-coated fillers such as carbon fibers coated with alumina or silicon carbide to protect the carbon from attack. "Fillers" may also include metals. "Fillers" should also be capable of surviving the processing conditions.

"Parent Metal Powder" as used herein, means that metal (e.g., zirconium, titanium, hafnium, silicon, niobium, etc.) which is the precursor for a reaction product of the powdered parent metal and a solid oxidant (e.g., parent metal carbides, etc.) and includes that metal as a pure or relatively pure metal, a commercially available metal having impurities and/or alloying constituents therein and an alloy in which that metal precursor is the major constituent. When a specific metal is mentioned as the powdered parent metal, the metal identified should be read with this definition in mind unless indicated otherwise by the context.

"Parent Metal Vapor" or "Vapor-Phase Parent Metal" as used herein, means that metal (e.g., zirconium, titanium, hafnium, silicon, niobium, etc.) which is the vapor-phase precursor for the reaction product (e.g., parent metal carbides, etc.) of the parent metal and a solid oxidant and includes that metal as a pure or relatively pure metal, a commercially available metal having impurities and/or alloying constituents therein and an alloy in which that metal precursor is the major constituent. When a specific metal is mentioned as the parent metal vapor, the metal identified should be read with this definition in mind unless indicated otherwise by the context.

"Parent Metal Boride" and "Parent Metal Boro Compounds" as used herein, means a reaction product containing boron formed upon reaction between a boron source material and at least one parent metal source (either vapor-phase or solid phase) and includes a binary compound of boron with the parent metal, as well as ternary or higher order compounds.

"Parent Metal Carbide" as used herein, means a reaction product containing carbon formed upon reaction of a solid oxidant carbon source and a parent metal.

"Parent Metal Nitride" as used herein, means a reaction product containing nitrogen formed upon reaction of a nitrogen source (e.g., boron nitride) and a parent metal.

"Reaction Product" as used herein, means the product which forms as a result of the reaction between a parent metal and a solid oxidant.

"Solid Oxidant" as used herein, means an oxidant in which the identified solid is the sole, predominant, or at least a significant oxidizer of the parent metal under the conditions of the process.

"Solid Oxidant-Containing Material" as used herein, means a material which contains a solid oxidant. The solid oxidant may comprise substantially all of the material or may comprise only a portion of the material. The solid oxidant may be substantially homogeneously or heterogeneously located within the material.

"Solid Oxidant Powder" as used herein, means an oxidant in which the identified solid is the sole, predominant, or at least a significant oxidizer of a parent metal powder and/or parent metal vapor and which is located on at least a portion of a surface of another material (e.g., a solid oxidant-containing material).

DETAILED DESCRIPTION OF THE INVENTION AND PREFERRED EMBODIMENTS

Figure 1:
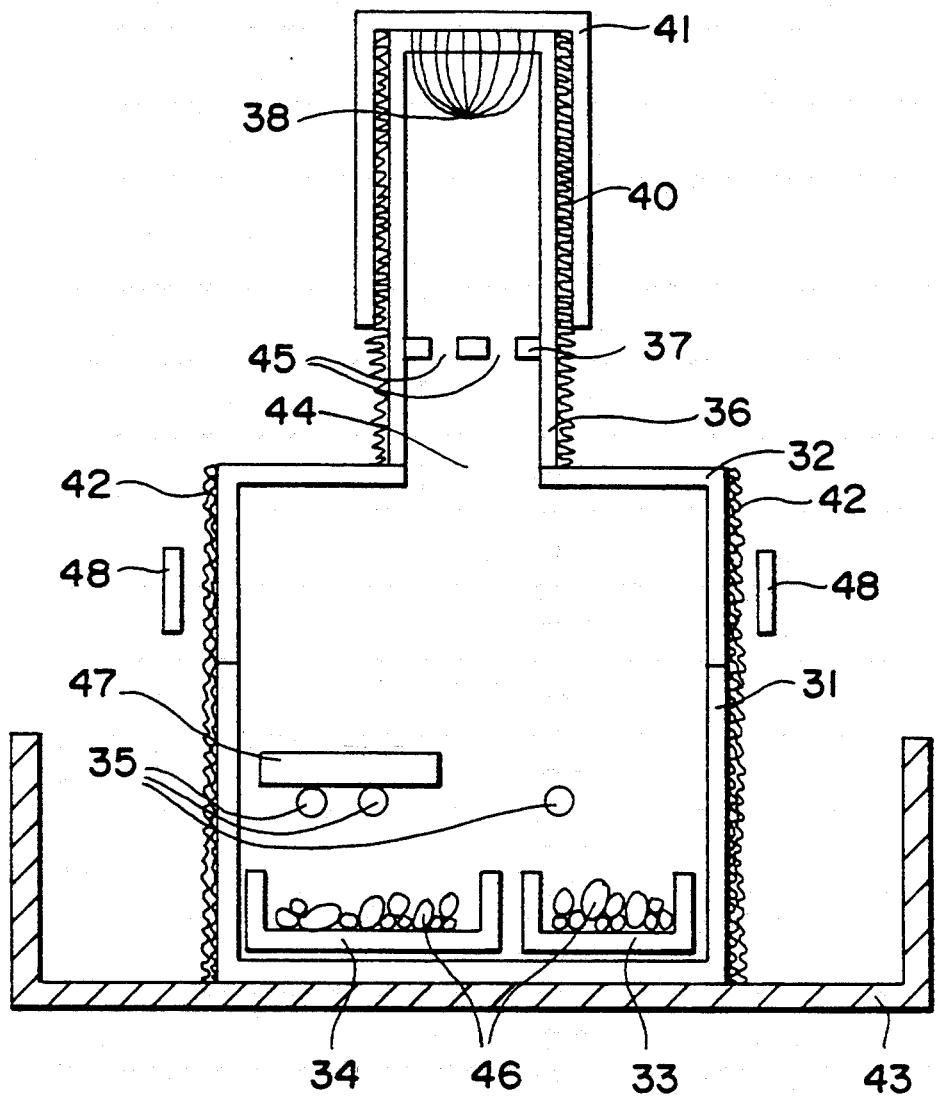
FIG. 1 is a schematic cross-sectional view of an assembly utilized to produce a body in accordance with the present invention.

In accordance with the present invention, there are provided a plurality of methods for producing self-supporting bodies. Specifically, at least one vapor-phase parent metal is caused to react with at least one solid oxidant-containing material to form a solid reaction product.

In all embodiments of the invention, the following processing steps are utilized. A material, at least a portion of which comprises a solid oxidant, is placed into a reaction chamber. The reaction chamber should be made of, or at least coated with, a material which does not adversely react with any of the materials utilized in the process of the present invention. Moreover, the reaction chamber should be capable of isolating all materials contained therein from any external contaminants which might adversely impact the process of the present invention. A vapor-phase parent metal source is contained within the reaction chamber in a manner which permits an interaction between the parent metal vapor and the solid oxidant-containing material. The parent metal vapor can be introduced by providing a solid source of parent metal within the reaction chamber, or contiguous to the reaction chamber, and heating the solid source of parent metal until a temperature is achieved which results in an adequate vapor pressure of the parent metal being present in the reaction chamber. The parent metal vapor should be capable of contacting that portion of the solid oxidant-containing material which is to react with the parent metal vapor. Accordingly, only a portion of a solid oxidant-containing material may be exposed to the parent metal vapor to create a reaction product or alternatively, substantially all of a solid oxidant-containing material can be exposed to a parent metal vapor to create reaction product.

The solid oxidant-containing material which is to react with the parent metal vapor should be, or contain, a material which is itself capable of reacting with the parent metal vapor to form reaction product, or should be capable of being coated with a material which contains a solid oxidant which is capable of forming a desirable reaction product when contacted with a parent metal vapor.

For example, a category of materials which have been given a substantial amount of attention for many high temperature applications is the graphite or carbonaceous materials. Specifically, carbon-based materials (e.g., carbon/carbon composites, solid forms of graphite; etc.) have achieved a substantial amount of attention because they are relatively light in weight, have excellent high temperature properties, are thermal shock resistant, and have desirable electrical properties. However, the use of carbon-based materials for many applications has been limited due to the poor oxidation and/or erosion (e.g., abrasion) resistance inherent to these materials. Thus, many approaches for forming some type of protective coating on carbon-based materials have been attempted. The techniques of the present invention are well suited for coating carbon-based materials and/or substantially completely converting carbon-based materials to another material (e.g., a ceramic or ceramic composite material) which may be more desirable for a particular purpose or application. The techniques of the invention are also well suited for coating certain molybdenum-containing materials. This disclosure will focus primarily upon methods for parent metals reacting with carbon-based materials, however, it should be understood that the present invention can be utilized with materials other than graphite or carbon-based materials.

In an effort to explain the workings of the present invention, but without wishing to be bound by any particular theory or explanation for the present invention, it appears as though when a parent metal vapor contacts a solid oxidant, the parent metal vapor first may be adsorbed onto a surface of a solid oxidant-containing material until a substantially uniform, but very thin, layer is formed and/or some reaction may occur between the parent metal and the solid oxidant coating material resulting in a thin reaction product layer. The formed layer eventually substantially completely isolates the solid oxidant from any further direct physical contact with the parent metal vapor. Thus, for reaction product to form, additional atoms or ions of parent metal should be capable of diffusing through the formed layer and/or, at least one species in the solid oxidant-containing material should be capable of diffusing in an opposite direction toward the parent metal vapor through the same formed layer, to permit additional reaction to occur. The respective rates of diffusion of parent metal ions and solid oxidant through the formed layer will directly impact the nature and properties of the composite body which is formed. Stated more specifically, a directed metal oxidation reaction will occur when the rate of diffusion of the solid oxidant through the formed layer is greater than the rate of diffusion of parent metal ions through the formed layer thus, resulting in a build-up or layer of material on a surface of a solid oxidant-containing material. By controlling various processing parameters such as parent metal composition, parent metal vapor pressure, solid oxidant composition, location of solid oxidant within or on another substantially non-reactive material, temperature, processing time, etc., the resulting composite body may comprise anything from a substrate solid oxidant-containing material having at least one portion of its surface covered with reaction product, to a substantially completely converted solid oxidant-containing material (e.g., carbon being converted to titanium carbide).

In a first preferred embodiment of the invention, a solid oxidant-containing material is comprised substantially completely of solid oxidant which is capable of reacting with parent metal vapor under the process conditions of the invention. Accordingly, for example, a carbonaceous material is placed within a reaction chamber and is placed into contact with parent metal vapor (e.g., titanium, hafnium, zirconium, silicon and/or niobium) to result in the formation of a parent metal carbide reaction product. The amount of reaction product that can form includes: (1) a relatively thin layer of reaction product formed upon a carbonaceous substrate material, (2) a relatively thick layer of reaction product formed upon a carbonaceous substrate material, or (3) substantially complete conversion of the substrate material to reaction product.

In a second preferred embodiment of the invention, a composite material can be formed. Specifically, a solid oxidant substrate is first coated with a substantially inert filler material prior to being exposed to a parent metal vapor. A reaction product of parent metal vapor and solid oxidant is then formed and the substantially inert filler material is thereafter embedded in the formed reaction product, thereby forming a composite material. The filler material may comprise any particular shape or combination of shapes of filler material, and may have any suitable chemical constituency. However, the filler material should be chosen so as to be capable of surviving the process of the present invention. Moreover, by appropriate selection of filler material(s) to be embedded by reaction product, a wide range of desirable properties can be achieved.

In a third preferred embodiment of the invention, a solid oxidant-containing substrate material is first coated or contacted with at least one material which will react with at least one other material external to the solid oxidant (e.g., in the coating), and/or react with at least one material in the solid oxidant-containing material, and/or react with the parent metal vapor. For example, a powdered parent metal having a substantially similar or substantially different composition from the parent metal vapor, may be first placed as a coating onto at least a portion of a surface of a solid oxidant-containing material prior to the parent metal vapor contacting the solid oxidant-containing material. Reactions may then occur between the powdered parent metal on the surface of the solid oxidant-containing material and the solid oxidant itself and/or reactions may occur between the powdered parent metal on the solid oxidant-containing material and the parent metal vapor. Additionally, at least one solid oxidant (e.g., boron carbide) which is different in composition from the solid oxidant-containing substrate material (e.g., carbon) may be placed onto the surface of the solid oxidant-containing material prior to contacting the parent metal vapor with the solid oxidant-containing material. The different solid oxidant placed on the surface of a solid oxidant-containing material substrate should be capable of reacting with the parent metal vapor to result in a reaction product which may be different from the reaction product which results when the parent metal vapor reacts with the substrate solid oxidant-containing material. This different reaction product could serve as a filler material. Still further, a powdered parent metal (e.g., titanium, hafnium, zirconium, silicon and/or niobium) having a substantially similar or substantially different chemical composition from the parent metal vapor (e.g., titanium, hafnium, zirconium, silicon and/or niobium) may be mixed with a solid oxidant powder which is different in composition from the solid oxidant-containing material substrate to permit the formation of a reaction product which is different than the reaction product which forms when the parent metal vapor contacts the substrate solid oxidant-containing material. This different reaction product could also serve as a filler material. Further, if more than one reaction product is formed, it is possible that the reaction products may also react with each other.

In a fourth preferred embodiment of the invention, each of the first and third embodiments discussed above can be expanded on by positioning a filler material on at least a portion of the surface of the solid oxidant-containing material. Accordingly, the filler material could be uniformly or non-homogeneously mixed with, for example, a powdered parent metal of substantially similar or substantially different composition than the vapor-phase parent metal. Moreover, the filler material could be mixed in a substantially uniform or non-homogeneous manner with a solid oxidant powder which is placed onto the surface of a solid oxidant-containing substrate material. Still further, a filler material may be mixed either substantially uniformly or non-homogeneously with the combination of a parent metal powder (having a substantially similar or substantially different composition than a parent metal vapor) and a solid oxidant.

In a fifth preferred embodiment of the invention, a solid oxidant-containing material is placed as a coating on a substrate material which normally would not react with a parent metal vapor so as to permit the formation of a reaction product coating having a composition different than the solid oxidant-containing material coating and the substrate material.

Further, in each of the above-discussed embodiments, it is possible to supply substantially simultaneously more than one parent metal vapor to permit the formation of an even greater number of reaction products and possible interactions between forming or formed reaction products.

It should be understood that a large number of combinations of parent metal vapors, solid oxidant-containing materials, solid oxidant powders, parent metal powders, etc., are possible for utilization in accordance with the teachings of the present invention. Thus, while every potential combination of materials has not been expressly discussed above herein, such combinations should readily occur to those skilled in the art.

EXAMPLE 1

The following Example demonstrates a method for forming a reaction product coating on a graphite substrate by reacting a parent metal vapor with the graphite substrate at an elevated temperature.

FIG. 1 is a cross-sectional schematic of the lay-up used to form a reaction product coating on a graphite substrate coupon. Specifically, FIG. 1 is a cross-sectional schematic of a vapor deposition chamber contained in a containment graphite boat 43. The vapor deposition chamber was comprised of a lower chamber portion 31, three substrate supporting rods 35 attached to sidewalls of the lower chamber portion 31, four parent metal source trays 34 and 33, made of graphite, within lower chamber portion 31, an upper chamber portion 32, a stack portion tube 36 containing a perforated plate 37 and attached to upper chamber portion 32, a closed end tube 41 covering the stack portion tube 36 and graphite felt getters 40 and 42 wrapped around stack portion tube 36 and vapor deposition chamber respectively.

More specifically, the lower chamber portion 31 of the vapor deposition chamber measured about 6.5 inches (165 mm) long, about 6.5 inches (165 mm) wide, about 4 inches (102 mm) high and had a wall thickness of about 0.25 inches (6.4 mm). The lower chamber portion 31 was machined from a piece of Grade ATJ graphite (Union Carbide Corporation, Carbon Products Division, Cleveland, Ohio). The three graphite support rods 35 with diameters of about 0.38 inch (9.6 mm) and made from Grade AGSX graphite (Union Carbide Corporation, Carbon Product Division, Cleveland, Ohio), were interference fit into holes in the sidewalls of the lower chamber portion 31. All of the support rods 35 were located about 2.0 inches (51 mm) from the bottom of the lower chamber portion 31. Additionally, each of the three support rods 35 were located about 1.0 inch (25 mm), about 1.75 inches (45 mm), and about 4.13 inches (105 mm), respectively, from one sidewall of the lower chamber portion 31 and extended from one sidewall to the opposite sidewall of the lower chamber portion 31. The support rods 35 formed a supporting means for holding the graphite substrate coupons during coating.

The upper chamber portion 32 of the vapor deposition chamber measured about 6.5 inches (165 mm) long, about 6.5 inches (165 mm) wide, about 4 inches (102 mm) high, and had a wall thickness of about 0.25 inches (6.4 mm). The upper chamber portion 32 further included a hole 44 having a diameter of about 1.75 inches (44.5 mm). The hole 44 was substantially centrally located in a top portion of the upper chamber portion 32. The stack portion tube 36 measured about 5.5 inches (140 mm) long, had an outer diameter of about 2.25 inches (57 mm), and had a wall thickness of about 0.25 inches (6.4 mm). The stack portion tube 36 was also machined from Grade ATJ graphite. The open end of stack portion tube 36 was aligned with the hole 44 within the top of upper chamber portion 32 and glued to the upper chamber portion 32 with RIGIDLOCK ® graphite cement (Polycarbon Corporation, Valencia, Calif.). Additionally, about 10 slots 38 were cut in the closed end of stack portion tube 36. Each slot 38 measured about 0.04 inch (1 mm) wide and about 0.5 inch (13 mm) deep and provided a means for communicating between inner cavity of the vapor deposition chamber and the atmosphere external to vapor deposition chamber. The perforated plate 37 measured about 0.25 inch (6.4 mm) thick, had an outer diameter of about 1.75 inches (44.5 mm) and had three equally spaced holes for communicating with the atmosphere external to the vapor deposition chamber. Each hole 45 through perforated plate 37 had an about 0.4 inch (10 mm) diameter. The perforated plate 37 was secured with RIGIDLOCK ® graphite cement within stack portion tube 36 about 1.38 inches (35 mm) from the inner surface of upper chamber portion 32. The Grade GH graphite felt 40 (Fiber Materials, Inc. Biddeford, Me.) had a thickness of about 0.125 inch (3.2 mm) and was wrapped around the outer diameter and along the length of stack portion tube 36.

The closed end tube 41 measured about 4 inches (102 mm) long, had an outer diameter of about 3 inches (76 mm), and had a wall thickness of about 0.25 inch (6.4 mm). The closed end tube 41 was placed over stack portion tube 36 to secure graphite felt 40.

The parent metal source trays were machined from Grade ATJ graphite. One parent metal source tray 34 measured about 3.5 inches (89 mm) long, about 3.5 inches (89 mm) wide, about 1 inch (25 mm) high and had a wall thickness of about 0.25 inch (6.4 mm). The parent metal source tray 34 was placed in one corner of lower chamber portion 31. The three additional parent metal source trays 33 (only one shown in FIG. 1) measured about 2.5 inches (64 mm) long, 2.5 inches (64 mm) wide, 1 inch (25 mm) high and had a wall thickness of about 0.25 inch (6.4 mm). The three additional parent metal source trays 33 were placed in the remaining space of the bottom of lower chamber portion 31. All the parent metal source trays 34 and 33 were filled with titanium metal sponge material 46 to a depth ranging from about 0.25 inch (6.4 mm) to about 0.38 inch (9.7 mm) and therefore a total weight of about 100 grams.

The edges of a graphite substrate coupon of Grade AXZ-5Q graphite material (Poco Graphite, Inc., Decatur, Tex.), measuring about 1 inch (25 mm) long, about 1 inch (25 mm) wide and about 0.2 inch (5.1 mm) thick, were smoothed by sanding with 400 grit (average particle size of about 23 μm) silicon carbide paper. All the surfaces of the graphite substrate coupon were roughened by sanding with 1200 grit (average particle size of about 4 μm) silicon carbide paper. The sanded graphite substrate coupon 47 was then cleaned for about 15 minutes in an ultrasonically agitated bath of acetone and dried in an air oven set at about 120° C. for about 0.5 hour. After drying substantially completely, the graphite substrate coupon 47 was placed on support rods 35 within lower chamber portion 31 and upper chamber portion 32 was placed in contact with lower chamber portion 31 to form the vapor deposition chamber. The Grade GH graphite felt 42 measured about 8 inches (203 μm) wide and had an about 0.125 inch (3.2 mm) thickness. The graphite felt 42 was wrapped around the outer perimeter of the vapor deposition chamber twice. Graphite clamps 48 were used to secure the graphite felt 42 to the vapor deposition chamber 30, thus completing the formation of the setup. The setup was then placed into a larger containment graphite boat 43 to form a lay-up.

The lay-up and its contents were then placed into a vacuum furnace and the vacuum furnace door was closed. The vacuum furnace was then evacuated to a pressure of about 0.2 millitorr. After about 50 minutes at about 0.2 millitorr, the vacuum furnace and its contents were heated to about 500° C. at about 250° C. per hour while maintaining a pressure less than about 60 millitorr. The vacuum furnace was then heated from about 500° C. to about 1000° C. at about 500° C. per hour while maintaining a pressure less than about 60 millitorr. At about 1000° C., the pressure within the vacuum furnace was allowed to increase to between about 60 millitorr to about 250 millitorr and the vacuum furnace and its contents were heated from about 1000° C. to about 1900° C. at about 500° C. per hour. After about 2 hours at about 1900° C. with a pressure ranging from about 60 millitorr to about 250 millitorr, the vacuum furnace and its contents were cooled at about 350° C. per hour to about room temperature while maintaining a pressure ranging from about 60 millitorr to about 250 millitorr. At about room temperature, the vacuum pump was turned off, the vacuum furnace was allowed to adjust to atmospheric pressure and the lay-up and its contents were removed from the furnace.

Figure 2A:
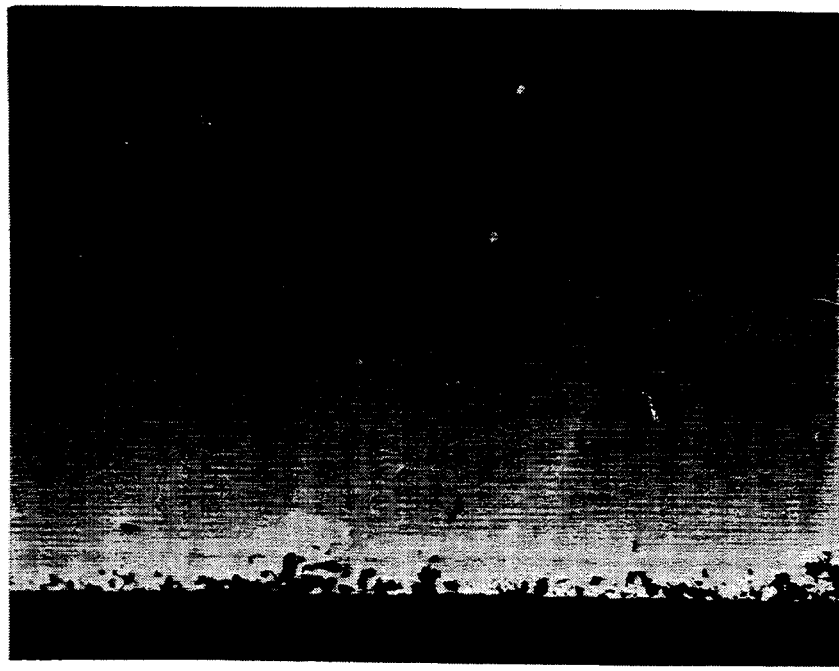
FIG. 2a is a photomicrograph taken at 400× of a sample made in accordance with Example 1.
Figure 2B:
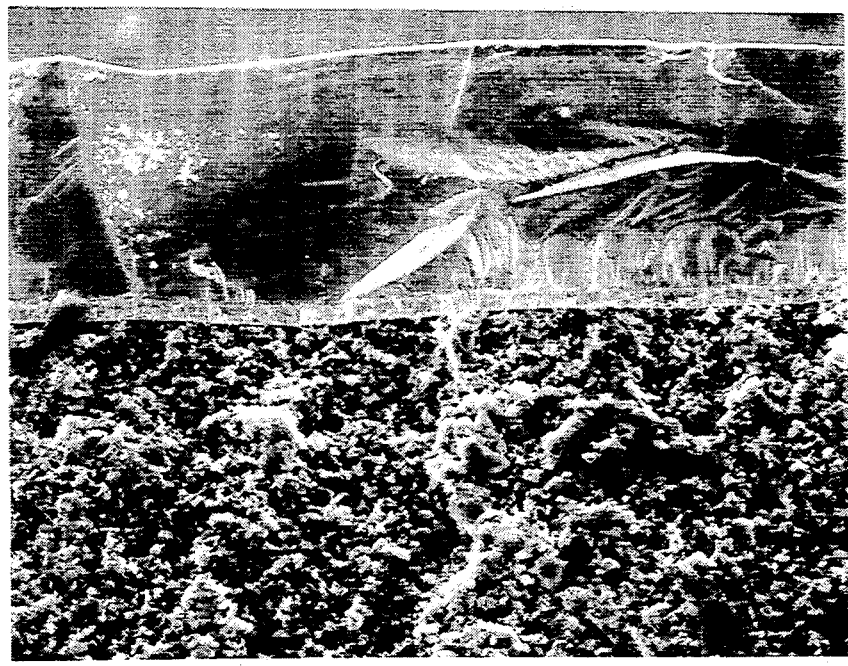
FIG. 2b corresponds to a fractograph taken at 200× corresponding to fractured sample made in accordance with Example 1.

After the setup was disassembled, the graphite substrate coupon was removed from the lower chamber portion 31 of the vapor deposition chamber 30 and it was noted that a mirror like finish coated the surface of the graphite substrate coupon. Results of x-ray diffraction analysis of the ceramic composite coating indicated that constituents of the ceramic composite coating included, among other phases, TiC and C. The graphite substrate coupon was then cut, mounted and polished for metallographic examination as well as examination in a scanning electron microscope. Specifically, FIG. 2a is a microstructure taken at about 400× of the ceramic composite coating 51 on the graphite substrate coupon 52 and FIG. 2b is a fractograph taken at about 200× in a scanning electron microscope of the composite coating 51 on the graphite substrate coupon 52.

EXAMPLE 2

This Example further demonstrates a method for forming a reaction product coating on a graphite substrate by reacting a parent metal vapor with a graphite substrate at an elevated temperature.

Figure 3:
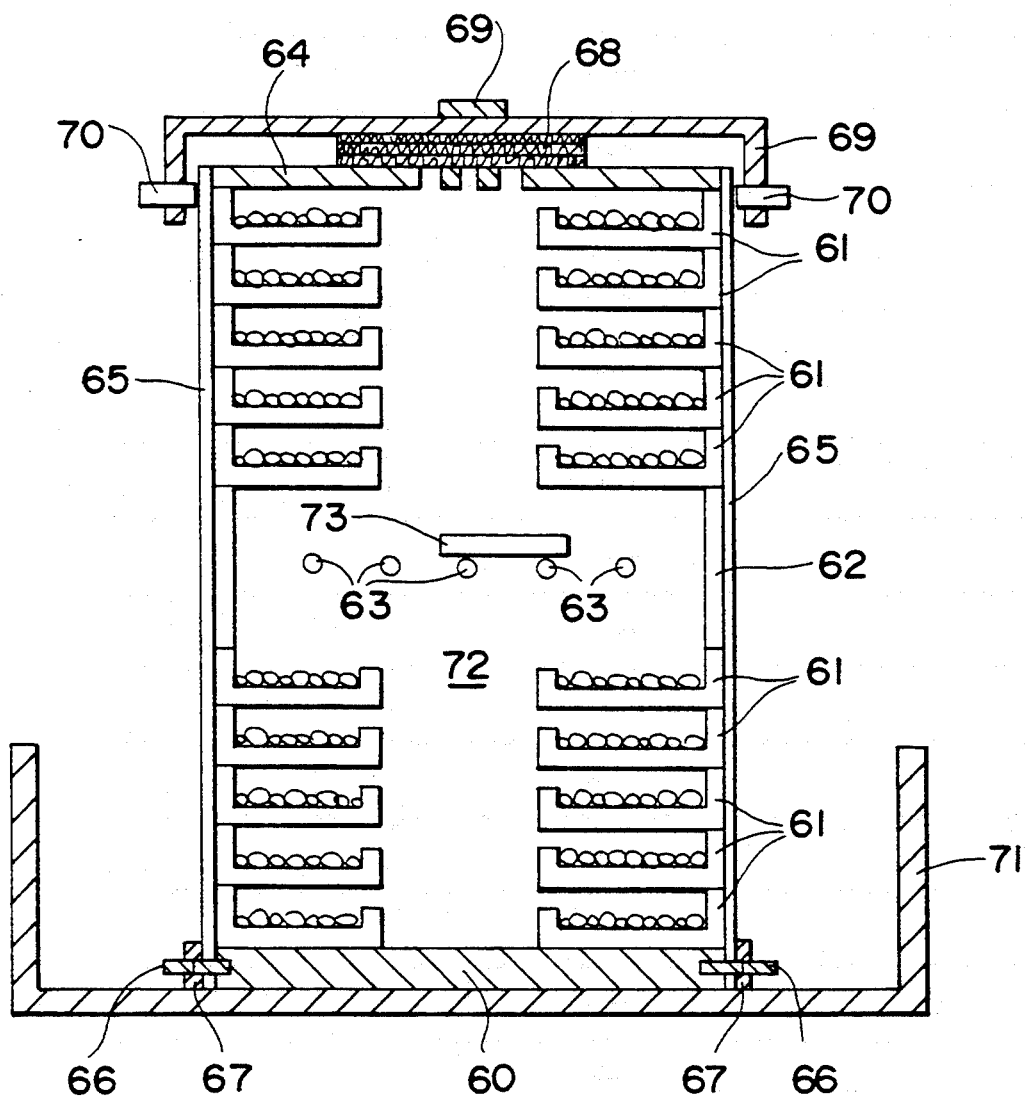
FIG. 3 comprises a schematic cross-sectional view of an assembly utilized to form a body in accordance with the present invention.

FIG. 3 is a cross-sectional schematic of the lay-up used to form a reaction product coating on a graphite substrate coupon. Specifically, FIG. 3 is a cross-sectional schematic of a vapor deposition chamber 72 in a containment graphite boat 71. The vapor deposition chamber 72 was comprised of a graphite plate 60, ten stackable source trays 61, a substrate support chamber portion 62, five substrate supporting rods 63 attached to side walls of stackable support chamber portion 62, a graphite lid 64 having holes therein, a graphite felt 68 substantially covering the holes in graphite lid 64, four stackable module alignment rods 65 attached to graphite plate 60 by threaded graphite rod 66 and fastened with nut 67, stackable module alignment clamps 69 engaging stackable module alignment rods 65 via set screw 70.

More specifically, graphite plate 60 was made from Grade ATJ graphite (Union Carbide Corporation, Carbon Products Division, Cleveland, Ohio). Additionally, graphite plate 60 measured about 6.5 inches (165 mm) long, 6.5 inches (165 mm) wide, and 0.5 inches (13 mm) thick. The mid points of the face of graphite plate 60 that measured about 6.5 inches (165 mm) long and about 0.5 inches (13 mm) high were drilled and tapped to accept the threaded graphite rod 66.

Stackable parent metal source trays 61 measured about 6.5 inches (165 mm) long, about 6.5 inches (165 mm) wide, 0.75 inches (19 mm) high and had a wall thickness of about 0.25 inches (6.4 mm). A hole substantially in the center of the 6.5 inch (165 mm) long and 6.5 inch (165 mm) wide portion of stackable parent metal source tray 61 measured about 2 inches (51 mm) long and about 2 inches (51 mm) wide. Along the perimeter the 2 inches (51 mm) long and 2 inches (51 mm) wide hole was fastened with RIGIDLOCK® graphite cement (Polycarbon Corporation, Valencia, Calif.), a 2.5 inches (64 mm) long, 2.5 inches (64 mm) wide, 0.25 inch (6.4 mm) high and 0.25 inch (6.4 mm) thick graphite rectangular frame in order to complete the formation of the stackable metal source trays 61.

Stackable substrate support chamber portion 62 measured about 6.5 inches (165 mm) long, 6.5 inches (165 mm) wide, 2.0 inches (51 mm) high, and had a wall thickness of about 0.25 inches (6.4 mm). Five substrate support rods 63, each having a diameter of about 0.38 inches (9.6 mm) and measuring about 6.5 inches (165 mm) long, were interference fit into the side walls of substrate support chamber portion 62. All of the support rods 63 were located about 1.0 inches (25 mm) from the bottom of the substrate support chamber portion 62. Additionally, each of the five support rods 63 were located about 1 inch (25 mm), about 2 inches (51 mm), about 3 inches (76 mm), about 4 inches (102 mm), and about 5 inches (127 mm), respectively from one side wall from the substrate support chamber portion 62 and extended from one side wall to the opposite side wall of the substrate support chamber portion 62. The support rods 63 formed a supporting means for holding the graphite substrate coupons during coating.

The graphite lid 64 measured about 6.5 inches (165 mm) long, about 6.5 inches (165 mm) wide, and about 0.25 inch (6.4 mm) thick. About 5 holes were substantially centrally located in graphite lid 64 and provided a means for communicating with the atmosphere external to vapor deposition chamber 72. Each hole measured about 0.25 inches in diameter.

Vapor deposition chamber 72 was assembled by first placing graphite plate 60 on a leveled table top. A designated number of stackable parent metal source trays 61, made of graphite, were then filled with about 250 grams of a zirconium sponge material (Western Zirconium, Ogden, Utah) having a diameter ranging from about 0.033 inch (0.84 mm) to about 0.25 inch (6.4 mm). The zirconium sponge material was evenly distributed within each stackable parent metal source tray. Five stackable parent metal source trays 61 were placed one on the other, on the graphite plate 60 and were substantially aligned. A substrate support chamber portion 62 was then placed onto and aligned with the give stackable parent metal source trays 61. A graphite substrate coupon 73, substantially the same as and prepared in substantially the same manner as the graphite substrate coupon described in Example 1, was placed within the substrate support chamber portion 62 on substrate support rods 63. The five additional stackable parent metal source trays 61, each having about 250 grams of a zirconium sponge material therein, were stacked above the substrate support chamber portion 62. The graphite lid 64 was then placed on top of the upper most stackable parent metal source tray 61. Four stackable module alignment bars 65, measuring about 10.25 inches (260 mm) long, 2.0 inches (51 mm) wide, and about 0.38 inch (9.6 mm) thick and having a hole at one end for receiving threaded graphite rod 66 were placed over and secured to threaded graphite rod 66 to substantially align the ten stackable parent metal source tray 61 and the substrate support chamber portion 62 and the graphite lid 64. At least three layers of Grade GH graphite felt 68 (Fiber Materials, Inc., Biddeford, Mass.) measuring about 0.125 inches (3.2 mm) thick were placed over the holes in graphite lid 64. A first module alignment clamp 69 measuring about 8 inches (203 mm) long, 1 inch (25 mm) wide and about 0.25 inch (6.4 mm) thick with extending end portions measuring about 1 inch (25 mm) long, 1 inch wide (25 mm) and about 0.5 inch (1.3 mm) thick, was placed in contact with graphite felt 68 such that extending end portion containing set screw 70 aligned with stackable module alignment bar 65. Set screw 70 in module alignment clamp 69 was then adjusted to secure stackable module alignment bar 65 against graphite lid 64, stackable parent metal source trays 61 and substrate support chamber portions 62. A second module alignment clamp 69 was placed in contact with and perpendicular to the first module alignment clamp 69 and the sets screws 70 were tighten to a second set of stackable module alignment bars 65 aligning graphite lid 64, substrate support chamber 62, and stackable parent metal source trays 61 and completing the formation of the set-up. The set-up comprising the vapor deposition chamber was then placed into a containment graphite boat 71 to form a lay-up.

The lay-up and its contents were placed in a vacuum furnace and the vacuum furnace door was closed. The vacuum furnace was evacuated in about 15 minutes and then filled with argon. After the vacuum furnace was substantially completely filled with argon, the vacuum furnace was evacuated to a pressure of about 0.12 millitorr. The vacuum furnace and its contents were then heated to about 1000° C. at about 350° C. per hour while maintaining a pressure less than about 60 millitorr. The furnace was then heated from about 1000° C. to about 2000° C. at about 350° C. per hour while maintaining a pressure between about 60 millitorr and about 250 millitorr. After about 5 hours at about 2000° C. with a pressure ranging from about 60 millitorr to about 250 millitorr, the vacuum furnace and its contents were cooled at about 350° C. per hour to about room temperature. At about room temperature, the vacuum pump was turned off, the vacuum furnace was allowed to come to atmospheric pressure, and the lay-up and its contents were removed from the vacuum furnace.

After the setup was disassembled, the graphite substrate coupon was removed from within the substrate support chamber portion 62 of the vapor deposition chamber 72 and it was noted that a metallic like finish coated the graphite substrate coupon. The graphite substrate coupon was cut, mounted and polished for metallographic examination. Specifically, the examination of the ceramic composite coating using optical microscopy revealed that a ceramic composite coating thickness of about 73 μm had been formed on the graphite substrate coupon. Analysis of the ceramic composite coating by x-ray diffraction indicated that constituents of the ceramic composite coating included, among other phase, ZrC and C.

EXAMPLE 3

The following Example demonstrates a method for forming a reaction product coating comprising a ceramic matrix composite coating on a graphite substrate by applying to the surface of a graphite substrate a mixture comprising a parent metal powder and a boron carbide powder and heating the powder covered graphite substrate in the presence of a parent metal vapor to permit a reaction between the parent metal powder, the boron carbide, the parent metal vapor and/or the graphite substrate.

The method of Example 1 was substantially repeated except that a smaller vapor deposition chamber was used. Specifically, the outer dimensions of the smaller vapor deposition chamber measured about 3.5 inches (89 mm) long, 3.5 inches (89 mm) wide and about 7 inches (178 mm) high and the stack portion measured about 3.25 inches (83 mm) long, had an about 1.25 inches (32 mm) diameter and had a wall thickness of about 0.25 inch (6.4 mm). Only one graphite parent metal source tray measuring about 2.5 inches (64 mm) long, 2.5 inches (64 mm) wide, 1 inch (25 mm) high and having a wall thickness of about 0.25 inch (6.4 mm), was placed in the bottom of the lower chamber portion of the smaller vapor deposition chamber.

A substrate coupon of Grade AXZ-5Q graphite (Poco Graphite, Inc., Decatur, Tex.), measuring about 1 inch (25 mm) long, about 1 inch (25 mm) wide and about 0.2 inch (5.1 mm) thick, was prepared for coating by hand sanding the edges of the substrate with 400 grit (average particle size of about 23 μm) silicon carbide abrasive paper until the edges were substantially smooth. All the surfaces of the graphite substrate coupon were toughened by sanding with 1200 grit (average particle diameter of about 4 μm) silicon carbide paper. The sanded graphite substrate coupon was then cleaned for about 15 minutes in an ultrasonically agitated both of acetone and dried in an air oven set at about 120° C. for about 0.5 hour. A slurry mixture comprised of by weight about 66.3% −325 mesh (particle size less than about 45 μm) zirconium powder (Consolidated Astronautics, Saddle Brook, N.J.), about 9.5% TETRABOB® M-16 1000 grit (average particle size of about 5 μm) boron carbide (ESK-Engineered Ceramics, New Canaan, Conn.), about 24.0% deionized water and about 0.2% XUS-40303.00 tertiary amide polymer ceramic binder (Dow Chemical Company, Midland, Mich.) was prepared by combining the slurry mixture components in a plastic jar and roll mixing on a jar mill for at least 2 hours. A portion of the slurry mixture was applied onto one of the toughened surfaces of the graphite substrate coupon. Three separate coats of the slurry mixture were applied onto the toughened surface. Each application of the slurry mixture was allowed to air dry before the next application was made. After the three slurry mixture applications had substantially completely air dried to form a powder coating, the powder coated graphite substrate coupon was placed in a forced air oven set at about 45° C. After about 0.5 hour at about 45° C., the powder coated graphite substrate coupon was moved to a second forced air oven set at about 120° C. for about an additional 0.5 hour. After drying, the powder coating thickness on the graphite substrate coupon measured about 0.07 inch (432 μm) and weighed about 0.39 grams. As in Example 1, the setup was placed into a larger containment graphite boat to form the lay-up.

The lay-up and its contents were placed into a vacuum furnace and the furnace door was closed. The vacuum furnace was evacuated in about 15 minutes and then filled with argon. After the vacuum furnace was substantially completely filled with argon, the vacuum furnace was evacuated to a pressure of about 0.12 millitorr. The vacuum furnace and its contents were then heated to about 1000° C. at about 350° C. per hour while maintaining a pressure less than about 60 millitorr. The vacuum furnace was then heated from about 1000° C. to about 2000° C. at about 350° C. per hour while maintaining a pressure ranging from about 60 millitorr to about 250 millitorr. After about 5 hours at about 2000° C. with a pressure ranging from about 60 millitorr to about 250 millitorr, the vacuum furnace and its contents were cooled at about 350° C. per hour to about room temperature. At about room temperature, the vacuum pump was turned off, the vacuum furnace was allowed to come to about atmospheric pressure, and the lay-up and its contents were removed from the vacuum furnace.

Figure 4A:
FIG. 4a is a photomicrograph taken at 100× of a body made in accordance with Example 3.
Figure 4B:
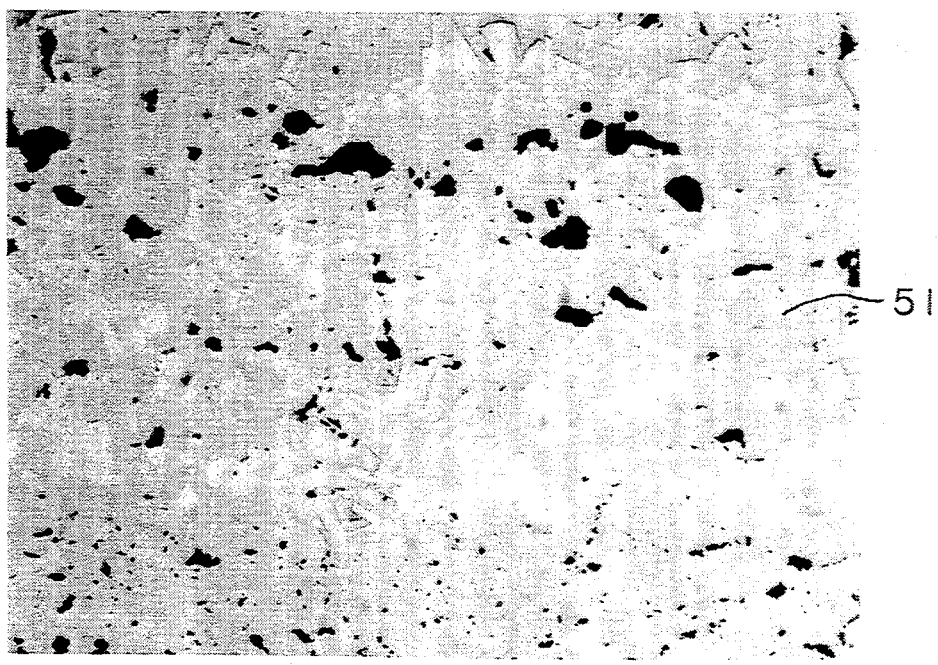
FIG. 4b is a photomicrograph taken at 400× of a sample made in accordance with Example 3.

After the setup was disassembled, the graphite substrate coupon was removed from the lower chamber portion of the smaller vapor deposition chamber and it was noted that a metallic like finished coated the surface of the graphite substrate. The graphite substrate was then cut, mounted and polished for metallographic examination. Specifically, FIG. 4a is a microstructure taken at about 100× of the ceramic composite coating 51 on the graphite substrate 52. FIG. 4b is a microstructure taken at about 400× of the ceramic composite coating illustrating the platelet morphology of the ceramic composite coating 51.

EXAMPLE 4

The following Example demonstrates a method for forming a reaction product coating on a graphite substrate by applying to the surface of the graphite substrate a mixture comprising a boron powder and heating the powder covered graphite substrate in the presence of a parent metal vapor to permit the reaction between the boron powder, the parent metal vapor and/or the graphite substrate.

The method of Example 1 was substantially repeated except for the methods of preparing and coating the surface of the graphite substrate coupon. Specifically, the surface of the Grade AXZ-5Q graphite substrate coupon was abraded with 1200 grit (average particle size of about 4 μm) silicon carbide paper to smooth all the surfaces. The sanded graphite substrate coupon was then cleaned for about 15 minutes in an ultrasonically agitated bath of acetone and dried in a forced air oven set at about 120° C. for about 0.5 hours. After drying substantially completely, the graphite substrate coupon was coated with a solution comprised of by weight about 10 percent GAF® PVP K-15 polyvinyl pyrrolidone (GAF Chemical Corporation, Wayne, N.J.) and ethanol. After allowing the coating on the surface of the graphite substrate coupon to air dry for about 15 minutes, the graphite substrate coupon was placed in a forced air oven set at about 120° C. After about 0.5 hour at about 120° C., the graphite substrate coupon was removed from the forced air oven and cooled to about room temperature. At about room temperature, one side of the graphite substrate coupon was coated with a slurry comprised of by weight between about 20 to 30 percent submicron boron powder (Callery Chemical Co., Callery, Pa.) and the balance ethanol. Excess slurry was wiped off the side of the graphite substrate coupon and the graphite substrate coupon was substantially dried. At about room temperature, the graphite substrate coupon was again coated with a solution comprised of by weight of about 75 to about 85 percent ELMER'S® professional carpenter's wood glue and the balance deionized water. The graphite substrate coupon was then swabbed with an additional amount of deionized water. While the wood glue deionized water solution was still wet, −325 mesh (particle diameter less than about 45 μm) boron powder (Consolidated Astronautics, Inc. Saddle Brook, N.J.) was hand sifted onto one surface of the graphite substrate coupon. Excess boron powder, that had not adhered to the surface of the graphite substrate coupon, was brushed off with a camel's hair brush. The powder coated graphite substrate coupon was then placed in a forced air oven set at about 45° C. After about 0.5 hour at about 45° C., the powder coated graphite substrate coupon was moved to a second forced air oven set at about 120° C. After about 0.5 hour at about 120° C. in the second forced air oven, the powder coated graphite substrate coupon was removed and allowed to cool to about room temperature. Once at about room temperature, the powder coated graphite substrate coupon was placed onto the substrate support rods 35 (refer to FIG.

1) within the lower chamber portion 30 of the vapor deposition chamber 32 and the upper chamber portion 32 was placed over the lower chamber portion.

Additional exceptions of this Example relative to Example 1 were that the titanium sponge material (Oregon Metallurgical Corporation, Albany, Ore.) weighing about 400 grams, was not placed into a graphite metal source trays but directly into the bottom of the lower chamber portion 31 of the vapor deposition chamber 30 and the stack portion 36 of the vapor deposition chamber was not covered with dosed end crucible 41. The vapor deposition chamber 30 was placed into a containment graphite boat 43 to complete the formation of the lay-up.

The lay-up and its contents were placed into a vacuum furnace and the vacuum furnace door was closed. The vacuum furnace was then evacuated. After about 0.5 hour under a pressure less than about 60 millitorr, the vacuum furnace was heated to about 500° C. at about 250° C. per hour and then from about 500° C. to about 1000° C. at about 500° C. while maintaining a pressure less than 60 millitorr. At about a 1000° C., the pressure was allowed to increase to between about 60 millitorr and about 250 millitorr and the vacuum furnace was heated to about 1900° C. at about 500° C. per hour. After about 2.5 hours at about 1900° C., while maintaining a pressure between about 60 millitorr and about 250 millitorr, the vacuum furnace and its contents were cooled to about room temperature at about 350° C. per hour. At about room temperature, the vacuum pump was turned off, the vacuum furnace was allowed to come to about atmospheric pressure, and the lay-up and its contents were removed from the vacuum furnace.

Figure 5:
FIG. 5 is a photomicrograph taken at 400× of a sample made in accordance with Example 4.

After the lay-up was disassembled, the graphite substrate coupon was removed from within the lower chamber portion of the vapor deposition chamber and it was noted that a metallic appearing finish coated the graphite substrate coupon. The graphite substrate coupon was then cut, mounted and polished for metallographic examination. Specifically, the examination of the ceramic coating by optical microscopy revealed that a coating thickness of about 200 μm had been formed. Results of x-ray diffraction analysis indicated that ceramic composite coating comprised among other phases, $TiB_2$ and TiC. Specifically, FIG. 5 is a microstructure taken at about 400× of the ceramic composite coating 51 on the graphite substrate coupon 52.

EXAMPLE 5

The following Example demonstrates a method for forming a reaction product coating on a graphite substrate by applying to the surface of a graphite substrate a boron carbide powder and heating the powder covered substrate in the presence of a parent metal vapor to permit the reaction between the boron carbide power, the parent metal vapor and/or the graphite substrate.

The method of Example 1 was substantially repeated except for the methods of preparing and coating the surface of the graphite substrate coupon. Specifically, a solution comprised by weight of about 6 percent EL-VACITE ® 2045 acrylic resin (E.I. du Pont de Nemours and Company, Inc., Wilmington, Del.), 0.06 percent n-butyl phthalate (Fisher Scientific Company, Pittsburgh, Pa.), about 42.28 percent isopropyl alcohol, and about 51.66 percent ethylene glycol monobutyl ether (Textile Chemical Company, Reading, Pa.), was combined in a plastic jar and placed on a shaker to effect mixing. After about 0.5 hour on a shaker, the plastic jar was removed to a slow roll jar mill. After about 1 hour on the slow roll jar mill, an amount of TETRABOR ® 1000 grit (average particle diameter 5 μm) boron carbide powder (ESK Engineered Ceramics, New Canaan, Conn.) was added to the solution to make a slurry mixture comprising by weight about 50% boron carbide and about 50% solution. The plastic jar was replaced to the slow roll jar mill to suspend the boron carbide in the solution and thereby form a slurry mixture. After at least about an 0.5 hour on the slow roll jar mill, a slurry mixture was formed and applied to the surface of the graphite substrate coupon that had been prepared as described in Example 4. After the slurry mixture on the graphite substrate coupon had substantially dried, the powder covered graphite substrate coupon was placed into the graphite support rods in the lower portion of the vapor deposition chamber. The vapor deposition chamber was then placed into a containment graphite boat to complete the formation of the lay-up.

The lay-up and its contents were placed in a vacuum furnace and the vacuum furnace door was closed. The vacuum furnace was evacuated to a pressure of about 0.12 millitorr. After about 25 minutes at about 0.12 millitorr, the vacuum furnace and its contents were heated from about room temperature to about 500° C. at about 250° C. per hour and then from about 500° C. to about 1000° C. at about 500° C. per hour while maintaining a pressure less than about 60 millitorr. The vacuum furnace was then heated from about 1000° C. to about 1900° C. at about 500° C. per hour while maintaining a pressure between about 60 millitorr and about 250 millitorr. After about 2 hours at about 1900° C. with a pressure ranging between about 60 millitorr and about 250 millitorr, the vacuum furnace and its contents were cooled at about 350° C. per hour to about room temperature. At about room temperature, the vacuum pump was turned off and the vacuum furnace pressure was allowed to increase to about atmospheric pressure. At about room temperature and the lay-up and its contents were removed from the vacuum furnace. The setup was disassembled and the graphite substrate coupon was removed from within the lower chamber portion of the vapor deposition chamber. It was noted that a metallic appearing finish coated the surface of the graphite substrate coupon. Results of x-ray diffraction analysis indicated that the ceramic composite coating comprised, among other phases, TiC, $TiB_2$, and $B_4C$.

EXAMPLE 6

The following Example demonstrates a method for forming a reaction product coating on a graphite substrate by applying to the surface of a graphite substrate an additional powder and heating the powder covered graphite substrate in the presence of a parent metal vapor to permit the incorporation of the additive powder in a ceramic composite coating formed by the reaction between the parent metal vapor and the graphite substrate. Table I contains a summary for Sample A through Sample O of the additive powder size and composition, the thickness of the additive powder coating, the processing temperature to effect the formation of the ceramic composite coating, the processing time to effect to the formation of the ceramic composite coating and the thickness of the ceramic composite coating on a graphite substrate.

Specifically, the composition of the additive powders placed onto graphite substrate coupons included: about −325 mesh (particle diameter less than about 45 μm) titanium carbide (Atlantic Equipment Engineers, Bergenfield, N.J.); about 1–5 μm particle diameter titanium diboride (Atlantic Equipment Engineers, Bergenfield, N.J.); about 14.4 μm average particle diameter silicon tetraboride (Atlantic Equipment Engineers, Bergenfield, N.J.); about −325 mesh (particle diameter less than about 45 μm) silicon hexaboride (Consolidated Astronautics, Inc., Saddle Brook, N.J.), about 12.6 μm average particle diameter hafnium diboride (Vat Lac Oid Chemical Co., Inc., Bergenfield, N.J.); about −325 mesh (particle diameter less than about 45 μm) tungsten monoboride (Cerac, Inc., Milwaukee, Wisc.); about −325 mesh (particle diameter less than about 45 μm) di-tungsten pentaboride (Cerac, Inc., Milwaukee, Wisc.); about −325 mesh (particle diameter less than about 45 μm) tantalum diboride (Atlantic Equipment Engineers, Bergenfield, N.J.); about 1–5 μm particle diameter titanium nitride (Atlantic Equipment Engineers, Bergenfield, N.J.), about 1–5 μm particle diameter zirconium nitride (Atlantic Equipment Engineers, Bergenfield, N.J.), about −325 mesh (particle diameter less than about 45 μm) pentatitanium trisilicide (Atlantic Equipment Engineers, Bergenfield, N.J.), about 1–5 μm mesh particle diameter titanium disilicide (Atlantic Equipment Engineers, Bergenfield, N.J.), about 1–5 μm molybdenum disilicide (Atlantic Equipment Engineers, Bergenfield, N.J.), about −100 mesh (particle diameter less than 150 μm) molybdenum (Consolidated Astronautics Co., Inc., Saddle Brook, N.J.) and about −325 mesh (particle diameter less than about 45 μm) rhenium (Rembar Co., Dobbs, N.Y.). The method of Example 1 was substantially repeated to prepare the graphite substrate coupon for coating and the method of Example 5 was substantially repeated for Sample A through Sample O in order to slurry coat and effect the formation of the ceramic composite coating on the graphite substrate coupons.

Figure 6A:
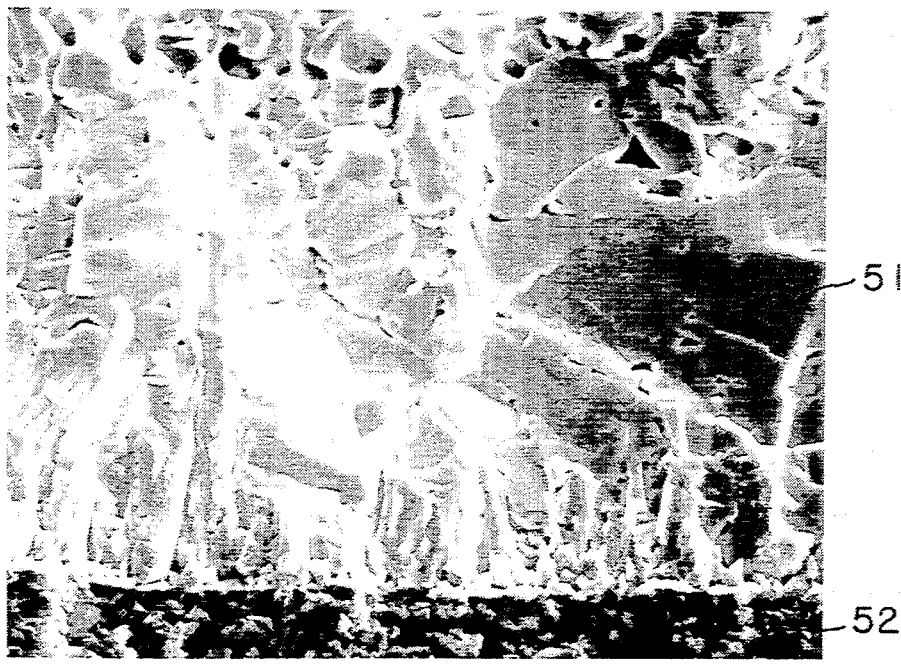
FIGS. 6a–6v are photomicrographs and fractographs taken at various magnifications (identified in specification) corresponding to samples made in accordance with Example 6.

As was done in Example 5, the ceramic composite coated graphite substrate coupons were cut, mounted and polished for metallographic examination and fracture surfaces of the ceramic composite coating on the graphite substrate coupon were examined using an electron microscope. Additionally, analysis of the ceramic composite coating by x-ray diffraction was performed. Specifically, FIG. 6a is a fractograph taken at about 500× the ceramic composite coating 51 on the graphite substrate coupon 52 corresponding to Sample A. Results of x-ray diffraction analysis indicated that the constituents of the ceramic composite coating on Sample A included, among other phases, TiC.

Figure 6B:
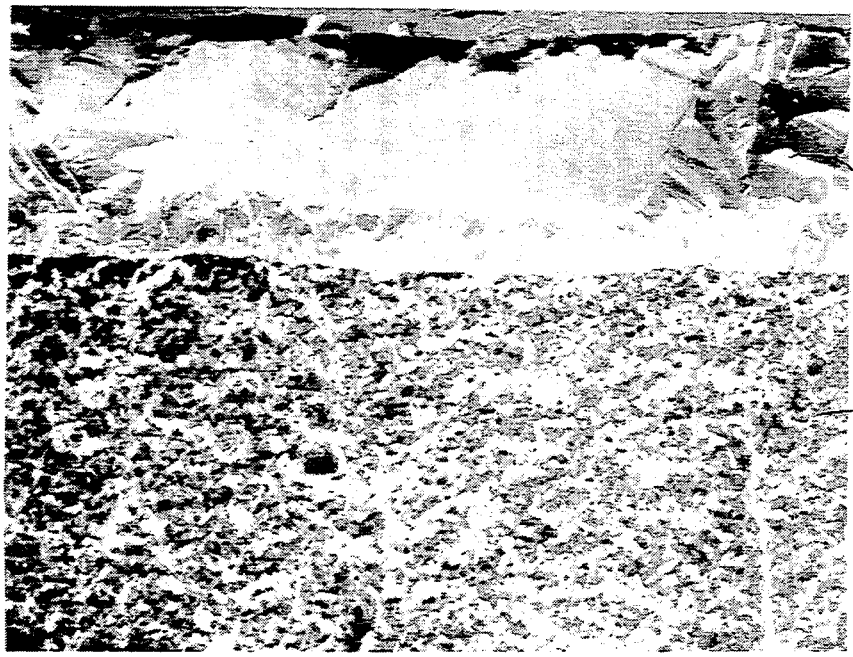
Figure 6C:

FIG. 6b is a fractograph taken at about 200× of the ceramic composite coating 51 on the graphite substrate coupon 52 and FIG. 6c is a photomicrograph taken at about 400× of the ceramic composite coating 51 on the graphite substrate 52 corresponding to Sample B.

Figure 6D:
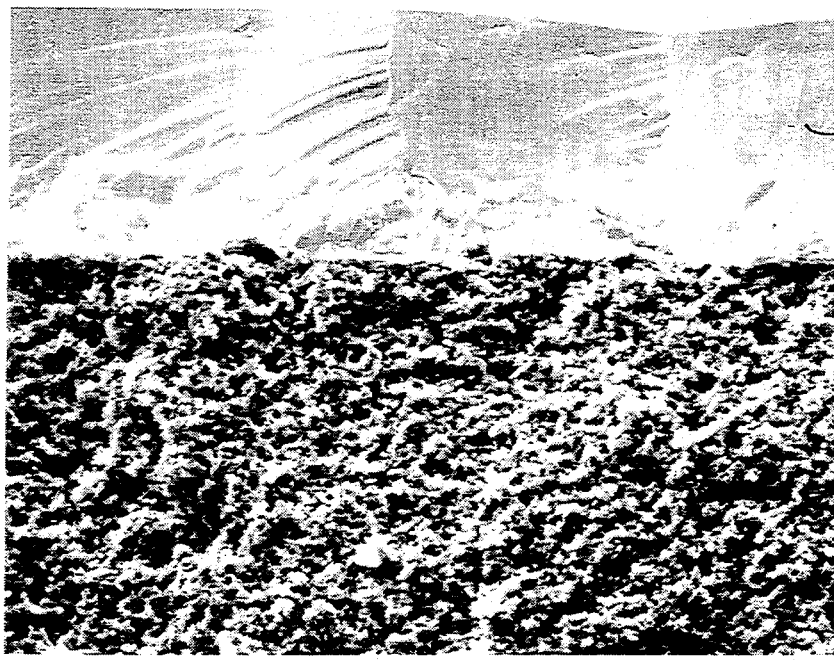
Figure 6E:
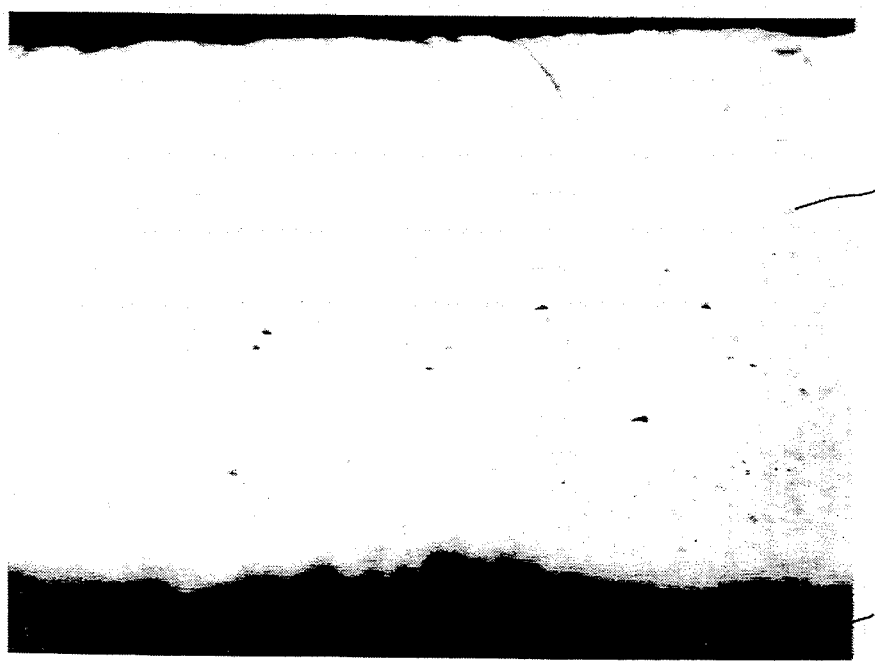

FIG. 6d is a fractograph taken at about 200× of the ceramic composite coating 51 on the graphite substrate coupon 52 and FIG. 6e is a photomicrograph taken at about 400× of the ceramic composite coating 51 on the ceramic substrate coupon 52 and corresponding to Sample C. Results of x-ray diffraction analysis indicated that the constituents in the area comprising the ceramic composite coating on Sample C included among other phases TiC, $SiB_4$ and C.

Figure 6F:
Figure 6G:
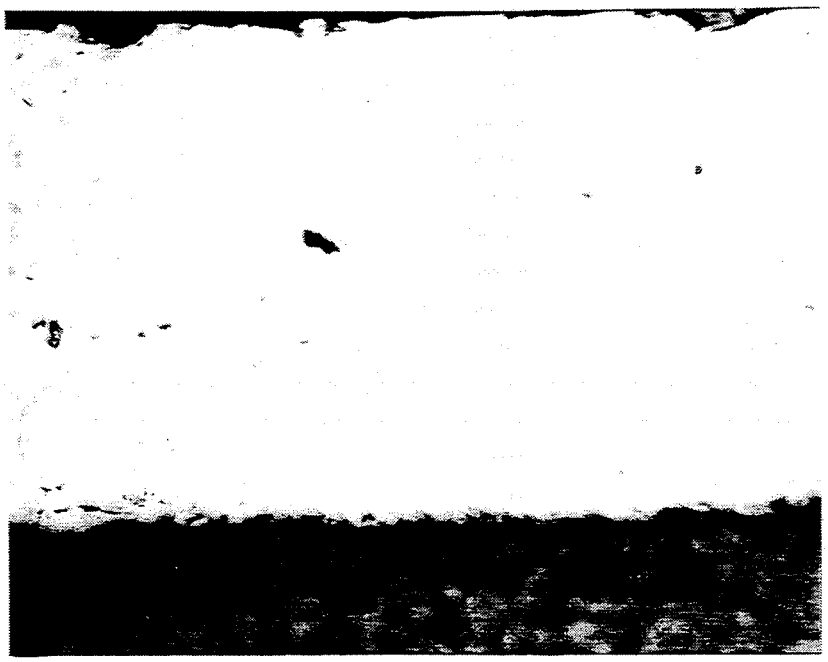

FIG. 6f is a fractograph taken at about 500× of the ceramic composite coating 51 on the graphite substrate coupon 52 and FIG. 6g is a photomicrograph taken at about 400× of the ceramic composite coating 51 ion the graphite substrate 52 corresponding to Sample D. Results of x-ray diffraction analysis indicated that the constituents in the area comprising the ceramic composite coating on Sample D included, among other phases, TiC, $TiB_2$ and C.

Figure 6H:
Figure 6I:
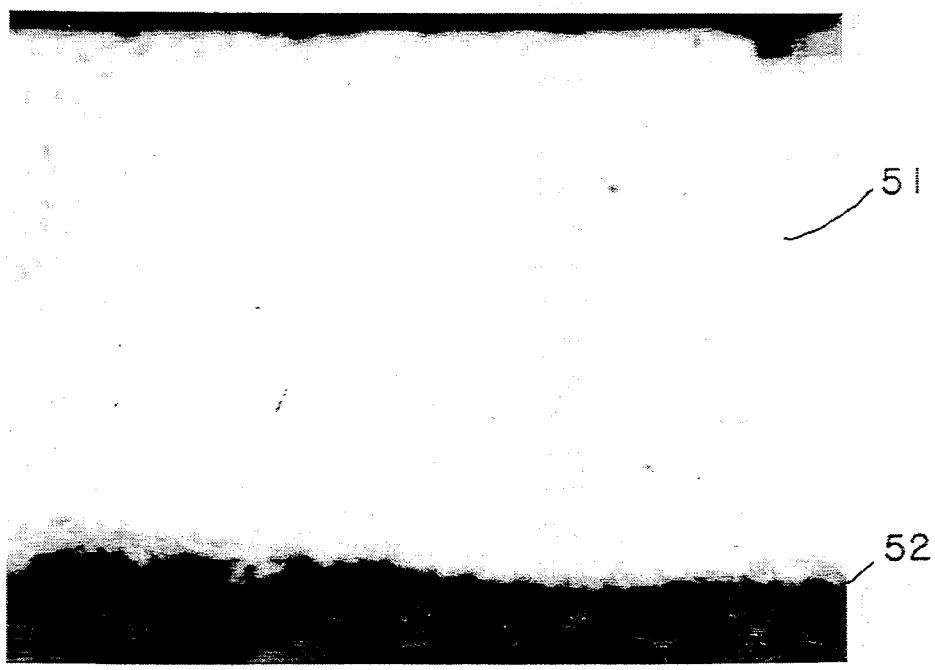

FIG. 6h is a fractograph taken at about 200× of the ceramic composite coating 51 on the graphite substrate 52 and FIG. 6i is a photomicrograph taken at about 400× of the ceramic composite coating 51 on the graphite substrate 52 and corresponding to Sample E. Results of x-ray diffraction analysis indicated that the constituents in the area comprising the ceramic composite coating on Sample E included, among other phases, TiC, C, and $HfB_2$.

Figure 6K:
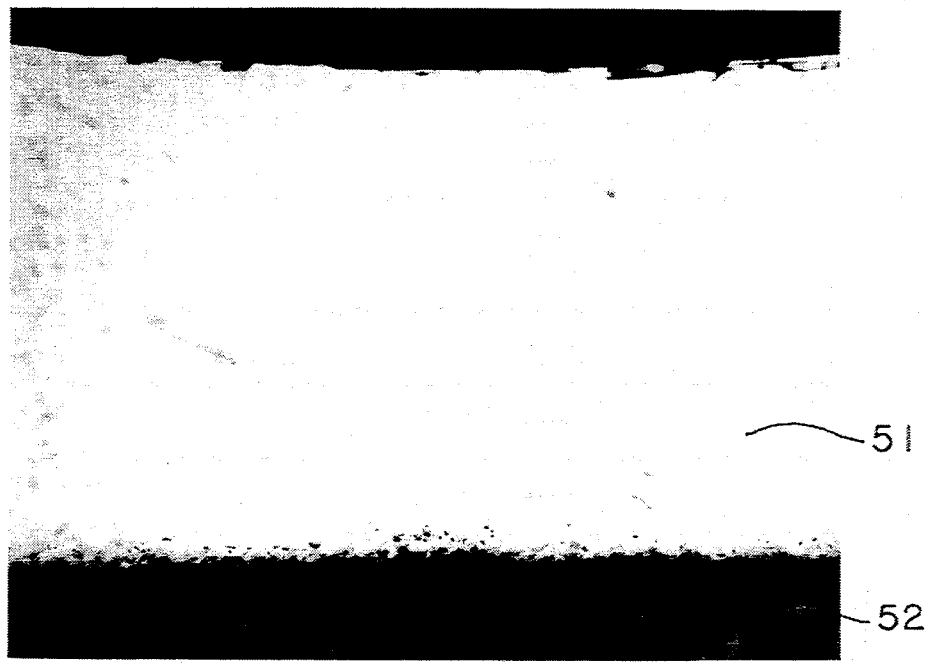
Figure 6J:
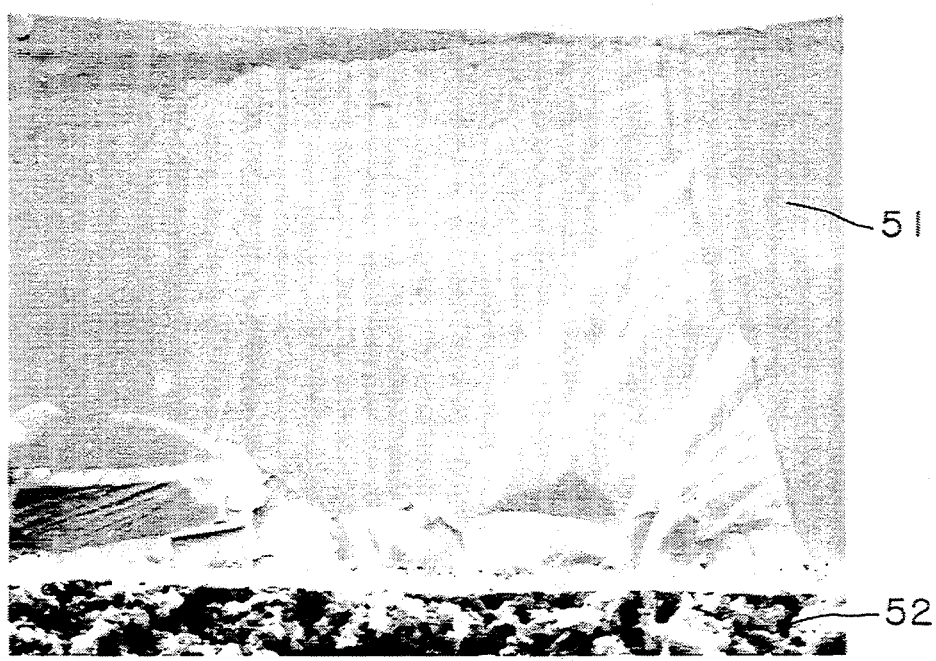

FIG. 6j is a fractograph taken at about 500× of the ceramic composite coating 51 on the graphite substrate coupon 52 and FIG. 6k is a photomicrograph taken at about 400× of the ceramic composite coating 51 on the graphite substrate coupon corresponding to Sample F. Results of x-ray diffraction analysis indicated that the constituents in the area comprising the ceramic composite coating on Sample F included, among other phases, titanium carbide and carbon.

Figure 6L:
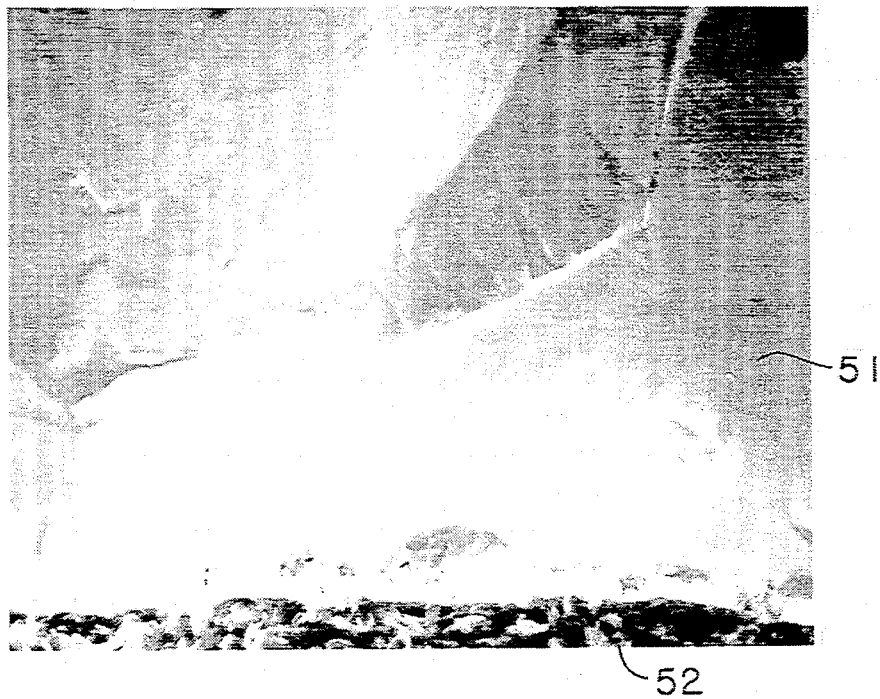
Figure 6M:

FIG. 6l is a fractograph taken at about 500× of the ceramic composite coating 51 on the graphite substrate coupon 52 and FIG. 6m is a photomicrograph taken at about 400× of the ceramic composite coating 51 on the graphite substrate coupon 52 corresponding to Sample G. Results of x-ray diffraction analysis indicated that the constituents in the area comprising the ceramic composite coating on Sample G included, among other phases, TiC and C.

Figure 6O:
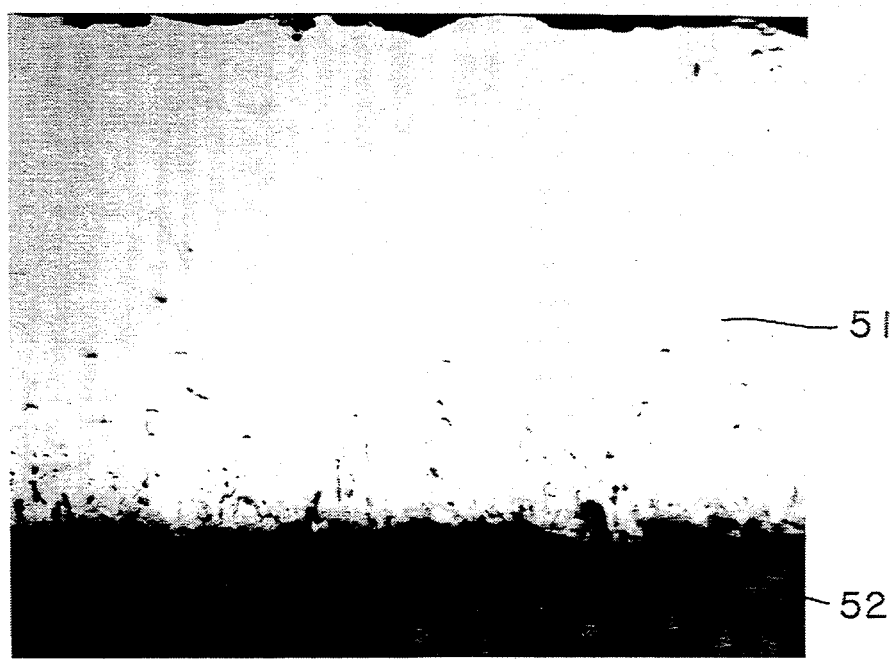
Figure 6N:
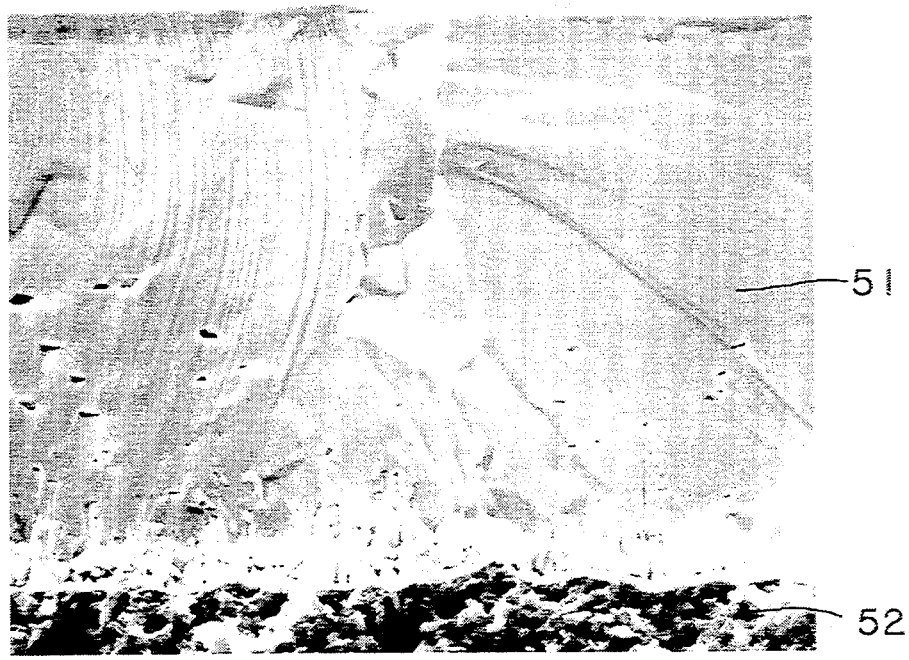

FIG. 6n is a fractograph taken at about 500× of the ceramic composite coating 51 on the graphite substrate 52 and FIG. 6o is a photomicrograph taken at about 400× of the ceramic composite coating 51 on the graphite substrate coupon 52 corresponding to Sample H.

Figure 6P:

FIG. 6p is a fractograph taken at about 200× of the ceramic composite coating 51 on the graphite substrate coupon 52 corresponding to Sample I. Results of x-ray diffraction analysis indicated that the constituents in the area comprising the ceramic composite coating on Sample I included, among other phases, TiC.

Figure 6Q:
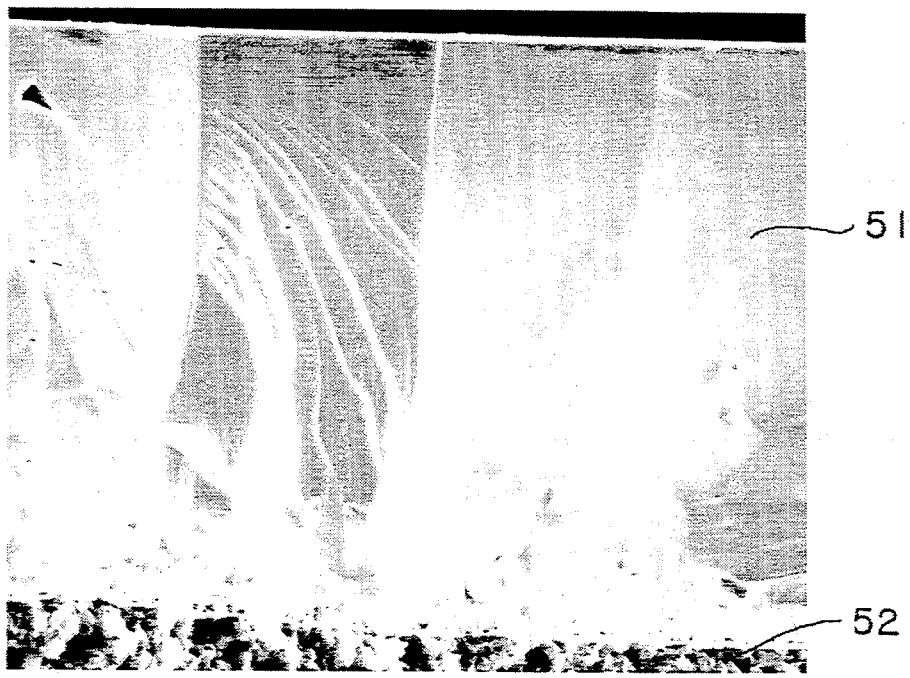
Figure 6R:
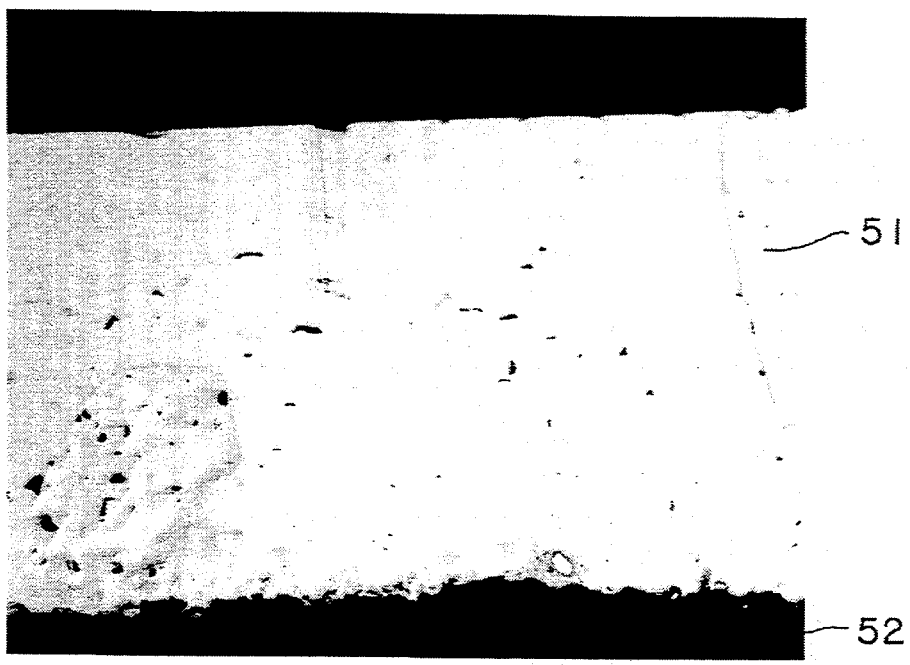

FIG. 6q is a fractograph taken at about 500× of the ceramic composite coating 51 on the graphite substrate 52 and FIG. 6r is a photomicrograph taken at about 400× of the ceramic composite coating 51 on the graphite substrate coupon 52 corresponding to Sample J. Results of x-ray diffraction analysis indicated that the constituents in the area comprising the ceramic composite coating on Sample J included, among other phases, TiC and C.

Figure 6S:
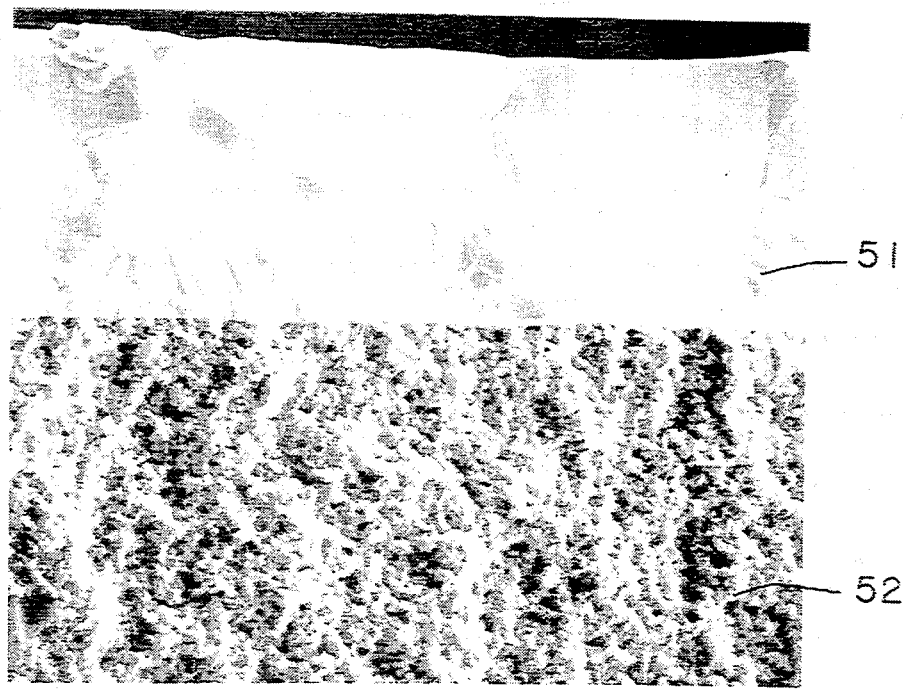

FIG. 6s is a fractograph taken at about 200× of the ceramic composite coating 51 on the graphite substrate coupon 52 corresponding to Sample K. Results of x-ray diffraction analysis indicated that the constituents in the area comprising the ceramic composite coating on Sample K included, among other phases, TiC and $Ti_5Si_3$.

Figure 6T:

FIG. 6t is a fractograph taken at about 200× of the ceramic composite coating 51 on the graphite substrate coupon 52 and corresponding to Sample M. Results of x-ray diffraction analysis indicated that the constituents in the area comprising the ceramic composite coating on Sample M included, among other phases, TiC.

Figure 6V:
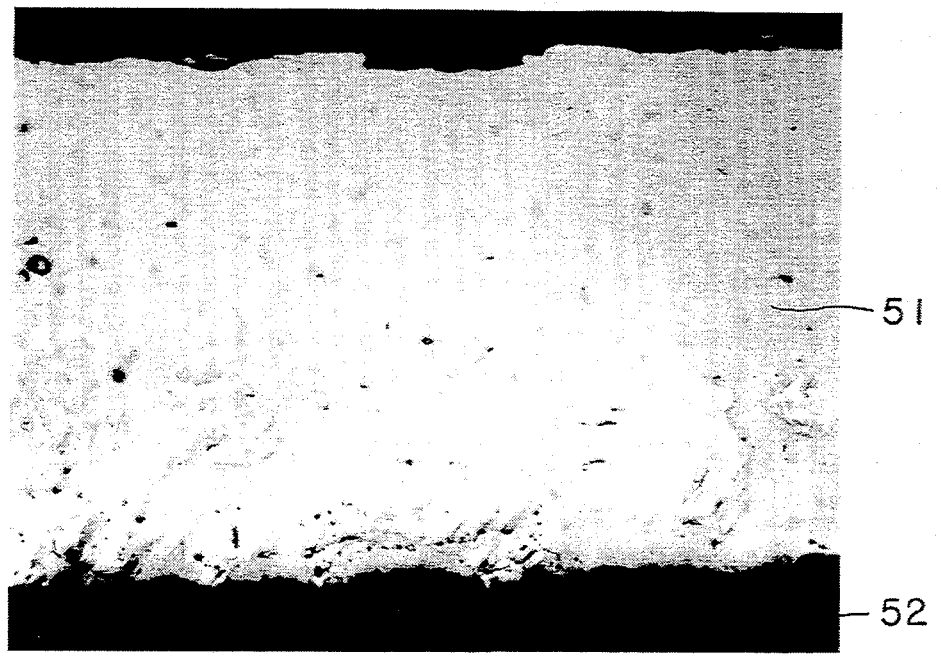
Figure 6U:

FIG. 6u is a fractograph taken at about 500× of the ceramic composite coating 51 on the graphite substrate coupon 52 and FIG. 6v is a photomicrograph taken at about 400× of the ceramic composite coating 51 on the graphite substrate coupon 52 corresponding to Sample O. Results of x-ray diffraction analysis indicated that the constituent in the area comprising the ceramic composite coating on Sample O included, among other phases, TiC and Re.

coupon 52 corresponding to Sample Q. Results of x-ray diffraction analysis indicated that the constituents in the area comprising the ceramic composite coating on Sample Q included, among other phases, TiC, ZrC and Zr.

TABLE I

| Sample | Parent Metal Vapor | Additive Powder Size & Composition | Thickness of Powder Coating | Processing Temperature | Processing Time at Processing Temperature | Ceramic Composite Coating Thickness |
|---|---|---|---|---|---|---|
| A | Ti | −325 mesh TiC | 178 μm | 1900° C. | 2 hours | 150 μm |
| B | Ti | 1-5 μm TiB$_2$ | 51 μm | 1900° C. | 2 hours | 148 μm |
| C | Ti | 14.4 μm* SiB$_4$ | 89 μm | 1900° C. | 2 hours | 155 μm |
| D | Ti | −325 mesh SiB$_6$ | 64 μm | 1900° C. | 2 hours | 140 μm |
| E | Ti | 12.6 μm* HfB$_2$ | 102 μm | 1900° C. | 2 hours | 157 μm |
| F | Ti | −325 mesh WB | 13 μm | 1900° C. | 2 hours | 144 μm |
| G | Ti | −325 mesh W$_2$B$_5$ | 25 μm | 1900° C. | 2 hours | 154 μm |
| H | Ti | −325 mesh TaB$_2$ | 25 μm | 1900° C. | 2 hours | 145 μm |
| I | Ti | 1-5 μm TiN | 51 μm | 1900° C. | 2 hours | 154 μm |
| J | Ti | 1-5 μm ZrN | 64 μm | 1900° C. | 2 hours | 153 μm |
| K | Ti | −325 mesh Ti$_5$Si$_3$ | 229 μm | 1900° C. | 2 hours | 176 μm |
| L | Ti | 1-5 μm TiSi$_2$ | 140 μm | 1900° C. | 2 hours | 178 μm |
| M | Ti | 1-5 μm MoSi$_2$ | 165 μm | 1900° C. | 2 hours | 254 μm |
| N | Ti | −100 mesh Mo | 241 μm | 1900° C. | 2 hours | 610 μm |
| O | Ti | −325 mesh Re | 165 μm | 1900° C. | 2 hours | 165 μm |

*average particle diameter

EXAMPLE 7

The following Example demonstrates a method for forming a reaction product coating on a graphite substrate by applying to the surface of the graphite substrate a parent metal powder and heating the power covered graphite substrate in the presence of a parent metal vapor to permit the reaction between the parent metal powder, the metal vapor and the graphite substrate. Table II contains a summary for Sample P, Sample Q, and Sample R of the parent metal powder size and composition, the thickness of the parent metal coating applied to graphite substrate coupon, and the ceramic composite coating thickness formed by placing the parent metal powder coated graphite substrate coupon into the vapor deposition chamber at an elevated temperature.

The method of Example 1 was substantially repeated to prepare the Grade AXZ-5Q graphite substrate coupons for coating with a patent metal slurry and the method of Example 5 was substantially repeated to slurry coat the substrate coupons with parent metal powders and to effect formation of the ceramic composite coatings on the graphite substrate coupons.

As with the Samples in Example 5 after the graphite substrate coupons were removed from the vapor deposition chamber, the ceramic composite coated graphite substrate coupons were cut, mounted and polished for examination using optical microscopy. Fracture surfaces of the ceramic composite coatings on the graphite substrate coupons were examined in an electron microscope and x-ray diffraction analysis of the ceramic composite coatings was performed.

Figure 7A:
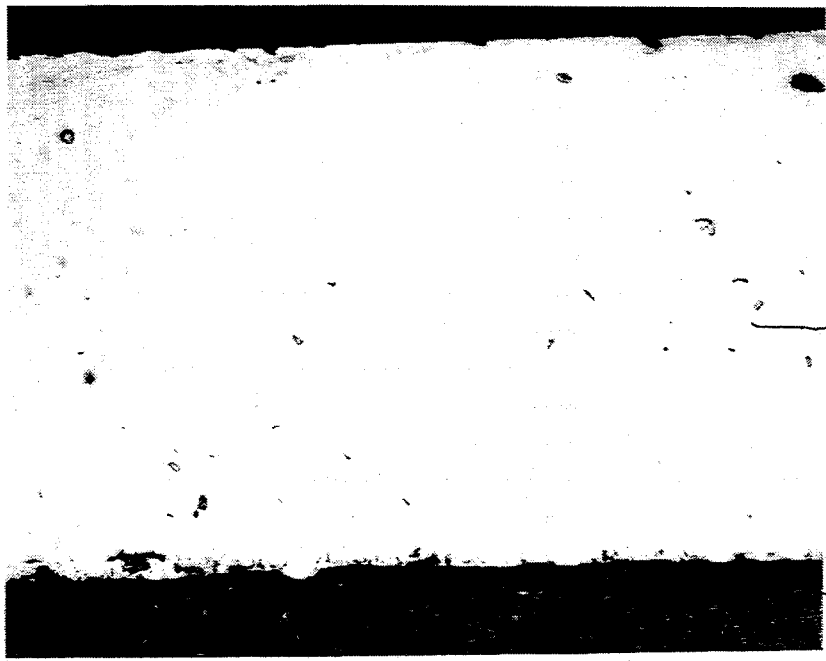
FIG. 7a corresponds with a photomicrograph take at 400× of a sample made in accordance with Example 7.

Specifically, FIG. 7a is a photomicrograph taken at about 500× of the ceramic composite coating 51 on the graphite substrate coupon 52 corresponding to Sample P. Results of x-ray diffraction analysis indicated that the constituents in the area comprising the ceramic composite coating on Sample P included, among other phases, TiC.

Figure 7B:
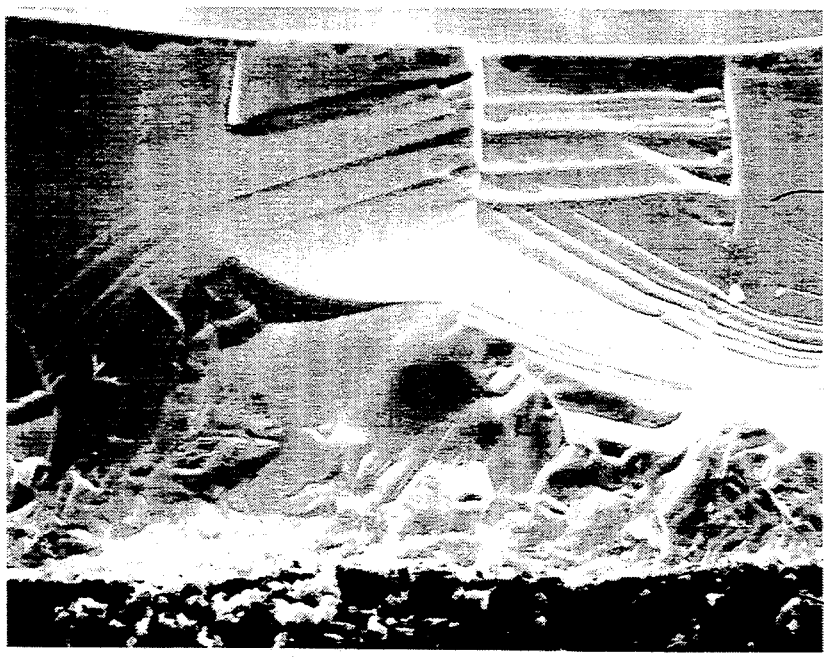
FIGS. 7b and 7c correspond to fractographs taken at 500× and 1000×, respectively, and correspond to samples made in accordance with Example 7.

FIG. 7b is a fractograph taken at about 500× of the ceramic composite coating 51 on the graphite substrate

TABLE II

| Sample | Parent Metal Vapor | Parent Metal Size & Composition | Thickness of Powder Coating | Ceramic Composite Coating Thickness |
|---|---|---|---|---|
| P | Ti | −325 mesh Ti | 432 μm | 164 μm |
| Q | Ti | −325 mesh Zr | 292 μm | 151 μm |
| R | Ti | −325 mesh Hf | 330 μm | 86 μm |

Figure 7C:

FIG. 7c is a fractograph taken at about 1000× of the ceramic composite coating 51 on the graphite substrate 52 corresponding to Sample R. Results of x-ray diffraction analysis indicated that the constituents in the area comprising the ceramic composite coating on Sample R included, among other phases, TiC, HfC, and C.

EXAMPLE 8

This Example demonstrates a method for forming a reaction product coating on a graphite substrate with a complicated geometry by reacting a parent metal vapor with the graphite substrate at an elevated temperature.

Figure 8A:
FIGS. 8a and 8b are photographs of samples made in accordance with Example 8.
Figure 8B:

The method of Example 1 was substantially repeated except that in place of rectangular graphite substrate coupons, a threaded graphite rod measuring about 2.6 inches (66 mm) long, having an outer diameter of about 0.38 inches (9.6 mm) and about 17 threads per inch, and a graphite tube measuring about 3.2 inches (81 mm) long, having a outer diameter of about 1.3 inches (33 mm) and a wall thickness of about 0.125 inch (3.2 mm) were used. The threaded graphite rod was held for about 5 hours at about 1900° C. and the graphite tube was held for about 3 hours at about 1900° C. within the vapor deposition chamber. At about room temperature, the threaded graphite rod and the graphite tube were removed from the vapor deposition chamber and it was observed that both were covered with a mirror like finish. Specifically, FIG. 8a is a photograph of the threaded graphite rod as it appeared after removal from the vapor deposition chamber and FIG. 8b is a photograph of the graphite tube as it appeared after removal from the vapor deposition chamber.

EXAMPLE 9

The following Example demonstrates a method for forming a reaction product coating on a carbon-carbon composite substrate by reacting a parent metal vapor with the carbon-carbon composite substrate at an elevated temperature. Moreover, this Example demonstrates that the ceramic composite coated carbon-carbon composite substrate can withstand extreme thermal shock conditions. The method of Example 1 was substantially repeated except that in addition to the graphite substrate coupon, a K-KARB® carbon-carbon composite (Kaiser Aerotech, San Leandro, Calif.) and a commercially available 4-D carbon-carbon composite were placed into the vapor deposition chamber. Additionally, the vapor deposition chamber was held for about 1 hour at about 1900° C. At about room temperature, the carbon-carbon composite and the monolithic graphite substrate coupons were removed from the lower chamber portion of the vapor deposition chamber and it was noted that a mirror like finish coated the surface of the bodies.

To test the integrity of the ceramic composite coating on the 4-D carbon-carbon composite substrate, a thermal shock test was performed by subjecting the ceramic composite coated 4-D carbon-carbon composite to the flame of an oxyacetylene torch. Specifically, the ceramic composite coated 4-D carbon-carbon composite was exposed to the flame of the oxyacetylene torch for about 15 seconds. The temperature rise in the 15 second period was estimated to be from about room temperature to about 3500° C. After subjecting the ceramic composite coated 4-D carbon-carbon composite to the flame of the oxyacetylene torch for about 15 seconds, the ceramic coated carbon-carbon composite was allowed to cool for about 30 seconds. The ceramic coated 4-D carbon-carbon composite was subjected to four cycles comprised of 15 seconds of heating with the flame of the oxyacetylene torch followed by a 30 second air cooling. After the ceramic composite coated carbon-carbon composite had cooled to about room temperature, it was noted that the ceramic coating had substantially maintained its integrity.

EXAMPLE 10

The following Example demonstrates a method for forming a reaction product coating on a carbon-carbon composite substrate by reacting a parent metal vapor with a carbon-carbon composite substrate coupon at an elevated temperature.

Figure 9:
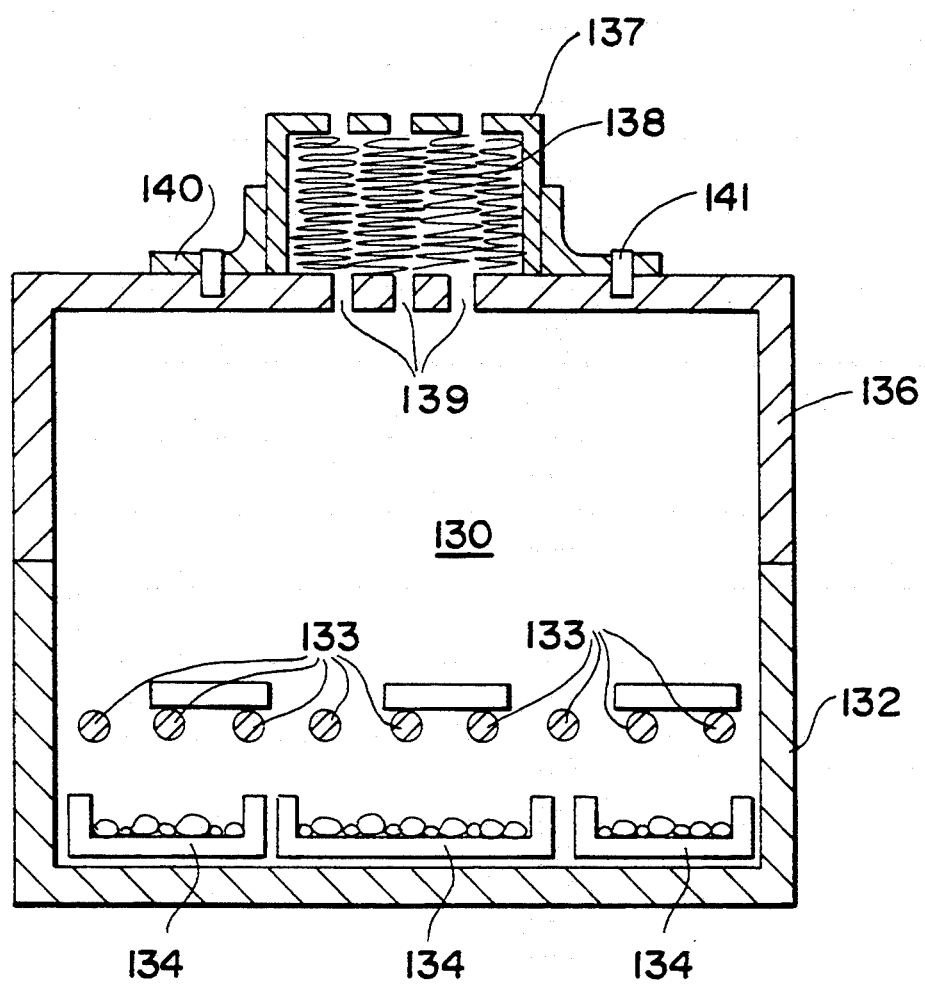
FIG. 9 is a schematic cross-sectional view of an assembly utilized to make samples in accordance with the present invention.

FIG. 9 is a cross-sectional schematic of the lay-up used to form a ceramic composite coating on carbon-carbon composite substrate coupons as well as graphite substrate coupons. Specifically, FIG. 9 is a cross-sectional schematic of a vapor deposition chamber 130. The vapor deposition chamber 130 was comprised of a lower chamber portion 132, nine substrate support rods 133, attached to the sidewalls of the lower chamber portion 132, nine parent metal source trays 134 within lower chamber portion 132, an upper chamber portion 136, an extended portion 137 containing a graphite felt 138 and attached to upper portion chamber 136.

More specifically, the lower chamber portion 132 of the vapor deposition chamber 130 measured about 10 inches (254 mm) long, about 10 inches (254 mm) wide, and about 4 inches (102 mm) high and had a wall thickness of about 0.5 inch (13 mm). The lower chamber portion 132 was machined from a piece of Grade AGSX graphite (Union Carbide Corporation, Carbon Product Division, Cleveland, Ohio). The nine graphite support rods with diameters of about 0.38 inch (9.6 mm) and made from Grade AGSX graphite (Union Carbide Corporation, Carbide Products Division, Cleveland, Ohio), were interference fit into holes in the sidewalls of lower chamber portion 132. All of the support rods were located about 2.0 inches (51 mm) from the bottom of the lower chamber portion 132. Additionally, each of the nine support rods were located about 1 inch (25 mm), about 2 inches (51 mm), about 3 inches (76 mm), about 4 inches (102 mm), about 5 inches (127 mm), about 6 inches (152 mm), about 7 inches (178 mm), about 8 inches (203 mm), and about 9 inches (229 mm), respectively, from one sidewall of the lower chamber portion 132 and extended from one sidewall to the opposite sidewall of the lower chamber portion 132. The support rods formed a supporting means for holding the graphite substrate coupons during coating.

The upper chamber portion 136 of the vapor deposition chamber 130 measured about 10 inches (254 mm) long, about 10 inches (254 mm) wide and about 4 inches (102 mm) high and had a wall thickness of about 0.5 inch (13 mm). The upper chamber portion 136 further included 5 holes 139 having a diameter of about 0.25 inch (6.4 mm). The 5 holes 139, each having a diameter of about 0.25 inch (6.4 mm), were substantially centrally located in the top portion of the upper chamber portion 136. The extended portion 137 measured about 3.5 inches (89 mm) long, 3.5 inches (89 mm) wide, 2 inches (51 mm) high, and had a wall thickness of about 0.25 inch (6.4 mm). The extended portion 137 was also machined from Grade AGSX graphite (Union Carbide Corporation, Carbon Product Division, Cleveland, Ohio) and was perforated with holes having a diameter of about 0.25 inch (6.4 mm) along the upper portion of the sidewalls and the top. A Grade GH graphite felt material 138 (Fiber Materials, Inc., Biddeford, Me.) was placed into the extended portion 137 of the deposition chamber 130 and the extended portion 137 of the deposition chamber 130 was aligned to the upper portion 136 of the deposition chamber 130 with angles 140 made of graphite and secured to the upper portion of the graphite chamber with graphite dowel pins 141.

The parent metal source trays 134 were machined from Grade ATJ graphite (Union Carbide Corporation, Carbon Products Division, Cleveland, Ohio). The graphite metal source trays 134 measured about 2.5 inches (64 mm) long, 2.5 inches (64 mm) wide, 1 inch (25 mm) high and had a wall thickness of about 0.25 inch (6.4 mm). The graphite metal source trays 104 were evenly placed in the space in the bottom of the lower chamber portion. All of the graphite metal source trays were filled with about $-5$ mesh, $+20$ mesh (particle diameter between about 850 μm and 4000 μm) titanium, metal sponge (Micron Metals, Inc., Salt Lake City, Utah) to a depth ranging from about 0.25 inch (6.4 mm) to about 0.38 inch (9.7 mm).

A piece of Grade AXZ-5Q graphite material (Poco Graphite, Inc., Decatur, Tex.) measuring about 1 inch (25 mm) long, about 1 inch (25 mm) wide and about 0.2 inch (5.1 mm) thick was sanded with 400 grit (average particle diameter of about 23 μm) silicon carbide paper to smooth the edges and then with 1200 grit (average particle size of about 4 μm) silicon carbide paper to smooth all surfaces. The sanded graphite substrate coupon was then cleaned for about 15 minutes in an ultrasonically agitated bath of acetone and dried in an air oven set at about 120° C. for about 0.45 hours. After drying substantially completely, the graphite substrate coupon was placed on support rods 133 within the lower chamber portion 132. The same procedure was repeated with a piece of K-KARB ® carbon-carbon composite (Kaiser Aerotech, San Leandro, Calif.) and a commercially available 4-D carbon-carbon composite. After the carbon-carbon composite components had dried for about 0.5 hours at about 120° C., carbon-carbon composite coupons were placed on the graphite support rods 133 within the lower chamber portion 132 of the vapor deposition chamber 130.

The upper portion 136 of the vapor deposition chamber 130 was placed onto and aligned with the lower chamber portion 132 of the deposition chamber 132. The vapor deposition chamber 130 and its contents were then placed into a vacuum furnace and the vacuum furnace door was closed. The vacuum furnace was then evacuated to a pressure of about 0.2 millitorr. After about 50 minutes at a pressure of about 0.2 millitorr, the vacuum furnace and its contents were heated to about 500° C. at about 250° C. per hour while maintaining a pressure less than about 60 millitorr. The vacuum furnace was then heated from about 500° C. to about 1000° C. at about 750° C. per hour while maintaining a pressure less than about 60 millitorr. At about 1000° C., the pressure within the vacuum furnace was allowed to increase to between about 60 millitorr and about 250 millitorr and the vacuum furnace and its contents were heated from about 1000 to about 1900° C. at about 750° C. per hour. After about 2 hours at about 1900° C., with a pressure ranging from about 60 millitorr to about 250 millitorr, the vacuum furnace and its contents were cooled at about 900° C. per hour to about 1000° C. while maintaining a pressure ranging from about 60 millitorr to about 250 millitorr. The vacuum furnace and its contents were then cooled from about 1000° C. to about room temperature at about 125° C. per hour while maintaining a pressure ranging from about 60 millitorr to about 250 millitorr.

Figure 10A:
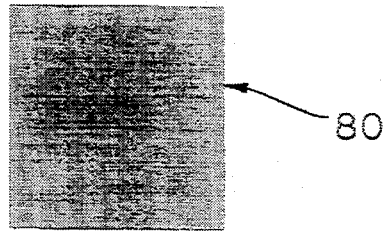
FIGS. 10a–10c are before and after views of samples treated in accordance with the present invention.
Figure 10A:
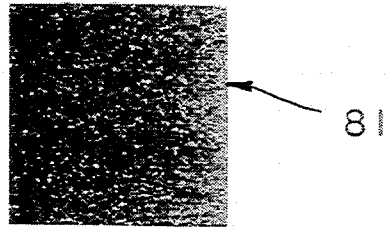
Figure 10B:
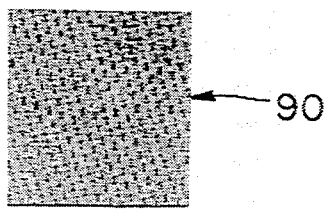
Figure 10B:
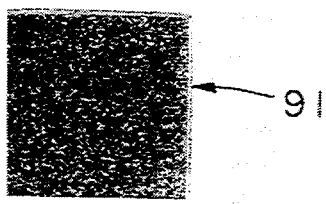
Figure 10C:
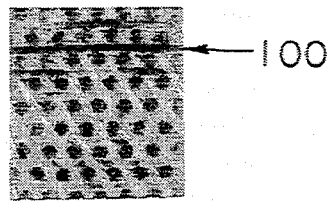
Figure 10C:
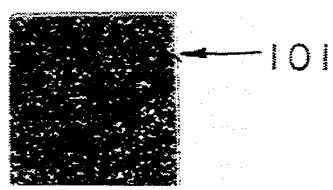

At about room temperature, the vacuum furnace door was opened, the vapor deposition chamber 130 was removed from the furnace, disassembled and the carbon-carbon composite and the monolithic graphite substrate coupons were removed from the lower chamber portion 132 of the vapor position chamber 130. It was noted that a mirror like finish coated the surface of the substrate coupons. Specifically, FIG. 10a is a comparison of the graphite substrate coupon 80 and the ceramic composite coated graphite coupon 81 showing the change in appearance resulting from the coating process. FIG. 10b is a photograph showing a comparison of the K-KARB ® carbon-carbon composite coupon 90 and the ceramic coated K-KARB ® carbon-carbon composite coupon 91 showing the change in appearance resulting from the coating process. FIG. 10c is a photograph showing a comparison of the 4-D carbon-carbon composite coupon 100 and the ceramic composite coated 4-D carbon-carbon composite coupon 101 showing the change in appearance resulting from the coating process.

EXAMPLE 11

The following Example demonstrates a method for forming a reaction product coating on a graphite substrate by applying to the surface of a graphite substrate an additive powder and heating the powder covered substrate in the presence of a parent metal vapor to permit the incorporation of the additive powder in a ceramic composite coating formed by the reaction between the parent metal vapor and the graphite substrate.

Table III contains a summary for Sample S through Sample Z of the additive powder size and composition, the thickness of the additive powder coating, the processing temperature to effect the formation of the ceramic composite coating, the processing time to effect the formation of the ceramic composite coating, and the thickness of the ceramic composite coating on a graphite substrate coupon.

Specifically, the composition of the additive powders applied to the surface of the graphite substrate as slurries included: Grade E67 1000 grit (average particle diameter of about 5 $\mu$m) alumina (Norton Company, Worcester, Mass.), light powder magnesium oxide (Fisher Scientific, Pittsburgh, Pa.), about 1–5 $\mu$m particle diameter titanium dioxide (Atlantic Equipment Engineers, Bergenfield, N.J.), Grade MSZ zirconium dioxide (Magnesium Electron, Inc., Flemmington, N.J.), about −325 mesh (particle diameter less than about 45 $\mu$m) magnesium aluminate spinel (Atlantic Equipment Engineers, Bergenfield, N.J.), about −325 mesh (particle diameter less than about 45 $\mu$m) silicon dioxide (Consolidated Astronautics, Inc., Saddle Brook, N.J.), tungsten dioxide (Alfa Products, Morton Thiokol, Inc., Danvers, Mass.), molybdenum trioxide (AESAR ®, Johnson Matthey, Seabrook, N.H.). The method of Example 1 was substantially repeated to prepare the Grade AXZ-5Q graphite substrate coupons (Poco Graphite, Inc., Decatur, Tex.) for slurry coating. The method of Example 10 was substantially repeated for Sample S through Sample Z in order to effect the formation of the ceramic composite coating on the graphite substrate coupons.

TABLE III

| Sample | Parent Metal Vapor | Additive Powder Size & Composition | Thickness of Powder Coating | Processing Temperature | Processing Time at Processing Temperature | Ceramic Composite Coating Thickness |
| --- | --- | --- | --- | --- | --- | --- |
| S | Ti | 1000 grit Al$_2$O$_3$ | 229 $\mu$m | 1900° C. | 2 hours | 157 $\mu$m |
| T | Ti | MgO | 305 $\mu$m | 1900° C. | 2 hours | 165 $\mu$m |
| U | Ti | 1–5 $\mu$m TiO$_2$ | 102 $\mu$m | 1900° C. | 2 hours | 178 $\mu$m |
| V | Ti | ZrO$_2$ | 102 $\mu$m | 1900° C. | 2 hours | 166 $\mu$m |
| W | Ti | −325 mesh MgAl$_2$O$_4$ | 229 $\mu$m | 1900° C. | 2 hours | 152–174 $\mu$m |
| X | Ti | −325 mesh SiO$_2$ | 305 $\mu$m | 1900° C. | 2 hours | 172 $\mu$m |
| Y | Ti | WO$_2$ | 216 $\mu$m | 1900° C. | 2 hours | 174 $\mu$m |
| Z | Ti | MoO$_3$ | 330 $\mu$m | 1900° C. | 2 hours | 163 $\mu$m |

Figure 11A:
FIGS. 11a–11e correspond to fractographs taken at various magnifications (specified in specification) of samples made in accordance with Example 11.

Fracture surfaces of the ceramic composite coatings on the graphite substrate coupons were examined using an electron microscope. Specifically, FIG. 11a is a fractograph taken at about 500× of the ceramic composite coating 51 on the graphite substrate coupon 52 corresponding to Sample S.

Figure 11B:
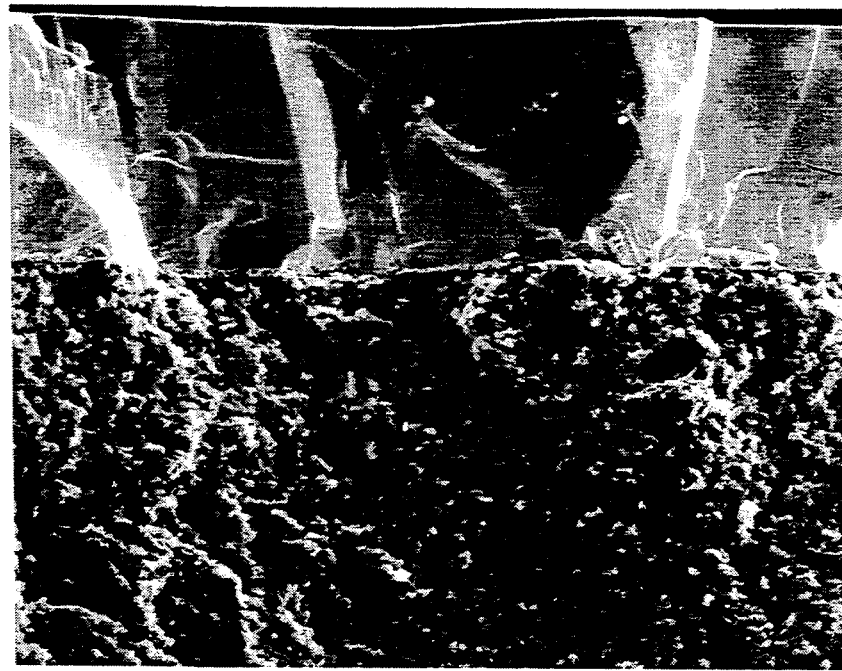

FIG. 11b is a fractograph taken at about 200× of the ceramic composite coating 51 on the graphite substrate coupon 52 corresponding to Sample T.

Figure 11C:
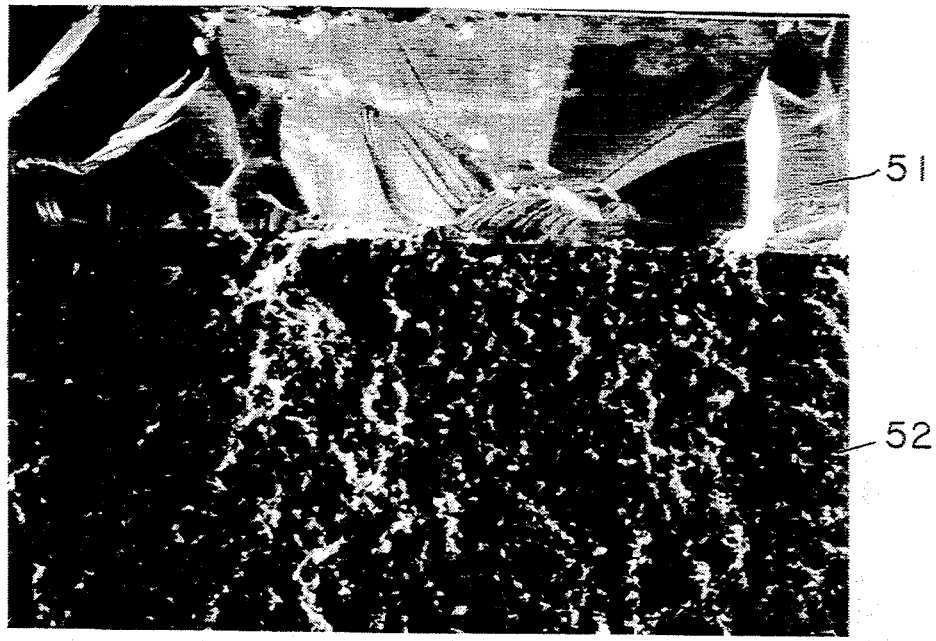

FIG. 11c is a fractograph taken at about 200× of the ceramic composite coating 51 on the graphite substrate coupon 52 corresponding to Sample X.

Figure 11D:
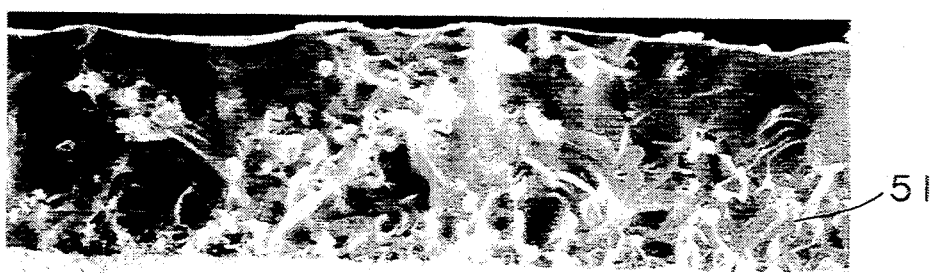
Figure 11D:
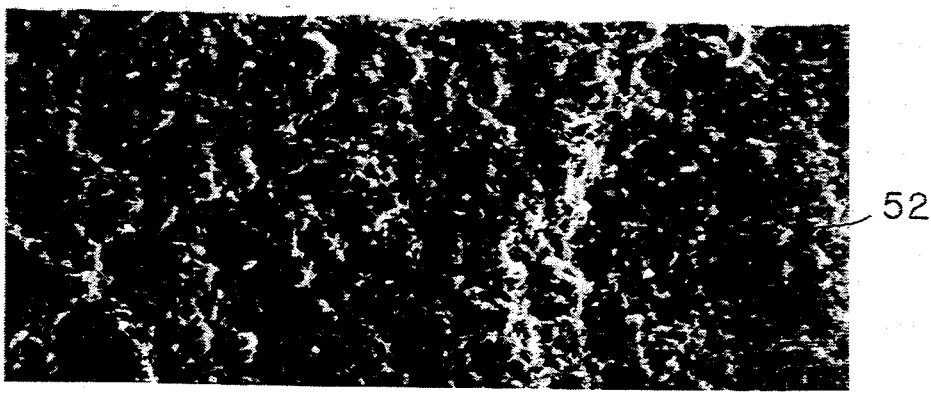

FIG. 11d is a fractograph taken at about 200× of the ceramic composite coating 51 on the graphite substrate coupon 52 corresponding to Sample Y.

Figure 11E:
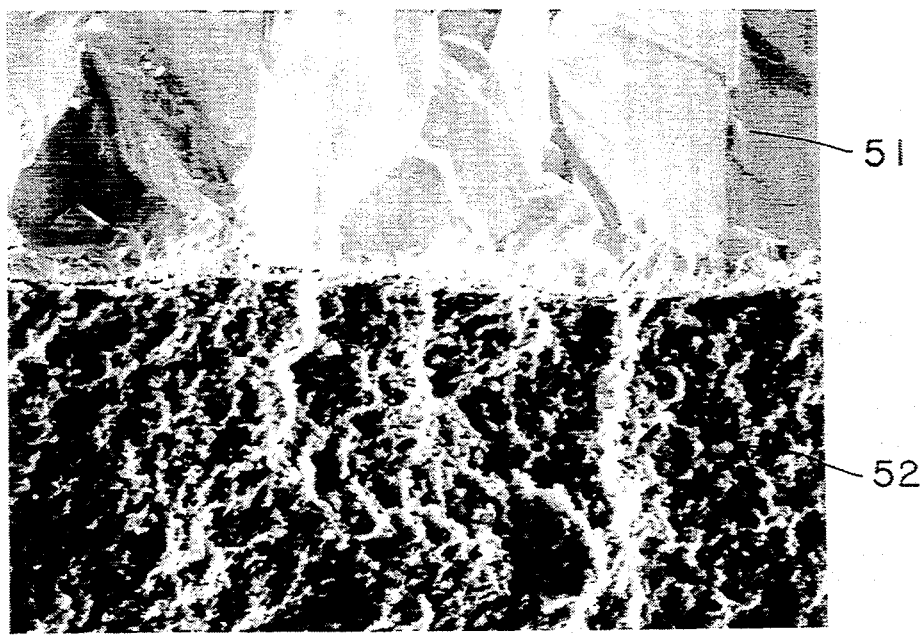

FIG. 11e is a fractograph taken at about 200× of the ceramic composite coating 51 on the graphite substrate 52 corresponding to Sample Z.

EXAMPLE 12

The following Example demonstrates a method for forming a ceramic composite body by heating a graphite material in the presence of a parent metal vapor to permit a reaction between the parent metal vapor and the graphite material.

Table IV contains summary for Sample AA through Sample AE of the substrate material, the metal vapor, the additive powder size and composition, the processing temperature and the processing time at the processing temperature for the formation of the ceramic composite materials by this Example. Sample AA was MAGNAMITE ™ 5 harness satin weave (HSW) graphite cloth (Hercules Aerospace, Magna, Utah) measuring about 1 inch (25 mm) long, 1 inch (25 mm) wide and about 0.12 inch (3 mm) thick. Sample AB was THORNEL® Grade VMA graphite mat (Amoco Performance Products, Inc., Greenville, S.C.) measuring about 1.6 inches (41 mm) long, about 1.6 inches (41 mm) wide and about 1 inch (25 mm) thick. Sample AC was CALCARB ™ rigid carbon fiber thermal insulation (Calcarb Inc., Willingboro, N.J.) measuring about 2.4 inches (61 mm) long, about 2.4 inches (61 mm) wide and about 0.05 inch (1.3 mm) thick. The carbon fiber thermal insulation had been impregnated with about 1.14 grams of submicron boron powder (Callery Chemical Co., Callery, Pa.) using a vacuum impregnation technique. Specifically, a suspension comprised by weight of about 27.6% submicron boron powder (Callery Chemical Company, Callery, Pa.), 11.6% EL-VACITE® 2045 acrylic resin (E. I. du Pont de Nemours & Co., Inc., Wilmington, Del.), 0.1% n-butyl phthalate (Fischer Scientific Company, Pittsburgh, Pa.), 33.4% ethylene glycol monobutyl ether (Textile Chemical Company, Reading, Pa.), and about 27.3% isopropyl alcohol was made in a plastic jar. All the components of the suspension, except for the boron powder, were combined to make a solution. After all the components had substantially completely dissolved to make a homogeneous solution, the boron powder was added. The plastic jar was placed in a shaker mixer for about 15 minutes, then on a roller mixer for at least 2 hours and finally placed into an ultrasonically agitated bath to break apart any remaining agglomerates of boron powder and complete the formation of the boron suspension. The boron suspension was poured into a dish. The carbon fiber thermal insulation was then submerged into the boron suspension to initiate the impregnation with the boron powder. Once the carbon fiber thermal insulation remained submerged below the surface of the boron suspension, the dish and its contents were moved to a vacuum chamber. After the vacuum chamber was closed, the vacuum chamber was evacuated to effect the evaporation of a portion of the solvents from the boron suspension. Air was then reintroduced into the vacuum chamber. The cycles of evacuation and reintroduction of air were continued until substantially all the solvents had evaporated and a boron powder impregnated carbon fiber thermal insulation remained. Sample AD and AE were CALCARB ™ rigid carbon fiber thermal insulation measuring about 1.6 inches (41 mm) long, 1.5 inches (38 mm) wide and about 1.3 inches thick. Sample AE was impregnated with about 0.83 grams of submicron boron powder (Callery Chemical Co., Callery, Pa.) using the above-described vacuum impregnation technique.

The method of Example 10 was substantially repeated to effect the formation of the ceramic composite materials with the exception that Sample AC was held at 1900° C. for about 6 hours. At about room temperature, the vapor deposition chamber was disassembled and the graphite materials were removed from the bottom portion of the vapor deposition chamber to reveal that the titanium metal vapor had reacted with the graphite materials to form highly reflective bodies.

TABLE IV

| Sample | Substrate Material | Parent Metal Vapor | Additive Powder Size & Composition | Processing Temperature | Processing Time at Processing Temperature |
| --- | --- | --- | --- | --- | --- |
| AA | 5 HSW graphite fiber cloth | Ti | none | 1900° C. | 2 hours |
| AB | graphite mat | Ti | none | 1900° C. | 2 hours |
| AC | carbon fiber insulation | Ti | submicron boron | 1900° C. | 6 hours |
| AD | carbon fiber insulation | Ti | none | 1900° C. | 2 hours |
| AE | carbon fiber insulation | Ti | submicron boron | 1900° C. | 2 hours |

Figure 12:
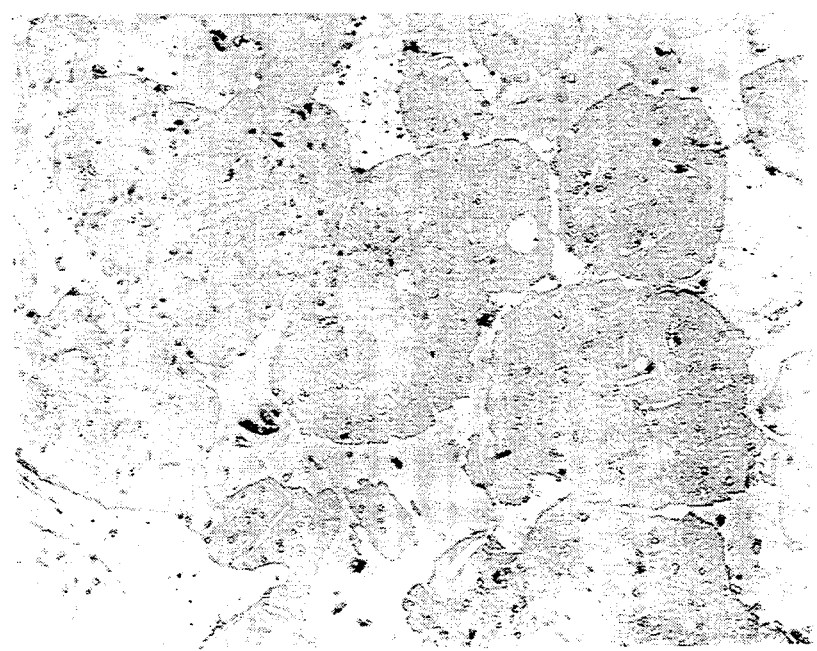
FIG. 12 is a photomicrograph taken at 400× of the microstructure of a sample made in accordance with Example 12.

Additionally, results of x-ray diffraction analysis indicated that the constituents of Sample AC comprised, among other phases, titanium carbide, titanium and titanium boride. FIG. 12 is a photomicrograph taken at about 400× corresponding to the ceramic composite body of Sample AC.

EXAMPLE 13

The following Example demonstrates a method for using a graphite body that has been coated with a ceramic composite coating by subjecting it to a parent metal vapor source.

Figure 13:
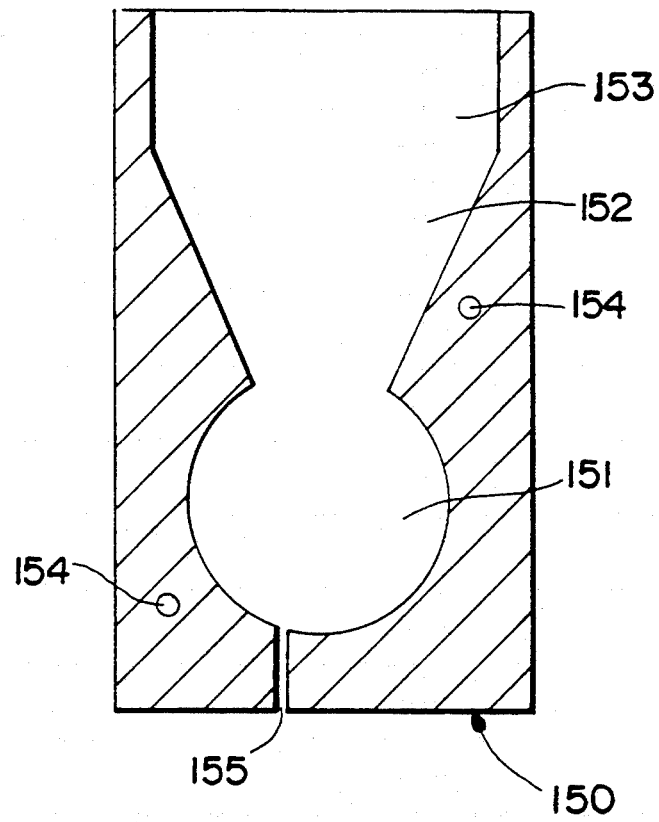
FIG. 13 is a perspective view of a mold piece utilized in accordance with Example 13.

A two-piece mold was used to make spherical platelet reinforced composite bodies. FIG. 13 is a side view schematic of one piece of the two-piece mold. The halves of the two piece split mold were machined from Grade ATJ graphite (Union Carbide Corporation, Carbon Products Division, Cleveland, Ohio). The two-piece mold had an outer diameter of about 2.25 inches (57 mm), a height of about 3.7 inches (94 mm) and a complex inner cavity. The inner cavity was comprised of a cylindrical void 153 having a diameter of about 1.9 inches (48 mm) and a height of about 0.75 inch (1.9 mm), a frustro-conical void 152 having a large diameter of about 1.9 inches (48 mm), a small diameter of about 0.7 inch (1.8 mm) and a height of about 1.2 inches (30 mm), and a spherical void 151 having a diameter of about 1.4 inches (36 mm). The cylindrical void 153, the frustro-conical void 152, and the spherical void 151 were aligned with the axis symmetry of the two-piece mold. Two grooves 155 (one shown in FIG. 13), measuring about 0.031 inch (0.79 mm) wide and extending from the bottom of the two-piece mold to the spherical void portion of the two-piece mold were located at about 0.13 inch from the axis symmetry of the two-piece molds. Each half of the two-piece mold also had two alignment holes 154 for receiving graphite rods having a diameter of about 1.3 inches and a length of about 1.1 inches. Mating halves of the two-piece mold were assembled by applying GRAPHIBOND ™ 551-R graphite glue (Aremco, Ossining, N.Y.) to mating surfaces and contacting the coated mating surfaces. Assembled two-piece molds were then placed in an air atmosphere oven set at about 120° C. for about 3 hours to cure the graphite glue.

A vapor deposition chamber substantially the same as that in Example 1 was used. Four assembled two-piece molds were placed into the lower portion of a vapor deposition chamber. The large opening of the two-piece molds contacted the support rods and had a line of sight to the parent metal source trays. The parent metal source trays within the vapor deposition chamber were filled with a nuclear grade zirconium sponge material (Western Zirconium, Ogden, Utah) weighing about 75 grams. The upper portion of the vapor deposition chamber was aligned with the lower portion of the vapor deposition chamber and the vapor deposition chamber was placed onto a catch tray to form a lay-up. The lay-up and its contents were then placed into a vacuum furnace and the vacuum furnace door was closed. The vacuum furnace was then evacuated to a pressure of about 0.2 millitorr. After about 50 minutes at a pressure of about 0.2 millitorr, the vacuum furnace and its contents were heated to about 1000° C. at about 750° C. per hour. At about 1000° C., the pressure within the vacuum furnace was allowed to increase to between about 60 millitorr to about 250 millitorr and the vacuum furnace and its contents were heated from about 1000° C. to about 2000° C. at about 750° C. per hour. After about 5 hours at about 2000° C. with a pressure ranging from about 60 millitorr to about 250 millitorr, the vacuum furnace and its contents were cooled to about 1000° C. at about 1000° C. per hour and then from a 1000° C. to about room temperature at about 125° C. per hour while maintaining a pressure ranging from about 60 millitorr to about 250 millitorr. At about room temperature, the vacuum furnace door was opened and the vapor deposition chamber was disassembled to reveal that the surface of two piece mold had been coated by the deposition process.

The spherical cavity of the two-piece molds were then coated with TETRABOR ® 1000 grit boron carbide (ESK Engineered Ceramics, New Canaan, Conn.). The coated two-piece molds were then tapped about 700 times using a tap volume meter (Model 2003 stampfvolumeter, J. Englesmann A.G., West Germany) to settle the boron carbide. A parent metal ingot designated zirconium alloy 705, having a composition by weight of about <4.5% Hf, <0.2 Fe and Cu, <0.002% H, <0.025% N, <0.05% C, 2.0–3.0% Nb, <0.18% 0 and a minimum of 95.5% Zr and Hf, was placed onto the tap loaded boron carbide powder. Several such setups were placed into a graphite containment boat to form a lay-up. The lay-up and its contents were placed into a vacuum furnace and the vacuum furnace door was closed. The vacuum chamber was then evacuated to a pressure of about $9 \times 10^{-4}$ torr and then heated from about room temperature to about 1600° C. at about 600° C. per hour. At about 1600° C., the pressure within the vacuum furnace was allowed to increase to about 60 to 250 millitorr while the furnace was heated from about 1600° C. to about 2000° C. at about 600° C. per hour. After about 30 minutes at about 2000° C. per hour, the vacuum pump to the furnace chamber was interrupted and argon was introduced into the chamber at a flow rate of about 10 liters per minute until an over pressure of about 2 lbs per square inch (0.14 kg/cm$^2$) was achieved. The argon flow rate was then reduced to 2 liters per minute. After about 2 hours at about 2000° C. while maintaining an argon flow rate of about 2 liters per minute with an over pressure of about 2 lbs per square inch (0.14 kg/cm$^2$), the furnace and its contents were allowed to cool from about 2000° C. to about room temperature at about 800° C. per hour. At about room temperature, the lay-up was removed from the furnace and it was noted that composite bodies had formed by the reactive infiltration of the zirconium parent metal alloy into the boron carbide powder and that the resultant ceramic composite bodies were easily removed from the coated two piece graphite molds.

A second group of four two-piece molds that had not been subjected to the metal vapor treatment were filled with the boron carbide powder and supplied with the zirconium parent metal alloy as described above. The filled two piece molds were placed onto a graphite containment tray and into a vacuum furnace. The uncoated two piece molds were subjected to substantially the same processing cycle as the coated two piece molds, except that the furnace and its contents were cooled from about 2000° C. to about room temperature at about 600° C. per hour. At about room temperature, the two piece graphite molds were disassembled to reveal that the parent metal had preferentially wet the graphite mold and reacted with the inner surface of the graphite mold and leaked through the vents 155 within the graphite mold and minimized the amount of reaction between the boron carbide and the zirconium parent metal. Thus, this Example demonstrates that the precoating of a graphite mold by subjecting it to a vapor parent metal to form a coating on the mold improves the ability to make dense ceramic composite bodies.

EXAMPLE 14

The following Example demonstrates that the formation of a titanium carbide reaction product coating on a graphite substrate by reacting a parent metal vapor with the graphite substrate at an elevated temperature not only improves the flexural strength of the resultant body, but also increases the high temperature oxidation resistance of the resultant body. Table V summarizes the flexural strength of as-received graphite substrate coupons and graphite substrate coupons having a titanium carbide coating thereon, for two graphite substrate materials, as a function of test temperature.

The edges of graphite substrate coupons of Grade AXZ-5Q graphite (Poco, Inc., Decatur, Tex.) and Grade AXF-5Q graphite (Poco, Inc., Decatur, Tex.), measuring about 1.9 inches (48 mm) long, about 0.23 inch (5 mm) wide and about 0.11 inch (2.8 mm) thick, were toughened by sanding with 1200 grit (average particle diameter of about 4 microns) silicon carbide paper. The sanded graphite substrate coupons were then cleaned for about 15 minutes in an ultrasonically agitated bath of acetone and dried for about 15 minutes in a forced air oven set at about 120° C. After drying substantially completely, the graphite substrate coupons were placed within a vapor deposition chamber substantially the same as that described in Example 10 to form a lay-up.

The lay-up and its contents were then placed into a vacuum furnace and the vacuum furnace door was closed. The vacuum furnace was then evacuated to a pressure of about 0.2 millitorr. The vacuum furnace and its contents were then heated to about 1000° C. at about 750° C. per hour while maintaining a pressure less than about 60 millitorr. At about 1000° C., the pressure within the vacuum furnace was allowed in increase to a pressure ranging between about 60 millitorr to about 250 millitorr. The vacuum furnace and its contents were then heated from about 1000° C. to about 1900° C. at about 750° C. per hour. After about 2 hours at about 1900° C. with a pressure within the vacuum furnace chamber ranging between about 60 millitorr to about 250 millitorr, the vacuum furnace and its contents were cooled at about 900° C. per hour to about 1000° C. and then from about 1000° C. to about room temperature at about 125° C. per hour while maintaining a pressure within the vacuum furnace chamber ranging from about 60 millitorr to about 250 millitorr. At about room temperature, after the vacuum pump was turned off, the vacuum furnace was allowed to adjust to atmospheric pressure and the lay-up and its contents were removed from the furnace.

The flexural strength of the graphite substrate coupons with and without the titanium carbide coating was measured using the procedure defined by the Department of Army's proposed standard MIL-STD-1942A (Nov. 21, 1983). This test was specifically designed for high temperature ceramic materials. The flexural strength is defined in this standard as the maximum outer fiber stress at the time of failure. A 4¼-flexural test was used. The height and width of the test specimens were measured with the precision of about 0.01 mm. The test specimens were subjected to a stress applied at 4 points by two lower bearing points and two upper bearing points. The lower span bearing points were approximately 40 millimeters apart and the upper span bearing points were approximately 20 millimeters apart. The exact distances between the bearing points were determined and recorded for each individual flexural strength measurement-with a precision of about 0.01 mm. The upper span was centered over the lower span, so that the load was applied symmetrically. A constant displacement of about 0.02 inch/minute (0.5 mm/minute) was exerted upon each sample until failure. The flexural strength measured at about room temperature was performed with a Model CITS-20006 Universal Testing Machine (System Integration Technology, Inc., Straton, Mass.) equipped with a 5000 pound load cell (Model 3132-149, Eaton Corp., Troy, Mich.). The flexural strength measured at about 400° C., 600° C., 800° C. and 1000° C. was performed with a Model CITS-2000/6W Universal Testing Machine (System Integration Technology, Inc., Straton, Mass.) equipped with a 500 pound load cell (Model 3132-149, Eaton Corp., Troy, Mich.) and a resistance heated air atmosphere furnace (Series 3350, Applied Test Systems, Inc., Butler, Pa.). Samples that were used to determine flexural strengths at about 400° C. and higher were held at the test temperature for at least 1 hour.

Table V contains a summary of the results of the flexural strength measurements conducted in an air atmosphere as a function of test temperature. Specifically, the data in Table V show that the strength at room temperature for the Grade AXZ-5Q graphite substrate coupons increased from about 58.7 to about 127.4 megapascal (MPa) by forming a titanium carbide coating. In addition, the data in Table V show that the formation of a titanium carbide coating on the Grade AXZ-5Q carbon material extends its oxidation resistance to at least 1000° C. That is, without the titanium carbide coating, the Grade AZX-5Q graphite substrate material oxidized at about 600° C., but with the titanium carbide coating, the material retained the flexural strength measured at room temperature at about 1000° C. Improvements of high temperature oxidation resistance were noted with the Grade AXF-5Q graphite substrate material. That is, the

TABLE V

FLEXURAL STRENGTH MEASURED IN AN AIR ATMOSPHERE AS A FUNCTION OF TEMPERATURE

| Material Tested | Flexural Strength (MPa) | | | | |
|---|---|---|---|---|---|
| | RT | 400° C. | 600° C. | 800° C. | 1000° C. |
| Grade AXZ-5Q Graphite | 58.7 ± 5.8 | 61.4 ± 2.8 | oxidized | — | — |
| Grade AXZ-5Q Graphite with TiC Coating | 127.4 ± 18.1 | 134.7 ± 17.4 | 116.2 ± 2.2 | 94.4 ± 3.8 | 56.9 ± 3.1 |
| Grade AXF-5Q Graphite | 95.2 ± 3.1 | 118.1 ± 9.1 | oxidized | — | — |
| Grade AXF-5Q Graphite with TiC Coating | 115.9 ± 17.8 | 152.0 ± 38.7 | 141.7 ± 4.8 | 108.2 ± 11.7 | — | titanium carbide coating extended the oxidation resistance of the Grade AXF-3Q graphite substrate material beyond about 400° C. to about 800° C.

EXAMPLE 15

The following Example demonstrates that the formation of a reaction product coating on a graphite substrate by reacting a parent metal vapor with a graphite substrate at an elevated temperature, improves the surface quality of the resultant composite body, as compared to the starting material. Specifically, Table VI contains a comparison of the surface roughness of the starting graphite substrate coupon and the same graphite substrate coupon coated with a reaction product which was formed by subjecting the graphite substrate coupon to a parent metal vapor treatment at elevated temperatures for 2 hours, 4 hours and 6 hours, respectively.

Three substrate coupons each being made of three different graphite materials, namely, Grade AXZ-5Q graphite material (Poco, Inc., Decatur, Tex.), Grade AXF-5Q graphite material (Poco, Inc., Decatur, Tex.), Grade DFP-1 graphite material (Poco, Inc., Decatur, Tex.), Grade ATJ graphite material (Union Carbide Corporation, Carbon Products Division, Cleveland, Ohio) and Grade AGXS graphite material (Union Carbide Corporation, Carbon Products Division, Cleveland, Ohio), and each measuring about 2 inches (51 mm) long, about 1 inch (25 mm) wide and about 0.13 inch (3.2 mm) thick, were sanded with 1200 grit (average particle diameter of about 4 microns) silicon carbide paper. The sanded graphite substrate coupons were then cleaned for about 15 minutes in an ultrasonically agitated bath of acetone and dried for about 15 minutes in a forced air oven set about 120° C. After drying substantially completely, the average surface roughness of the graphite substrate coupons were measured according the method described below and the graphite substrate coupons were placed into a vapor deposition chamber substantially the same as that described in Example 10 to form a lay-up.

The lay-up and its contents were then placed into a vacuum furnace and the vacuum furnace door was closed. The vacuum furnace was then evacuated to a pressure of about 0.2 millitorr. The vacuum furnace and its contents were then heated from about room temperature to about 1000° C. at about 750° C. per hour while maintaining a pressure less than about 60 millitorr. At about 1000° C., the pressure within the vacuum furnace was increased to between about 60 millitorr and about 250 millitorr and the vacuum furnace and its contents were heated from about 1000° C. to about 1900° C. at about 750° C. per hour. After about two hours at about 1900° C., with a pressure within the vacuum chamber ranging from about 60 millitorr to about 250 millitorr, the vacuum furnace and its contents were cooled at about 900° C. per hour to about 1000° C. The vacuum furnace and its contents were then cooled from about 1000° C. to about room temperature at about 125° C. per hour while maintaining a pressure ranging from about 60 millitorr to about 250 millitorr.

At about room temperature, the vacuum furnace door was opened and the vapor deposition chamber was removed from the furnace, disassembled and one titanium carbide coated graphite substrate coupon of each graphite material type was removed from the lower portion of the vapor deposition chamber and two graphite substrate coupons of each graphite material type remained in the lower portion of the vapor deposition chamber and were subjected to the above described heating and treatment cycle a second time. After the above-described cycle had once again been repeated, another series of titanium carbide coated graphite substrate coupons was removed from the lower portion of the vapor deposition chamber and the remaining five graphite substrate coupons were subjected to the above described heating and treatment cycle a third time. After each deposition cycle, it was noted that the graphite substrate coupons had a mirror-like finish. The surface roughness of each graphite coupon prior to and following treatment according to this Example was measured using a TALYSURF 10 profilometer (Rank Taylor Hobson Limited, England).

The results of the average surface roughness measurements were compared with the preprocessed average surface roughness of the graphite substrate coupons. Those results are summarized in Table VI. Specifically, those results show that a decrease in average surface roughness as great as an order of magnitude can be attained by forming a titanium carbide reaction product coating on the surface of a graphite substrate coupon by the methods of this Example.

EXAMPLE 16

The following Example demonstrates that the formation of a titanium carbide reaction product coating on a graphite substrate coupon improves the ability of a graphite body to withstand thermal shock.

TABLE VI

| | SURFACE ROUGHNESS OF A FRICTION OF COATING TIME | | | |
|---|---|---|---|---|
| | Average Surface Roughness (microinch) | | | |
| Material | Starting Material | Treated for 2 hours | Treated for 4 hours | Treated for 6 hours |
| Grade AXZ-5Q Graphite | 13.1 ± 1.9 | 2.1 ± 0.5 | — | — |
| Grade AXZ-5Q Graphite | 13.1 ± 1.1 | — | 1.9 ± 0.8 | — |
| Grade AXZ-5Q Graphite | 15.6 ± 2.4 | — | — | 1.0 ± 0.1 |
| Grade AXF-5Q Graphite | 47.2 ± 4.8 | 4.0 ± 0.9 | — | — |
| Grade AXF-5Q Graphite | 13.2 ± 0.4 | — | 1.7 ± 0.7 | — |
| Grade AXF-5Q Graphite | 11.5 ± 0.9 | — | — | 1.1 ± 0.4 |
| Grade DFP-1 Graphite | 14.1 ± 2.0 | 1.7 ± 0.2 | — | — |
| Grade DFP-1 Graphite | 15.4 ± 1.2 | — | 1.6 ± 0.3 | — |
| Grade DFP-1 Graphite | 12.8 ± 1.4 | — | — | 0.8 ± 0.1 |
| Grade ATJ Graphite | 24.4 ± 7.6 | 8.0 ± 1.9 | — | — |
| Grade ATJ Graphite | 23.8 ± 7.6 | — | 5.3 ± 1.4 | — |
| Grade ATJ Graphite | 18.9 ± 3.9 | — | — | 4.3 ± 1.2 |
| Grade AGSX Graphite | 67.0 ± 6.8 | 26.0 ± 5.9 | — | — |
| Grade AGSX Graphite | 107.0 ± 29.4 | — | 15.0 ± 4.5 | — |
| Grade AGSX Graphite | 209.0 ± 36.0 | — | — | 15.8 ± 4.7 |

Pieces of Grade AXZ-5Q graphite material (Poco, Inc., Decatur, Tex.), measuring about 1.9 inches (48 mm) long, about 0.23 inch (5.8 mm) wide and about 0.11 inch (2.8 mm) thick were sanded with 1200 grit (average particle diameter of about 4 microns) silicon carbide paper. Pieces of K-KARB ® carbon-carbon composite material (Kaiser Aerotech, San Leandro, Calif.) measuring about 2 inches (51 mm) long, about 0.24 inch (6.1 mm) wide and about 0.12 inch (3 mm) thick were first sanded with 400 grit (average particle diameter of about 23 μm) and then with 1200 grit (average particle diameter of about 4 μm) silicon carbide paper. The sanded graphite substrate coupons were then cleaned for about 15 minutes in an ultrasonically agitated bath of acetone and dried for about 15 minutes in a forced air oven set at about 120° C. After drying substantially completely, the graphite substrate coupons were placed on support rods within the lower chamber portion of a vacuum deposition chamber substantially the same as that described in Example 10 to form a lay-up.

The lay-up and its contents were then placed into a vacuum furnace and the vacuum furnace door was closed. The vacuum furnace was then evacuated to a pressure of about 0.2 millitorr. The vacuum furnace and its contents were then heated to about 1000° C. at a rate of about 750° C. per hour while maintaining a pressure less than about 60 millitorr. At about 1000° C., the pressure within the vacuum furnace was allowed to increase to between about 60 millitorr to about 250 millitorr. The vacuum furnace and its contents were then heated from about 1000° C. to about 1900° C. at about 750° C. per hour. After about 2 hours at about 900° C. with a pressure within the vacuum furnace chamber ranging between about 60 millitorr and about 250 millitorr, the vacuum furnace and its contents were cooled at about 900° C. to about 1000° C. and then from about 1000° C. to about room temperature at about 125° C. per hour while maintaining a pressure within the vacuum furnace chamber ranging from about 60 millitorr to about 250 millitorr. At about room temperature, after the vacuum pump had been turned off, the vacuum furnace was allowed to adjust to about atmospheric pressure and the lay-up and it contents were removed from the furnace.

Several bars of the titanium carbide coated Grade AZX-5Q graphite material and the K-KARB® carbon-carbon composite material were set aside while others were subjected to a thermal shock test performed by subjecting the ceramic composite coated bodies to the flame of an oxyacetylene torch. Specifically, the coated bodies were exposed to the flame of an oxyacetylene torch for about 15 seconds. The temperature rise in the 15-second period was estimated to be from about room temperature to about 3500° C. After subjecting the ceramic composite coated bodies to the flame of the oxyacetylene torch for about 15 minutes, the coated bodies were allowed to cool to room temperature.

The method of Example 14 was substantially repeated to measure the flexural strength of the thermally shocked and non-thermally coated shocked uncoated bodies.

The results of the flexural strength measurements for the coated and uncoated bodies in the as received and thermally shocked conditions are summarized in Table VII. Specifically, Table VII shows that the formation of a titanium carbide coating on a Grade AXZ-5Q graphite body by the methods of this Example can improve the flexural strength of a thermally shocked body from about 40.4 megapascal to about 80.8 megapascal. The flexural strength of a coated thermally shocked K-KARB® carbon-carbon composite body can be improved from about 105.1 MPa to about 124 MPa.

EXAMPLE 17

The following Example demonstrates, among other things, a method for forming a reaction product coating on a variety of graphite substrates by reacting a parent metal vapor with the graphite substrate bodies at an elevated temperature. Specifically, the following Example demonstrates a method for forming a titanium carbide reaction product coating on a variety of graphite substrate bodies. More specifically, Table VIII sets forth the specific graphite substrate grades and sources, the sample weights prior to and after coating, the sample weight gains after coating, and the dimensions of the large and small diameters of each sample after coating for each of the coated graphite substrate bodies identified as Samples AF through AW.

Figure 14:
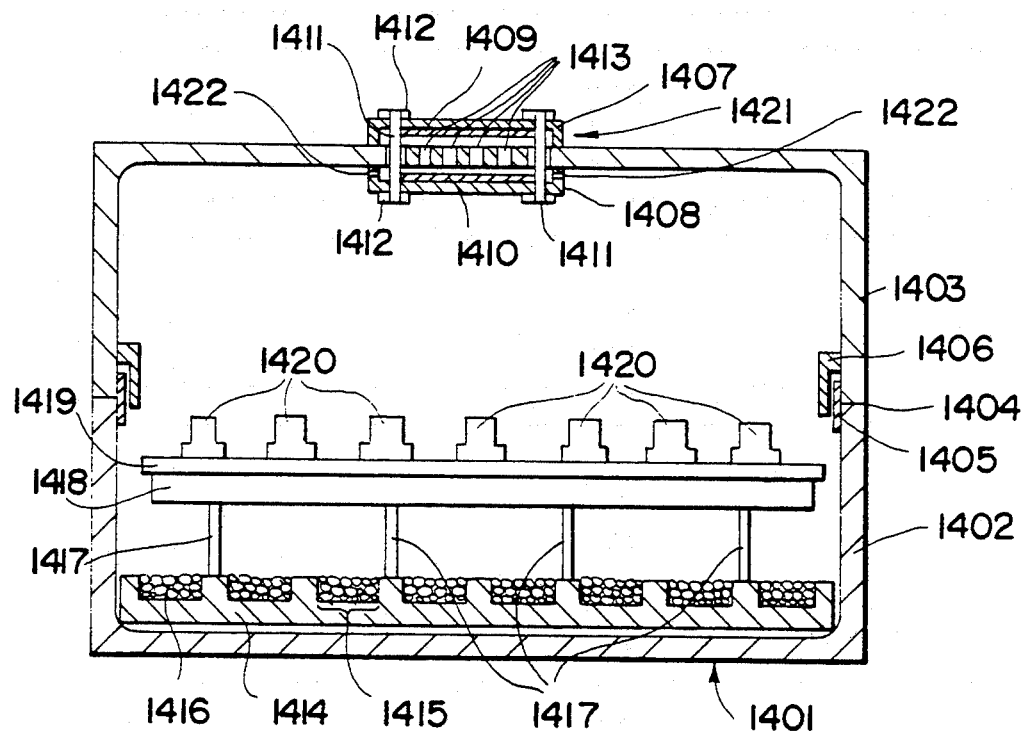
FIG. 14 is a schematic cross-sectional view of an assembly utilized to make samples in accordance with Example 17.

FIG. 14 is a cross-sectional schematic of a lay-up used in this Example to form reaction product coatings on a variety of graphite substrate bodies. Specifically, FIG. 14 is a cross-sectional schematic of a vapor deposition chamber 1401. The vapor deposition chamber 1401 was comprised of a lower chamber portion 1402, a parent metal source tray 1414 within the lower chamber portion 1402, a sample-support rack 1418, attached to the parent metal source tray 1414 by support rods 1417, an

TABLE VII

COMPARISON OF FLEXURAL STRENGTH PRIOR TO AND FOLLOWING THERMAL SHOCK
Flexural Strength (MPa)

| | Grade AXZ-5Q Graphite | | K-KARB ® Carbon-Carbon Composite | |
|---|---|---|---|---|
| | Uncoated | Coated | Uncoated | Coated |
| As Received | 58.7 ± 5.8 | 127.4 ± 18.1 | 123.7 ± 0.8 | 120.7 ± 2.3 |
| Thermally Shocked | 43.4 ± 6.9 | 80.8 ± 16.7 | 105.1 ± 4.9 | 124.4 ± 0.5 | upper chamber portion 1403, a parent metal vapor trap 1421 containing a graphite felt 1409 and a graphite fiber board 1410 and attached to upper portion chamber 1403.

More specifically, the lower chamber portion 1402 of the vapor deposition chamber 1401 measured about 17.5 inches (445 mm) long, about 11.5 inches (292 mm) wide, about 8 inches (203 mm) high and had a wall thickness of about 0.5 inch (13 mm). The lower chamber portion 1402 was machined from a piece of Grade AGSX graphite (Union Carbide Corporation, Carbon Product Division, Cleveland, Ohio). An engagement rail 1405 having a cross section measuring about 1.5 inches (38 mm) long and about 0.25 inch (6.3 mm) wide was attached to the inner surface and along the top of the Rower chamber portion 1402 so as to extend about 0.5 inch (13 mm) beyond the top of the lower chamber portion 1402.

The upper chamber portion 1403 of the vapor deposition chamber 1401 measured about 17.5 inches (445 mm) long, about 11.5 inches (292 mm) wide, about 8 inches (203 mm) high and had a wall thickness of about 0.5 inch (13 mm). The upper chamber portion 1403 further included a parent metal vapor trap 1421 which facilitated the communication between the atmosphere of a vacuum furnace and the atmosphere within the vapor deposition chamber 1401 while preventing the parent metal vapor from escaping into the vacuum furnace. The parent metal vapor trap 1421 incorporated thirteen communication holes 1413 (only four are depicted in FIG. 14) through and centrally located in the top of the upper chamber portion 1403. Five of the communication holes 1413 had a diameter of about 0.43 inch (11 mm) while the remaining eight communication holes 1413 had a diameter of about 0.25 inch (6.4 mm). An upper extended portion 1407 of the parent metal vapor trap 1421 measured about 6.0 inches (152 mm) long, 6.0 inches (152 mm) wide, 0.5 inch (13 mm) high, and had a wall thickness of about 0.25 inch (6.4 mm). The upper extended portion 1407 was machined from Grade AGSX graphite (Union Carbide Corporation, Carbon Product Division, Cleveland, Ohio). Several pieces of Grade GH graphite felt material 1409 (Fiber Materials, Inc., Biddeford, Me.) were placed into and filled the cavity of the upper extended portion 1407 of the parent metal vapor trap 1421. A lower extended portion 1408 of the parent metal vapor trap 1421 measured about 6.0 inches (152 mm) long, 6.0 inches (152 mm) wide, 0.5 inch (13 mm) high, and had a wall thickness of about 0.25 inch (6.4 mm). The lower extended portion 1408 was also machined from Grade AGSX graphite (Union Carbide Corporation, Carbon Product Division, Cleveland, Ohio). Fifty-two holes (only two depicted in FIG. 14) having an about 0.19 inch (4.8 mm) diameter were substantially equally spaced along the top and perimeter of lower extended portion 1408. A Grade 2300 G-BOARD® graphite fiber board 1410 (Materials Unlimited, Inc., Templeton, Mass.) was placed into and filled the cavity of the lower extended portion 1408 of the parent metal vapor trap 1421. The parent metal vapor trap 1421 was completed by fastening both the upper extended portion 1407 and lower extended portion 1408 over the communication holes 1413 through the top of the upper portion 1403 with four threaded graphite rods 1411, each having a diameter of about 0.25 inch (6.4 mm) and secured to the upper portion 1403 with graphite nuts 1412. A engagement rail receptor 1406 having a cross-section measuring about 0.63 (16 mm) wide and about 2.25 inches (57 mm) long was attached to the inner surface and along the bottom of the upper chamber portion 1403. A portion of the engagement rail receptor 1406 was cut out so that the engagement rail 1405 would fit into the cutout portion as depicted in FIG. 14.

The parent metal source tray 1414 was machined from Grade AGSX graphite (Union Carbide Corporation, Carbon Products Division, Cleveland, Ohio). The parent metal source tray 1414 measured about 16 inches (406 mm) long, 10 inches (254 mm) wide, 1 inch (25 mm) high and had a five by eight array of holes 1415 each having a diameter of about 1.5 inches (38 mm) and a depth of about 0.5 inch (13 mm). Additionally, the forty holes 1415 in the graphite metal source tray 1414 were approximately evenly spaced. The forty holes 1415 in the graphite metal source tray 1414 were filled with parent metal powder 1416 comprised of about −5 mesh, +20 mesh (particle diameter between about 850 μm and 4000 μm) titanium metal sponge (Micron Metals, Inc., Salt Lake City, Utah) to a depth ranging from about 0.25 inch (6.4 mm) to about 0.5 inch (13 mm).

The sample support rack 1418 was attached to the parent metal source tray 1414 by eight support rods 1417 (only four are depicted in FIG. 14). The sample support rack, machined from Grade ATJ graphite (Union Carbide Corporation, Carbon Products Division, Cleveland, Ohio), measured about 9.75 inches (248 mm) long, about 5 inches (127 mm) wide, about 1 inch (25 mm) high and had a wall thickness of about 0.5 inch (13 mm). The eight support rods 1417, machined from Grade AGSX graphite (Union Carbide Corporation, Carbon Products Division, Cleveland, Ohio), measured about 2 inches (51 mm) long and had an about 0.25 (6.4 mm) diameter.

The upper portion 1403 of the vapor deposition chamber 1401 was placed onto, and aligned with, the lower chamber portion 1402 of the deposition chamber 1401 so that engagement rail 1405 fit into the cut-out portions of engagement rail receptor 1406 to create a seal for the parent metal vapor. The vapor deposition chamber 1401, containing the parent metal powder 1416 in the graphite source tray 1414, was then placed into a vacuum furnace and the vacuum furnace door was closed. The vacuum furnace was then evacuated to a pressure of about 0.2 millitorr. After about 50 minutes at a pressure of about 0.2 millitorr, the vacuum furnace and its contents were heated to about 1900° C. at about 750° C. per hour while maintaining a pressure of about 0.2 millitorr. After about 2 hours at about 1900° C., with a pressure of about 0.2 millitorr, the vacuum furnace and its contents were cooled at about 900° C. per hour to about 1000° C. while maintaining a pressure of about 0.2 millitorr. The vacuum furnace and its contents were then cooled from about 1000° C. to about room temperature at about 125° C. per hour while maintaining a pressure of about 0.2 millitorr. This process was repeated two more times.

Eighteen graphite bodies 1420 (only seven are depicted in FIG. 14), as listed in Table VIII, having a machined surface finish and a first portion having a diameter of about 0.739 inch (18.8 mm) and a height of about 0.23 inch (5.8 mm) and a second portion having a diameter of about 0.497 inch (12.6 mm) and an average height of about 0.23 (5.8 mm) and concentrically aligned with and extending from the first portion, were cleaned for about 15 minutes in an ultrasonically agitated bath comprised by weight of about 50% ethanol and about 50% deionized water and dried in an air oven set at about 120° C. for about 0.33 hours (i.e., until weight losses due to heating at about 120° C. ceased). After drying substantially completely, the graphite substrate bodies 1420 were placed on a graphite support tray 1419 so that the first portion of each graphite substrate body 1420 contacted the graphite support ray 1419. The graphite support tray 1419 supporting the graphite substrate bodies 1402 was then placed on the support frame 1418 within the lower chamber portion 1402.

After the titanium parent metal 1416 had been replenished within the parent metal source tray 1414, the upper portion 1403 of the vapor deposition chamber 1401 was again placed onto and aligned with the lower

TABLE VIII

| Sample | Graphite Grade, Source | Sample Weight (grams) Coating Prior to | Sample Weight (grams) Coating After | Sample Weight Grain (grams) | Large Diameter (inches) Dimension after Coating | Small Diameter (inches) Dimension after Coating |
| --- | --- | --- | --- | --- | --- | --- |
| AF | AXF-5Q, Poco Graphite Inc., Decature, TX | 4.93 | 5.65 | 0.72 | 0.749 | 0.507 |
| AG | AXF-5Q, Poco Graphite Inc., Decature, TX | 4.90 | 5.61 | 0.71 | 0.748 | 0.507 |
| AH | ZXF-5Q, Poco Graphite Inc., Decature, TX | 4.79 | 5.50 | 0.71 | 0.748 | 0.506 |
| AI | ZXF-5Q, Poco Graphite Inc., Decature, TX | 4.78 | 5.49 | 0.71 | 0.747 | 0.506 |
| AJ | TM, Poco Graphite | 4.95 | 5.65 | 0.70 | 0.748 | 0.506 |

TABLE VIII-continued

| Sample | Graphite Grade, Source | Sample Weight (grams) Coating Prior to | After | Sample Weight Grain (grams) | Large Diameter (inches) Dimension after Coating | Small Diameter (inches) Dimension after Coating |
|---|---|---|---|---|---|---|
| | Inc., Decature, TX | | | | | |
| AK | TM, Poco Graphite Inc., Decature, TX | 4.91 | 5.63 | 0.72 | 0.748 | 0.506 |
| AL | 2020, Stackpole Carbon Co., St. Marys, PA | 4.70 | 5.37 | 0.67 | 0.748 | 0.506 |
| AM | 2020, Stackpole Carbon Co., St. Marys, PA | 4.70 | 5.40 | 0.70 | 0.748 | 0.506 |
| AN | G347, Tokai Carbon America, Inc., New York, NY | 5.03 | 5.73 | 0.70 | 0.748 | 0.507 |
| AO | G347, Tokai Carbon America, Inc., New York, NY | 5.02 | 5.72 | 0.70 | 0.748 | 0.506 |
| AP | G520, Tokai Carbon America, Inc., New York, NY | 5.03 | 5.72 | 0.69 | 0.748 | 0.506 |
| AQ | G520, Tokai Carbon America, Inc., New York, NY | 5.01 | 5.69 | 0.68 | 0.748 | 0.506 |
| AR | ATJ, Union Carbide, Carbon Products Division, Cleveland, OH | 4.69 | 5.38 | 0.69 | 0.748 | 0.506 |
| AS | ATJ, Union Carbide, Carbon Products Division, Cleveland, OH | 4.73 | 5.40 | 0.67 | 0.748 | 0.506 |
| AT | ZTA, Union Carbide, Carbon Products Division, Cleveland, OH | 5.14 | 5.83 | 0.69 | 0.749 | 0.507 |
| AU | ZTA, Union Carbide, Carbon Products Division, Cleveland, OH | 5.15 | 5.86 | 0.71 | 0.748 | 0.507 |
| AV | AGSX (G-10), Union Carbide, Carbon Products Division, Cleveland, OH | 4.67 | 5.36 | 0.69 | 0.748 | 0.506 |
| AW | AGSX (G-10), Union Carbide, Carbon Products Division, Cleveland, OH | 4.65 | 5.34 | 0.69 | 0.748 | 0.506 | chamber portion 1402 of the deposition chamber 1401. The vapor deposition chamber 1401 and its contents were then placed into a vacuum furnace and the vacuum furnace door was closed. The vacuum furnace was then evacuated to a pressure of about 0.2 millitorr. After about 50 minutes at a pressure of about 0.2 millitorr, the vacuum furnace and its contents were heated to about 1900° C. at about 750° C. per hour. After about 2 hours at about 1900° C., with a pressure of about 0.2 millitorr, the vacuum furnace and its contents were cooled at about 900° C. per hour to about 1000° C. while maintaining a pressure of about 0.2 millitorr. The vacuum furnace and its contents were then cooled from about 1000° C. to about room temperature at about 125° C. per hour while maintaining a pressure of about 0.2 millitorr.

At about room temperature, the vacuum furnace door was opened, the vapor deposition chamber 1401 was removed from the furnace, disassembled and the eighteen graphite substrate bodies 1420 were removed from the lower chamber portion 1402 of the vapor position chamber 1401. It was noted that a mirror-like finish coated the surface of the graphite substrate bodies 1420. Further, as summarized in Table VIII, the graphite bodies 1420 experienced weight gains and diameter increases relative to those parameters prior to exposure to the titanium parent metal-vapor cloud within the vapor deposition chamber 1401.

Thus, this Example demonstrates that the methods of the Example are compatible with a variety of graphite substrate bodies.

EXAMPLE 18

The following Example demonstrates a method for forming a reaction product coating on a graphite substrate coupon by reacting a parent metal vapor with the graphite substrate coupon at an elevated temperature. Specifically, this Example demonstrates a method for forming a silicon carbide coating on various graphite substrate coupons by reacting a silicon parent metal vapor with the various carbon substrate coupons at an elevated temperature.

The grades and sources of the graphite substrate coupons used in this Example include: Grade AXF-5Q graphite (Poco Graphite Inc., Decature, Tex.), Grade TM graphite (Poco Graphite Inc., Decature, Tex.), Grade ATJ graphite (Union Carbide Corporation, Carbon Products Division, Cleveland, Ohio), Grade H490 graphite (Great Lakes Carbon Corporation, Morgantown, N.C.), and Grade AGSX graphite (Union Carbide Corporation, Carbon Products Division, Cleveland, Ohio). The graphite substrate coupons made from the Grade AXF-5Q and Grade TM graphite measured about 1 inch (25 mm) square and about 0.13 inch (33 mm) thick while the graphite substrate coupons made from the Grade ATJ graphite, Grade H490 graphite, and Grade AGSX graphite measured about 1 inch (25 mm) square and about 0.24 inch (6.1 mm) thick. Each of the graphite substrate coupons was prepared for coating by first placing the coupons in a ultrasonic bath containing a solution comprised by weight of about 50% ethanol and about 50% deionized water for about 15 minutes. After the graphite substrate coupons were removed from the ultrasonic bath, the graphite substrate coupons were dried in air at about room temperature for about 5 minutes. The graphite substrate coupons were then placed into an oven, set at about 120° C. and their weight was monitored until there was substantially no weight change. Typically, the graphite substrate coupons exhibited no weight change after about 7 minutes at about 120° C. After drying substantially completely, the graphite substrate coupons were placed on the support rods within the lower chamber portion of a vapor deposition chamber, which was configured substantially the same as that described in Example 10 except that the parent-metal source tray contained silicon parent metal instead of titanium parent metal.

The upper chamber portion of the vapor deposition chamber was placed into and aligned with the lower portion of the deposition chamber. The vapor deposition chamber and its contents were then placed into a vacuum furnace and the vacuum furnace door was closed. The vacuum furnace was then evacuated to a pressure of about 0.2 millitorr. After about 50 minutes at a pressure of about 0.2 millitorr, the vacuum furnace and its contents were heated to about 1500° C. at about 500° C. per hour while maintaining a pressure of about 0.2 millitorr. After about 2 hours at about 1500° C. with a pressure of about 0.2 millitorr, the vacuum furnace and its contents were cooled to about room temperature at about 500° C. per hour while maintaining a pressure of about 0.2 millitorr.

At about room temperature, the vacuum furnace door was opened, the vapor deposition chamber was removed from the furnace, disassembled, and the graphite substrate coupons were removed from the lower chamber portion of the vapor deposition chamber. It was noted that the surface finish of the graphite substrate coupons had changed because the surfaces had been subjected to and had reacted with a parent metal vapor cloud comprising silicon metal to form a reaction product according to the Example.

Thus, this Example demonstrates that the surfaces of a variety of graphite substrate coupons may be altered by subjecting the graphite substrate coupons to a silicon parent metal cloud.

EXAMPLE 19

The following Example demonstrates, among other things, a method for forming a reaction product coating on a graphite substrate coupon by reacting a parent metal vapor with a graphite substrate coupon at an elevated temperature. Specifically, the following Example demonstrates a method for forming a niobium carbide reaction product coating on a graphite substrate coupon by reacting a niobium parent metal vapor with a graphite substrate coupon at an elevated temperature.

Figure 15:
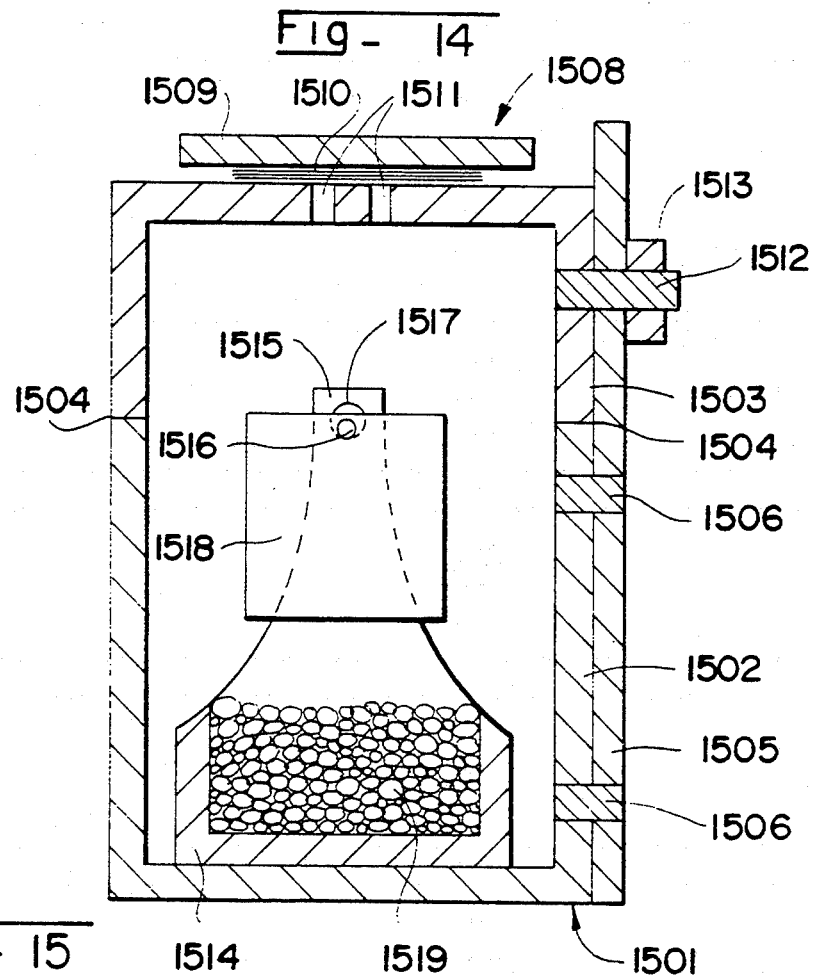
FIG. 15 is a schematic cross-sectional view of an assembly utilized to make samples in accordance with Example 19.

FIG. 15 is a cross-sectional schematic of the lay-up used in this Example to form a reaction product coating on a graphite substrate coupon. Specifically, FIG. 15 shows a vapor deposition chamber 1501 comprising a lower chamber portion 1502, a parent metal source tray 1514 within lower chamber portion 1502, a sample support rack 1515, extending from the parent metal source tray 1514, an upper chamber portion 1503, a parent metal vapor trap 1508 containing a graphite felt 1509 and attached to upper portion chamber 1503.

More specifically, the lower chamber portion 1502 of the vapor deposition chamber 1501 measured about 3 inches (76 mm) square, about 4 inches (102 mm) high and had a wall thickness of about 0.25 inch (6.4 mm). The lower chamber portion 1502 was machined from a piece of Grade ATJ graphite (Union Carbide Corporation, Carbon Product Division, Cleveland, Ohio). An alignment rail 1505 measuring about 7 inches (178 mm) long, about 1 inch (25 mm) wide, and about 0.25 inch (6.3 mm) thick was attached to the outer surface and along one side of the lower chamber portion 1502 so as to extend about 3 inches (76 mm) beyond the top of the lower chamber portion 1502. The alignment rail 1505 was attached to the lower chamber portion 1502 with a threaded graphite rod having a diameter of about 0.25 inch (6.4 mm).

The upper chamber portion 1503 of the vapor deposition chamber 1501 measured about 3 inches (76 mm) square, about 2 inches (51 mm) high and had a wall thickness of about 0.25 inch (6.4 mm). The upper chamber portion 1503 further included a parent metal vapor trap 1508 which facilitated the communication between the atmosphere of a vacuum furnace with the atmosphere within the vapor deposition chamber 1501, while preventing the parent metal vapor from escaping into the vacuum furnace. The parent metal vapor trap 1508 incorporated five communication holes 1511 (only two are depicted in FIG. 15) through and centrally located in the top of the upper chamber portion 1503. The communication holes 1511 had a diameter of about 0.31 inch (8 mm). A top plate 1509 of the parent metal vapor trap 1508 measured about 2.5 inches (64 mm) long, 2.5 inches (64 mm) wide, and 0.25 inch (6.4 mm) thick. The top plate 1509 was machined from Grade ATJ graphite (Union Carbide Corporation, Carbon Product Division, Cleveland, Ohio). A Grade GH graphite felt material 1510 (Fiber Materials, Inc., Biddeford, Me.) having a thickness of about 0.13 inch (3.3 mm) was placed between the top plate 1509 of the parent metal vapor trap 1508 and the top of the upper chamber portion 1503. Additionally, a threaded rod 1512 extended from one side, as shown, of the upper chamber portion 1503 to secure the upper chamber portion 1503 to the alignment rail 1515 of the lower chamber portion 1502, by using a nut 1513.

The parent metal source tray 1514 was machined from Grade ATJ graphite (Union Carbide Corporation, Carbon Products Division, Cleveland, Ohio). The parent metal source tray 1514 measured about 2 inches (51 mm) square, about 1 inch (25 mm) high at two opposite ends, about 4 inches (102 mm) high at the remaining two opposite ends and had a wall thickness of about 0.25 inch (6.4 mm). The sample support rack 1515 comprised the two 4 inch (102 mm) walls of the parent metal source tray 1514 and had a through hole 1517 for receiving a support rod 1516. The cavity in the graphite metal source tray 1514 was filled with parent metal powder 1519 comprising about −325 mesh, (particle diameter less than about 45 μm) niobium metal (Atlantic Equipment Engineers, Bergenfield, N.J.) and weighing about 137 grams.

A graphite substrate coupon 1518 measuring about 1.5 inches (38 mm) square and about 0.25 inch (6.4 mm) which was cleaned for about 15 minutes in an ultrasonically agitated bath comprising by weight about 50% ethanol and about 50% deionized water. After removal from the ultrasonically agitated bath, the graphite substrate coupon 1518 was dried at about room temperature for about 5 minutes and then substantially completely dried in an air oven set at about 120° C. for about 7 minutes (i.e., until weight losses due to drying at about 120° C. substantially ceased). After drying substantially completely, the graphite substrate coupon 1518 was placed on a support rod 1516. The graphite support rod 1516 with the graphite substrate body 1518 was then placed on the support frame 1515 of the parent metal source tray 1514 within the lower chamber portion 1502.

The upper portion 1503 of the vapor deposition chamber 1501 was placed onto, aligned with and secured to the lower chamber portion 1502 of the deposition chamber 1501. The vapor deposition chamber 1501 and its contents were then placed into a vacuum furnace and the vacuum furnace door was closed. The vacuum furnace was then evacuated to a pressure of about 0.2 millitorr. After about 60 minutes at a pressure of about 0.2 millitorr, the vacuum furnace and its contents were heated to about 2250° C. at about 750° C. per hour. After about 4 hours at about 2250° C., with a pressure of about 0.2 millitorr, the vacuum furnace and its contents were cooled at about 1000° C. per hour to about 1000° C. while maintaining a pressure of about 0.2 millitorr. The vacuum furnace and its contents were then cooled from about 1000° C. to about room temperature at about 125° C. per hour while maintaining a pressure of about 0.2 millitorr.

At about room temperature, the vacuum furnace door was opened, the vapor deposition chamber 1501 was removed from the furnace, disassembled and the graphite substrate coupon 1518 were removed from the lower chamber portion 1502 of the vapor position chamber 1501. It was noted that the surface of the graphite substrate coupon 1518 possessed a mat-like finish. Thus, this Example demonstrates that the surface of a graphite substrate coupon may be altered by subjecting the surface to a niobium parent metal cloud according to the method of the present invention.

EXAMPLE 20

The following Example demonstrates, among other things, a method for forming a reaction product coating on a graphite substrate coupon by reacting a parent metal vapor with a graphite substrate coupon at an elevated temperature. Specifically, the following Example demonstrates a method for forming a hafnium carbide reaction product coating on a graphite substrate coupon by the methods of the present invention.

Figure 16A:
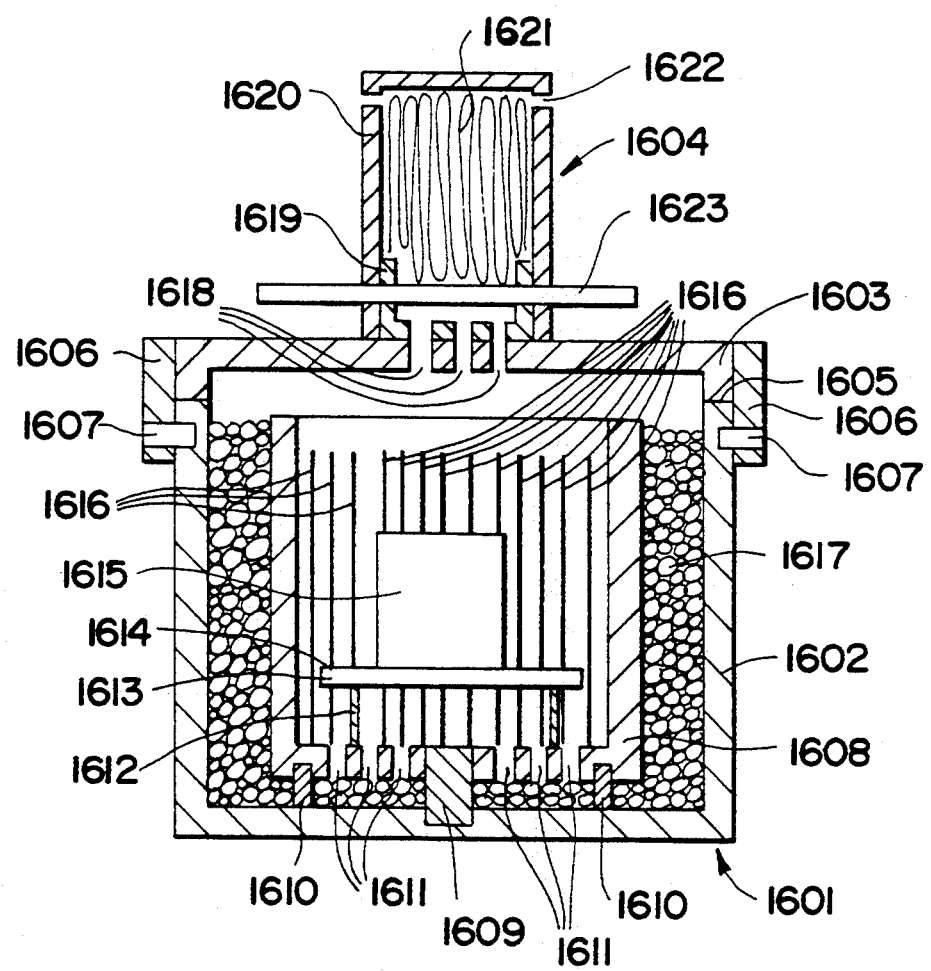
FIG. 16a is a schematic cross-sectional view of an assembly utilized to make samples in accordance with Example 20.

FIG. 16a is a cross-sectional schematic of the lay-up used in this Example to form a reaction product coating on a graphite substrate coupon. Specifically, FIG. 16a shows a vapor deposition chamber 1601 comprising a lower chamber portion 1602, a slotted parent metal support member 1608 within the lower chamber portion 1602, a sample support rack 1613 attached to the slotted parent metal support member 1608 by support rods 1612, an upper chamber portion 1603, a parent metal vapor trap 1604 containing a graphite felt 1621 and attached to the top of upper chamber portion 1603.

More specifically, the lower chamber portion 1602 of the vapor deposition chamber 1601 had an outer diameter measuring about 4.5 inches (114 mm), a height of about 3.5 inches (89 mm) and a wall thickness of about 0.25 inch (6.4 mm). The lower chamber portion 1602 was machined from a piece of Grade AGSX graphite (Union Carbide Corporation, Carbon Product Division, Cleveland, Ohio). Two securing tabs 1606 contoured to the shape of the outer chamber of the lower chamber portion 1602 and measuring about 1 inch (25 mm) long, about 1 inch (25 mm) wide, and about 0.25 inch (6.3 mm) thick were attached to the outer surface of the lower chamber portion 1602, along the top and at opposite ends of the lower chamber portion 1602 so as to extend about 0.5 inch (13 mm) beyond the top of the lower chamber portion 1602.

The upper chamber portion 1603 of the vapor deposition chamber 1601 had an outer diameter measuring about 4.5 inches (114 mm), a height measuring about 0.5 inch (13 mm), and a wall thickness measuring about 0.25 inch (6.4 mm). The upper chamber portion 1603 further included a parent metal vapor trap 1604 which facilitated the communication between the atmosphere of a vacuum furnace with the atmosphere of vapor deposition chamber 1601, while preventing the parent metal vapor from escaping into the vacuum furnace. The parent metal vapor trap 1604 incorporated three communication holes 1618 through and centrally located in the top of the upper chamber portion 1603. The communication holes 1618 had a diameter of about 0.13 inch (3.3 mm). An extended portion 1620 of the parent metal vapor trap 1604 measured about 2.13 inches (54 mm) long, had an outer diameter measuring about 1.5 inches (38 mm), and had a wall thickness of about 0.13 inch (3.3 mm). The extended portion 1620 was machined from Grade AGSX graphite (Union Carbide Corporation, Carbon Product Division, Cleveland, Ohio). Several layers of Grade GH graphite felt material 1621 (Fiber Materials, Inc., Biddeford, Me.) were placed into the cavity within the extended portion 1620 of the parent metal vapor trap 1604. An attachment portion 1619 of the parent metal vapor trap 1604, had an outer diameter measuring about 1.25 inches (32 mm), a height measuring 0.5 inch (13 mm), and a wall thickness measuring about 0.13 inch (3.3 mm). The lower attachment portion 1619 was also machined from Grade AGSX graphite (Union Carbide Corporation, Carbon Product Division, Cleveland, Ohio). Holes for receiving locking pin 1623, and having an about 0.13 inch (3.3 mm) diameter, were drilled through both the extended portion 1620 and the attachment portion 1619 of the parent metal vapor trap 1604. The parent metal vapor trap 1604 was completed by fastening, with graphite dowels, the attachment portion 1619 of the parent metal vapor trap 1604 to the upper chamber portion 1603.

The slotted parent metal support member 1608 was machined from Grade AGSX graphite (Union Carbide Corporation, Carbon Products Division, Cleveland, Ohio). The parent metal support member 1608 had an outer diameter measuring about 3 inches (76 mm), a height measuring about 2.75 inches (70 mm) and a wall thickness measuring about 0.25 inch (6.4 mm). The slotted parent metal support member 1608 further comprised an array of holes 1611 through its bottom, each hole having a diameter measuring about 0.13 inch (3.3 mm), forty-three slots 1616 each measuring about 0.08 inches wide and about 2.5 inches (mm) along the perimeter, a locater pin 1609 having a diameter measuring about 0.38 inch (9.7 mm) and support pins 1610 each having a diameter measuring about 0.13 (3.3 mm). The distance between the outer surface of the slotted parent metal support member 1608 and the inner surface of the lower chamber portion 1602 of the deposition chamber 1601 was about 0.5 inch (13 mm). The slotted parent metal support member 1608 provided a means for supporting solid parent metal while at an elevated temperature, which assists in providing a sufficient amount of a parent metal vapor during the process.

The sample support rack 1613 was attached to the parent metal support member 1608 by eight support rods 1612 (only two are depicted in FIG. 16a). The sample support rack 1613, machined from Grade AGSX graphite (Union Carbide Corporation, Carbon Products Division, Cleveland, Ohio), had an outer diameter measuring about 2.5 inches (64 mm), a height measuring about 0.25 inch (6.3 mm) and a wall thickness of about 0.25 inch (6.4 mm). The support rods 1612, machined from Grade AGSX graphite (Union Carbide Corporation, Carbon Products Division, Cleveland, Ohio), measured about 1 inch (25 mm) long and had a diameter measuring about 0.13 (3.3

Prior to aligning the upper chamber portion 1603 of the vapor deposition chamber 1601 with the lower chamber portion 1602 of the vapor deposition chamber 1601, a graphite crucible containing about 119 grams of a parent metal comprising −5 mesh, +20 mesh (particle diameter from about 850 microns to about 4000 microns) titanium metal sponge (Micron Metals, Inc., Salt Lake City, Utah) was placed into the lower chamber portion and on the sample rack 1613. The vapor deposition chamber 1601, containing the parent metal powder in the graphite crucible, was then placed into a vacuum furnace and the vacuum furnace door was closed. The vacuum furnace was then evacuated to a pressure of about 0.2 millitorr. After about 50 minutes at a pressure of about 0.2 millitorr, the vacuum furnace and its contents were heated to about 1900° C. at about 750° C. per hour while maintaining a pressure of about 0.2 millitorr. After about 2 hours at about 1900° C., with a pressure of about 0.2 millitorr, the vacuum furnace and its contents were cooled at about 900° C. per hour to about 1000° C. while maintaining a pressure of about 0.2 millitorr. The vacuum furnace and its contents were then cooled from about 1000° C. to about room temperature at about 125° C. per hour while maintaining a pressure of about 0.2 millitorr. After replenishing the titanium parent metal, the processing was repeated twice. At about room temperature, the graphite crucible containing the residual titanium parent metal was removed from the deposition chamber 1601.

Hafnium parent metal sponge 1617 having a size of about −¼ mesh, +20 mesh (particle diameter from about 850 microns to about 6300 microns, Teledyne Wah Chang, Albany, Albany, Oreg.) weighing about 1200 grams was then placed into the space between the inner surface of the lower chamber portion 1602 and the outer surface of the slotted parent metal support member 1608.

Figure 16B:
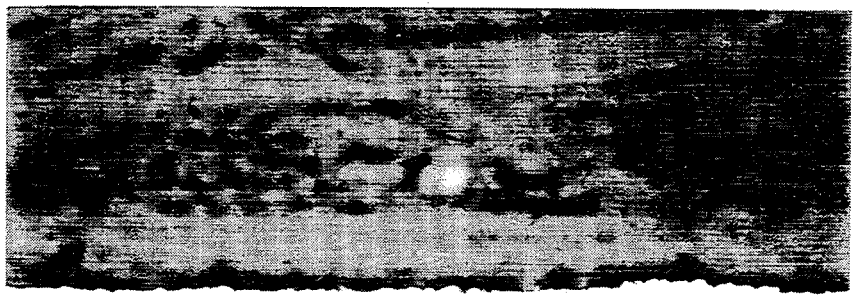
FIG. 16b is a photomicrograph taken at about 400× of a sample made in accordance with Example 20.
Figure 16B:
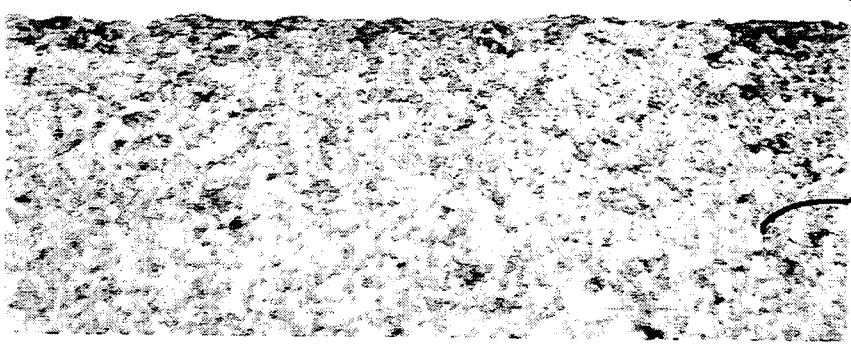

After sanding the surfaces with 1200 grit (average particle diameter of about 4 microns) silicon carbide paper, two graphite substrate coupons 1615 (only one is depicted in FIG. 16) comprised of grade AXZ-5Q graphite (Poco Graphite, Inc., Decature, Tex.) and measuring about 1 inch (25 mm) square and about 0.13 inch (3.3 mm) thick, were cleaned for about 15 minutes in an ultrasonically agitated bath comprising acetone and were dried in an air oven set at about 120° C. for about 0.25 hours (i.e., until weight losses due to heating at about 120° C. substantially ceased). After drying substantially completely, the graphite substrate coupons 1615 were placed on a graphite support tray 1614 so that a face measuring about 1 inch (25 mm) by about 0.13 inch (3.3 mm) contacted the graphite support tray. The graphite support tray 1614, which measured about 0.045 inch (1.1 mm) thick, with the graphite substrate coupons 1615 was then placed on the support frame 1613 within the lower chamber portion 1602.

The upper chamber portion 1603 of the vapor deposition chamber 1601 was again placed onto and aligned with the lower chamber portion 1602 of the deposition chamber 1601. The vapor deposition chamber 1601 and its contents were then placed into a vacuum furnace and the vacuum furnace door was closed. The vacuum furnace was then evacuated to a pressure of about 0.2 millitorr. After about 50 minutes at a pressure of about 0.2 millitorr, the vacuum furnace and its contents were heated to about 1000° C. at about 750° C. per hour while maintaining a pressure of less than about 60 millitorr. At about 1000° C., the pressure within the vacuum furnace was allowed to increase to a pressure range between about 60 millitorr and about 250 millitorr and the vacuum furnace and its contents were heated from about 1000° C. to about 2000° C. at about 750° C. per hour. After about 5 hours at about 2000° C., with a pressure ranging from about 60 millitorr to about 250 millitorr, the vacuum furnace and its contents were cooled at about 1000° C. per hour to about 1000° C. while maintaining a pressure ranging from about 60 millitorr to about 250 millitorr. The vacuum furnace and its contents were then cooled from about 1000° C. to about room temperature at about 125° C. per hour while maintaining a pressure ranging from about 60 millitorr to about 250 millitorr.

At about room temperature, the vacuum furnace door was opened, the vapor deposition chamber 1601 was removed from the furnace, disassembled and the two graphite substrate coupons 1615 were removed from the lower chamber portion 1602 of the vapor position chamber 1601. It was noted that the hafnium sponge material had not melted to any significant extent. Further, it was noted that a light gray metallic finish coated the surface of the graphite substrate coupons 1615. One of the graphite substrate coupons was intentionally fractured and its surface was examined using an electron microscope. The results of the examination indicated that a coating measuring about 21 microns had formed. A portion of the coating was subjected to x-ray diffraction analysis, which indicated that the constituents in the area comprising the coating included, among other phases, hafnium carbide. Furthermore, one of the graphite substrate coupons was cut, mounted and polished for metallographic examination. FIG. 16b is a photomicrograph taken at a magnification of about 200× of the reaction product coating 51 on the graphite substrate 52.

Thus, this Example generally demonstrates that a parent metal source may comprise a solid parent metal having a substantial vapor pressure under the operating conditions of the invention. Further this Example specifically demonstrates that a hafnium carbide composite can be formed according to the methods of the present invention.

EXAMPLE 21

The following Example demonstrates a method for forming a reaction product coating on a molybdenum substrate by reacting a parent metal vapor with a molybdenum substrate coupon at an elevated temperature. Specifically, this Example demonstrates a method for forming a molybdenum silicide coating on a molybdenum substrate coupon by reacting a parent metal vapor comprising silicon with the molybdenum substrate coupon at an elevated temperature.

The three molybdenum substrate coupon rods used in this Example were obtained from Schwarzkopf Development Corporation, Holliston, Mass., and had a purity of about 99.95 weight percent molybdenum. Furthermore, each of the molybdenum substrate coupons had a diameter measuring about 0.5 inch (13 mm) and a length measuring about 2.0 inches (51 mm). Each of the molybdenum substrate coupons was prepared for coating by placing the coupons in an ultrasonic bath for about 15 minutes, said bath containing a solution comprising by weight about 50% ethanol and about 50% deionized water. After the molybdenum substrate coupons were removed from the ultrasonic bath, the molybdenum substrate coupons were dried in an air at about room temperature for about five minutes. The molybdenum substrate coupons were then placed into an oven, set at about 120° C. and the weight was monitored until there was substantially no weight change. Typically, the molybdenum substrate coupons exhibited no weight change after about 7 minutes at about 120° C. in the oven. After drying substantially completely, the molybdenum substrate coupons were placed on substrate support rods within the lower chamber portion of a vapor deposition chamber substantially the same as that described in Example 10, except that a parent metal powder comprising titanium parent metal was replaced with particulate silicon parent metal.

The upper chamber portion of the vapor deposition chamber was placed onto and aligned with the lower chamber portion of the deposition chamber. The vapor deposition chamber and its contents were then placed into a vacuum furnace, and the vacuum furnace door was closed. The vacuum furnace was then evacuated to a pressure of about 0.2 millitorr. After about 50 minutes at a pressure of about 0.2 millitorr, the vacuum furnace and its contents were heated to about 1500° C. at about 500° C. per hour while maintaining a pressure of about 0.2 millitorr. After about 2 hours at about 1500° C. with a pressure of about 0.2 millitorr, the vacuum furnace and its contents were cooled to about room temperature at a rate of about 500° C. per hour while maintaining a pressure of about 0.2 millitorr.

Figure 17:
FIG. 17 is a photomicrograph taken at about 200× of a sample made in accordance with Example 21.
Figure 17:
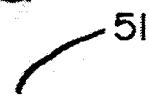

At about room temperature the vacuum furnace door was opened, the vapor deposition chamber was removed from the furnace, disassembled, and the molybdenum substrate coupons were removed from the lower chamber portion of the vapor deposition chamber. It was noted that the color of the surface of the molybdenum substrate coupons had changed from silver to dark gray by subjecting the surfaces to a silicon parent metal vapor cloud according to the method of the Example. Further, the molybdenum substrate coupons exhibited a weight change of about 0.5, 0.48, and 0.48 grams, respectively, and an increase in diameter of about 0.007, 0.006, and 0.006 inches, respectively. The increase in diameter of the molybdenum substrate coupons and the change in color of the molybdenum substrate coupons suggested that molybdenum silicide had formed on the surface of the molybdenum substrate coupons. Furthermore, one of the molybdenum substrate coupons was cross sectioned, mounted, and polished for metallographic examination using an optical microscope. FIG. 17 is a photomicrograph taken at about 200× of the composite coating 51 on the molybdenum substrate 52.

Thus, this Example demonstrates that a reaction product coating can be formed on a molybdenum substrate coupon by subjecting the substrate to a parent metal vapor cloud comprised of silicon metal vapor.

EXAMPLE 22

The following Example demonstrates a method for forming a reaction product coating on a graphite substrate by heating the graphite substrate in the presence of at least two sources of parent metal vapor having different chemical compositions to permit reaction between the different parent metal vapors and the substrate and/or any formed reaction products. Specifically, this Example demonstrates a method for co-reacting at least a silicon parent metal vapor and a titanium parent metal vapor with a graphite substrate coupon to form at least one reaction product coating.

The method of Example 3 was substantially repeated except that the one graphite parent metal source tray was replaced with two, each having an outer diameter of about 2 inches and a wall thickness of about 0.25 inches (6.3 mm). A first parent metal source tray had a height of about 1 inch (25 mm). In addition, from the top of the first parent metal source tray extended four support legs, each having a height of about 0.5 inch (33 mm), which permitted the parent metal from within this first source tray to communicate with the atmosphere of the vapor deposition chamber while supporting a second parent metal source tray. The second parent metal source tray had a height of about 1 inch (25 mm). The first parent metal source tray was filled with a parent metal comprising silicon weighing about 45 grams. The second parent metal source tray was filled with a parent metal comprising titanium, which was the same titanium as that described in Example 1, and weighing about 45 grams. The first and second parent metal source trays were placed into the bottom of the lower chamber portion of the deposition chamber. Two substrate coupons comprising Grade AXZ-5Q graphite (Poco Graphite, Inc., Decature, Tex.), each measuring about 1 inch (25 mm) square and about 0.13 inch (3.3 mm) thick, were prepared substantially according to the method of Example 3, except that no boron carbide was placed on the surface of the graphite substrate coupons. The graphite substrate coupons were then placed on the support rods within the lower chamber portion and the vapor deposition chamber was assembled to form a lay-up.

The lay-up and its contents were then placed into a vacuum furnace, and the vacuum furnace door was closed. The vacuum furnace was then evacuated to a pressure of about 0.2 millitorr. After about 50 minutes at about 0.2 millitorr, the vacuum furnace and its contents were heated to about 500° C. at about 250° C. per hour while maintaining a pressure of less than about 60 millitorr. The vacuum furnace was then heated from about 500° C. to about 1000° C. at about 750° C. per hour while maintaining a pressure of less than about 60 millitorr. At about 1000° C., the pressure within the vacuum furnace was allowed to increase to a pressure ranging between about 60 millitorr to about 250 millitorr, and the vacuum furnace and its contents were heated from about 1000° C. to about 1900° C. at about 750° C. per hour. After about 2 hours at about 1900° C. with a pressure ranging from about 60 millitorr to about 250 millitorr, the vacuum furnace and its contents were cooled at about 900° C. per hour to about 1000° C. while maintaining a pressure ranging from about 60 millitorr to about 250 millitorr. Then the vacuum furnace and its contents were cooled from about 1000° C. to about room temperature at about 125° C. per hour while maintaining a pressure ranging from about 60 millitorr to about 250 millitorr. At about room temperature, the vacuum pump was turned off, the vacuum furnace was allowed to adjust to atmospheric pressure and the lay-up and its contents were removed from the furnace.

After the lay-up was disassembled, the graphite substrate coupons were removed from the vapor deposition chamber and it was noted that the appearance of the surface of the graphite substrate coupons had changed.

Thus, this Example demonstrates that a reaction product coating can be formed on the surface of graphite substrate by subjecting the substrate to a parent metal vapor cloud comprising at least two parent metals.

EXAMPLE 23

The following Example demonstrates a method for forming a reaction product coating on a graphite substrate by applying to the surface of a graphite substrate a first layer of material comprising a solid oxidant, then a second layer of material comprising a parent metal powder and heating the coated graphite substrate in the presence of a parent metal vapor to permit the formation of reaction product due to a reaction between the parent metal powder and/or the parent metal vapor with the solid oxidant, and/or a reaction between the parent metal powder and/or the parent metal vapor with the graphite substrate and/or reaction between formed or forming reaction product(s). More specifically, the following Example demonstrates a method for forming a composite coating comprising zirconium carbide and zirconium boride on a graphite substrate by applying a first layer comprising boron carbide powder, a second layer comprising a zirconium parent metal powder, and heating the powder-covered graphite substrate in the presence of a zirconium parent metal vapor to permit the reaction between the zirconium parent metal powder, the boron carbide, and the zirconium parent metal vapor and/or the graphite substrate.

Table IX shows the amount of boron carbide powder and zirconium parent metal powder applied to a particular grade of substrate coupon, the thickness at which these powders were applied and the weight ratio of zirconium parent metal powder to boron carbide powder applied to the substrates. Run No. 1 included a total of four samples similar to Sample AX, three samples similar to Sample AY, and three samples similar to Sample AZ for a total of 10 samples, whereas Run No. 2 included four samples similar to Sample BA and three samples similar to Sample BB for a total of seven samples.

Each of Samples AX through BB were prepared by the following method. After the Samples were cut to the desired dimensions, they were immersed in an ultrasonic bath comprising ethanol. Once removed from the ethanol bath, the samples were placed into an air oven set at about 120° C. for about 20 minutes, removed from the oven and then allowed to cool to about room temperature.

At room temperature, a mixture comprising by weight about 40% TETRABOR® 1000 grit (average particle diameter of about 5 microns) boron carbide (ESK Engineered Ceramics, New Cannan, Conn.), about 30% deionized water, about 10% ELMER's® polyvinyl acetate professional carpenters wood glue (Borden Chemical, Inc., Columbus, Ohio), and about 20% ethanol was sprayed onto the surfaces of the graphite substrate coupons. An air brush (Model 150, Badger, Franklin Park, Ill.) set at 30 psi was used to apply the mixture. The graphite substrate coupons were then allowed to air dry. This procedure was repeated five times after which the boron carbide coated graphite substrate coupons were placed into an air oven set at

TABLE IX

| Sample | Graphite Grade and Source | Sample Dimension | Total # of Similar Samples | 1000 grit B$_4$C Weight (grams) | 1000 grit B$_4$C Thickness (inches) | −50 Mesh Zr Powder Weight (grams) | −50 Mesh Zr Powder Thickness (inches) | Zr/B$_4$C Ratio |
|---|---|---|---|---|---|---|---|---|
| | | | RUN NO. 1 | | | | | |
| AX | AXF-5Q, Poco Graphite Inc., Decature, TX | | 4 | 0.56 | 0.015 | 5.6 | 0.168 | 10 |
| AY | AGSX, Union Carbide, Carbon Products Division, Cleveland, OH | | 3 | 0.28 | 0.013 | 2.8 | 0.111 | 10 |
| AZ | ATJ, Union Carbide, Carbon Products Division, Cleveland, OH | | 3 | 0.25 | 0.013 | 2.5 | 0.106 | 10 |
| | | | RUN NO. 2 | | | | | |
| BA | AXF-5Q, Poco Graphite Inc., Decature, TX | | 4 | 0.81 | 0.001 | 8.1 | 0.061 | 10 |
| BB | ISO-88, TTAmerica, Portland, OR | | 3 | 0.12 | 0.006 | 1.2 | 0.042 | 10 |

Table IX summarizes the parameters for two runs that demonstrate the formation of a ceramic composite coating comprising zirconium carbide and zirconium boride on various graphite substrates. Specifically, Table IX contains the parameters used for forming composite coatings comprising zirconium carbide and zirconium boride on Grade AXF-5Q graphite (Poco Graphite Inc., Decature, Tex.), Grade AGXS graphite (Union Carbide Corporation, Carbon Products Division, Cleveland, Ohio), Grade ATJ graphite (Union Carbide Corporation, Carbon Products Division, Cleveland, Ohio), and Grade ISO-88 graphite (TTAmerica, Portland, Oreg.) using a 1000 grit (average particle diameter of about 5 μm) boron carbide powder and −50 mesh (particle diameter less than about 297 μm) zirconium parent metal. Additionally, about 45° C. for about 20 minutes. The boron carbide coated graphite substrate coupons were then weighed and the coating thickness measured.

The boron carbide coated graphite substrate coupons were then sprayed with a solution comprising by weight about 50% deionized water, about 330% ethanol alcohol, and about 17% ELMER'S® polyvinyl acetate professional carpenters wood glue (Borden Chemical, Inc., Columbus, Ohio). The airbrush described above, and set at a pressure of about 10 lbs per square inch, was used to apply the solution. After the boron carbide coated substrate was wet, the −50 mesh zirconium powder was sprinkled over and was applied to each surface. Then the zirconium powder boron carbide substrate was resprayed with the solution. This was repeated until all the zirconium parent metal powder, as shown in Table IX, was applied to the surface of the boron carbide coated substrates. The substrates were then placed into an oven, set at about 45° C. for about 20 minutes. After drying, the coated graphite substrate coupons were weighed and the coating thickness measured.

The zirconium parent metal, boron carbide powder coated substrates were then placed into a vapor deposition chamber substantially the same as that described in Example 10 except that the parent metal in the parent metal source trays comprise zirconium sponge material (Western Zirconium, Ogden, Utah) having a diameter ranging from about 0.33 inch (0.84 mm) to about 0.25 inch (6.4 mm) to form a lay-up.

Figure 18A:
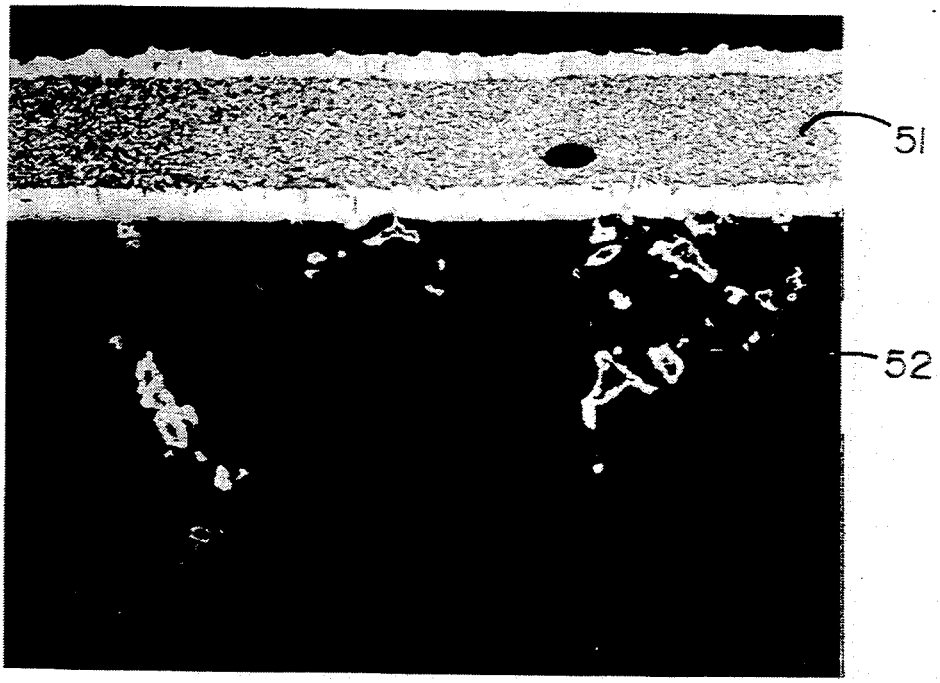
FIGS. 18a–18c are photomicrographs taken at various magnifications (identified in the specification) corresponding to samples made in accordance with Example 23.
Figure 18B:
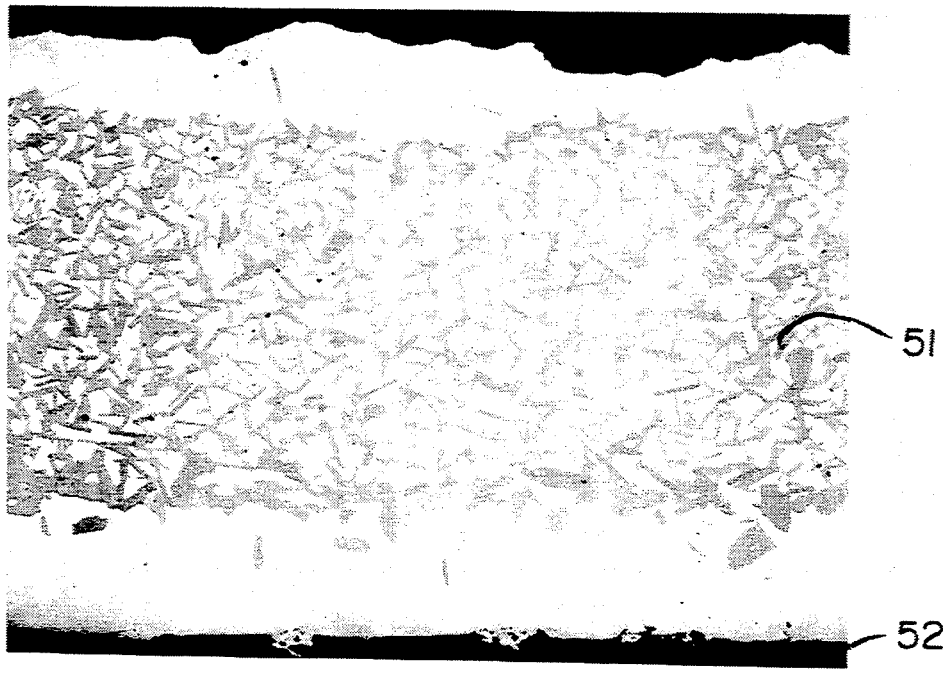
Figure 18C:
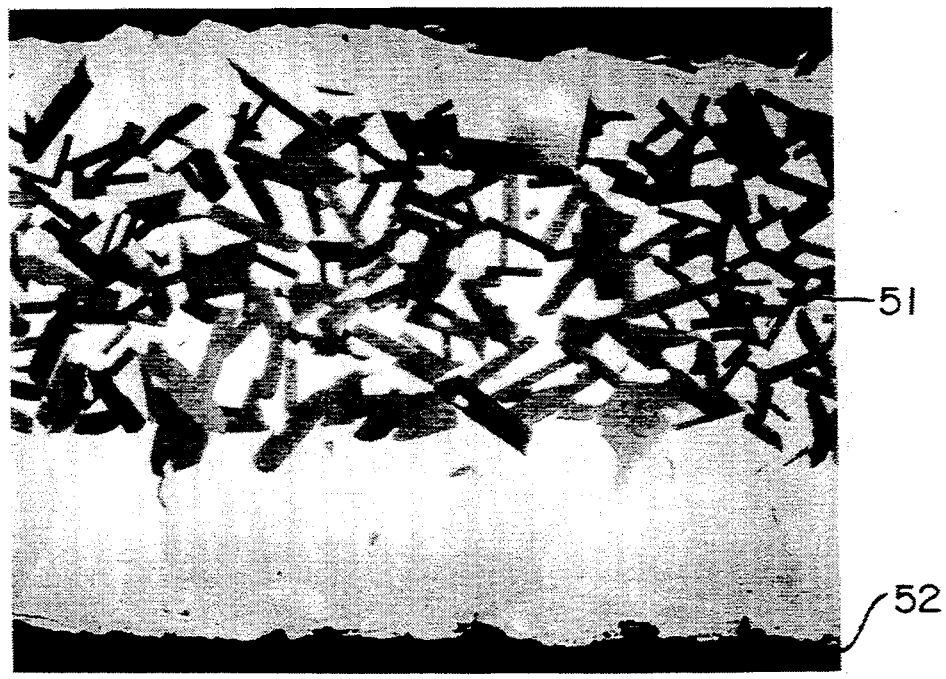

The lay-up comprising the vapor deposition chamber and its contents was then placed into a vacuum furnace and the vacuum furnace door was closed. The vacuum furnace was evacuated to a pressure of about 0.2 millitorr. After about 50 minutes at a pressure of about 0.2 millitorr, the vacuum furnace and its contents were heated from about room temperature to about 2000° C. at a rate of about 700° C. per hour while maintaining a pressure of about 0.2 millitorr. After about 2 hours at about 2000° C. with a pressure of about 0.2 millitorr, the furnace and its contents were cooled at about 1000° C. per hour to about 1000° C. while maintaining a pressure of about 0.2 millitorr. The vacuum furnace and its contents were then cooled from about 1000° C. to about room temperature at about 125° C. per hour while maintaining a pressure of about 0.2 millitorr. At about room temperature, the vacuum furnace door was opened, the vapor deposition chamber was removed from the furnace, disassembled, and the graphite substrate coupons were removed from the lower chamber portion of the vapor deposition chamber. It was noted that the powdered coating on the graphite substrate coupon had become integral with the graphite substrate coupons. Sample AY was then cross sectioned, polished, and mounted for metallographic examination in an electron microscope. FIG. 18a is a photomicrograph taken at about 50× in the electron microscope using the backscattered electron mode showing the ceramic composite coating 51 on the graphite substrate coupon 52. Additionally, FIG. 18a shows that some of the parent metal infiltrated into the pores of the graphite substrate coupon. FIG. 18b is a photomicrograph taken at about 200× corresponding to Sample AY showing the platelet structure of the resultant ceramic composite coating formed on the graphite substrate coupon. Additionally, FIG. 18c is a photomicrograph taken at about 200× in the electron microscope using the backscattered electron mode showing the ceramic composite coating formed on Sample BB of this Example.

Thus, this Example demonstrates that a ceramic composite coating can be formed on a substrate coupon by placing a first layer of a solid oxidant onto the surface of the graphite substrate coupon, then placing a second layer of a parent metal powder onto the substrate coupon and subjecting the powder coated graphite substrate coupon to a parent metal vapor to effect a reaction between parent metal powder, the vapor parent metal, solid oxidant and/or the graphite substrate.

EXAMPLE 24

The following Example demonstrates, among other things, a method for forming a reaction product on a graphite substrate coupon by reacting a parent metal vapor with a graphite substrate coupon at an elevated temperature. Specifically, the following Example further demonstrates a method of forming a hafnium carbide composite coating on a graphite substrate by the method of the present invention.

Figure 19:
FIG. 19 is a photomicrograph taken at about 4000× of the microstructure of sample made in accordance with Example 24.

The method of Example 20 was substantially repeated except that the amount of hafnium parent metal used was about 1070 grams. Furthermore, after the vapor deposition chamber 1601 and its contents were placed into the vacuum furnace, the vacuum furnace was evacuated to a pressure of about 0.2 millitorr. After about 50 minutes at a pressure of about 0.2 millitorr, the vacuum furnace and its contents were heated to about 2225° C. at a rate of about 750° C. per hour, while maintaining a pressure of less than about 60 millitorr. After about 3 hours at about 2225°, with a pressure of about 0.2 millitorr, the vacuum furnace and its contents were cooled to about 1000° C. at about 900° C. per hour while maintaining a pressure of about 0.2 millitorr. The vacuum furnace and its contents were then cooled from about 1000° C. to about room temperature at about 125° C. per hour while maintaining a pressure of about 0.2 millitorr. At about room temperature, the vacuum furnace door was opened, the vapor deposition chamber 1601 was removed from the furnace, disassembled and two graphite substrate coupons 1615 were removed from the lower chamber portion 1602 of the vapor deposition chamber 1601. It was noted that the hafnium sponge material had not melted to any significant extent. Further, it was noted that a light gray metallic finish substantially completely coated the surface of the graphite substrate coupon 1615. One of the graphite substrate coupons was broken and its surface examined using an electron microscope. The results of the examination indicated that a coating measuring about 9.5 microns had formed. FIG. 19a is a photomicrograph taken at a magnification of about 4000× of the ceramic composite coating 51 on the graphite substrate 52. The photomicrograph was taken in an electron microscope using the secondary electron image mode.

Thus, this Example further demonstrates that a parent metal source may comprise a solid parent metal having a substantial vapor pressure. Further, this Example demonstrates that a hafnium carbide composite coating may be formed on the surface of a graphite substrate according to the methods of the present invention.

We claim:

1. A method for forming a self-supporting body comprising:
   providing at least one vapor-phase parent metal;
   providing a substrate material which is substantially non-reactive with said vapor-phase parent metal;
   coating said substrate material with a solid oxidant-containing material;
   contacting said at least one vapor-phase parent metal with at least a portion of said solid oxidant-containing material; and
   permitting said at least one vapor-phase parent metal and said solid oxidant-containing material to form a reaction product on at least a portion of said solid oxidant-containing material.

2. The method of claim 1, wherein said at least one vapor-phase parent metal comprises at least one metal selected from the group consisting of titanium, zirconium, hafnium, silicon and niobium.

3. The method of claim 1, wherein said solid oxidant-containing material comprises a carbonaceous material or a molybdenum-containing material.

4. The method of claim 1, wherein said solid oxidant-containing material further comprises at least one filler located on at least one surface of said solid oxidant-containing material and said reaction product at least partially embeds said at least one filler.

5. The method of claim 3, wherein said reaction product at least partially embeds said filler.

6. The method of claim 1, wherein said solid oxidant-containing material comprises a first solid oxidant-containing material having at least a portion of at least one surface coated with a second solid oxidant-containing material.

7. The method of claim 1, wherein at least a portion of said solid oxidant-containing material is coated with a powdered parent metal.

8. The method of claim 1, wherein said solid oxidant-containing material is substantially completely converted to reaction product.

9. The method of claim 1, wherein said solid oxidant-containing material comprises a carbon-carbon composite substrate.

10. A self-supporting composite body comprising:
a solid oxidant-containing material comprising a molybdenum-containing material; and
a coating comprising at least one molybdenum silicide material covering at least a portion of at least one surface of said molybdenum-containing material.

11. A self-supporting composite body comprising a substrate material which is substantially non-reactive with the vapor-phase of metals selected from the group consisting of titanium, zirconium, hafnium, niobium and silicon; a solid oxidant-containing material comprising a carbon-containing material which covers at least a portion of said substrate material; and a coating comprising at least one material selected from the group consisting of titanium carbide, zirconium carbide, hafnium carbide, niobium carbide, silicon carbide and mixtures thereof covering at least a portion of at least one surface of said carbon-containing material.

12. The self-supporting composite body of claim 10, wherein said coating further comprises at least one filler.

13. The self-supporting composite body of claim 11, wherein said coating further comprises at least one filler.

14. The self-supporting composite body of claim 10, further comprising a substrate material, wherein said substrate material at least partially contacts said solid oxidant-containing material.

15. The self-supporting composite body of claim 11, wherein at least a portion of said coating comprises at least one material selected from the group consisting of titanium diboride, hafnium diboride, and zirconium diboride.

16. The self-supporting composite body of claim 13, wherein at least a portion of said coating further comprises at least one material selected from the group consisting of titanium diboride, hafnium diboride, and zirconium diboride.

17. A setup for performing a process of directed metal oxidation of a solid oxidant-containing material with a parent metal vapor to form self-supporting bodies, having substantially homogeneous compositions, graded compositions, and macrocomposite bodies, said setup comprising:
a chamber comprising:
(a) at least one material which does not adversely react with said parent metal vapor and said solid oxidant-containing materials;
(b) a communication means for facilitating the communication between an atmosphere external to said chamber with an atmosphere within said chamber and preventing said parent metal vapor from escaping from said chamber and into said atmosphere external to said chamber, said communication means located in at least a portion of said chamber;
(c) a parent metal providing means for introducing said parent metal vapor into said chamber, said introducing means being located external to or within said chamber; and
(d) a supporting means for supporting said solid oxidant-containing material, said supporting means being at least partially located within said chamber.

18. The setup of claim 17, wherein said at least one material comprises graphite.

19. The setup of claim 17, wherein said communications means comprises a parent metal vapor.

20. The setup of claim 19, wherein said parent metal vapor trap comprises at least one of a graphite felt-and a graphite fiber board.

21. The setup of claim 17, wherein said supporting means comprises at least one body selected from the group consisting of rods and plates.

22. The method of claim 1, wherein said reaction product is directly bonded to said substrate.

23. The method of claim 1, wherein at least a portion of said solid oxidant-containing material remains unreacted, and said reaction product is integrally bonded to said substrate through said remaining solid oxidant-containing material.

* * * * *